(12) United States Patent
Moriwaki

(10) Patent No.: US 10,180,613 B2
(45) Date of Patent: Jan. 15, 2019

(54) OPTICAL DEVICE

(71) Applicant: Sharp Kabushiki Kaisha, Sakai, Osaka (JP)

(72) Inventor: Hiroyuki Moriwaki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 49 days.

(21) Appl. No.: 15/301,003

(22) PCT Filed: Mar. 26, 2015

(86) PCT No.: PCT/JP2015/059442
§ 371 (c)(1),
(2) Date: Sep. 30, 2016

(87) PCT Pub. No.: WO2015/152008
PCT Pub. Date: Oct. 8, 2015

(65) Prior Publication Data
US 2017/0031186 A1 Feb. 2, 2017

(30) Foreign Application Priority Data
Apr. 2, 2014 (JP) .................................. 2014-076388

(51) Int. Cl.
*G02F 1/1333* (2006.01)
*G02F 1/1337* (2006.01)
(Continued)

(52) U.S. Cl.
CPC ............ *G02F 1/137* (2013.01); *G02F 1/1337* (2013.01); *G02F 1/13725* (2013.01);
(Continued)

(58) Field of Classification Search
CPC ..................................................... G02F 1/1337
See application file for complete search history.

(56) References Cited

U.S. PATENT DOCUMENTS

| 6,665,042 B1 | 12/2003 | Marshall et al. | |
| 2008/0293175 A1* | 11/2008 | Torii | B82Y 10/00 438/30 |

(Continued)

FOREIGN PATENT DOCUMENTS

| JP | WO 2014002788 A1 * | 1/2014 | ............. G02F 1/167 |
| WO | 2014/002788 A1 | 1/2014 | |

OTHER PUBLICATIONS

Cox et al., "Modeling the Effects of Microencapsulation on the Electro-Optic Behavior of Polymer Cholesteric Liquid Crystal Flakes", LLE Review, vol. 118, Jan.-Mar. 2009, pp. 86-100.

(Continued)

*Primary Examiner* — Nimeshkumar Patel
*Assistant Examiner* — Jacob R Stern
(74) *Attorney, Agent, or Firm* — Keating & Bennett, LLP

(57) ABSTRACT

An optical device (100) includes a first substrate (10), a second substrate (20) and an optical layer (30). The optical layer includes a medium (31) containing a liquid crystal material, and shape-anisotropic particles (32). At least one of the first substrate and the second substrate includes a film provided on the side of the optical layer, the film having a surface energy of 40 mJ/m$^2$ or less, or having a contact angle with pure water of 75 degrees or greater or a contact angle with $CH_2I_2$ of 40 degrees or greater. Alternatively, at least one of the first substrate and the second substrate includes a vertical alignment film (15, 25) provided on the side of the optical layer.

16 Claims, 51 Drawing Sheets

(51) Int. Cl.
*G02F 1/137* (2006.01)
*G02F 1/1343* (2006.01)

(52) U.S. Cl.
CPC .. *G02F 1/133345* (2013.01); *G02F 1/134363* (2013.01); *G02F 2001/13706* (2013.01); *G02F 2001/133742* (2013.01); *G02F 2001/134381* (2013.01)

(56) References Cited

U.S. PATENT DOCUMENTS

| | | | | |
|---|---|---|---|---|
| 2009/0265929 | A1* | 10/2009 | Nakagawa | H01L 21/67144 29/846 |
| 2015/0004375 | A1* | 1/2015 | Hou | H01L 51/0005 428/195.1 |
| 2015/0192807 | A1 | 7/2015 | Satoh | |

OTHER PUBLICATIONS

Official Communication issued in corresponding International Application PCT/JP2015/059442, dated Jun. 2, 2015.

* cited by examiner

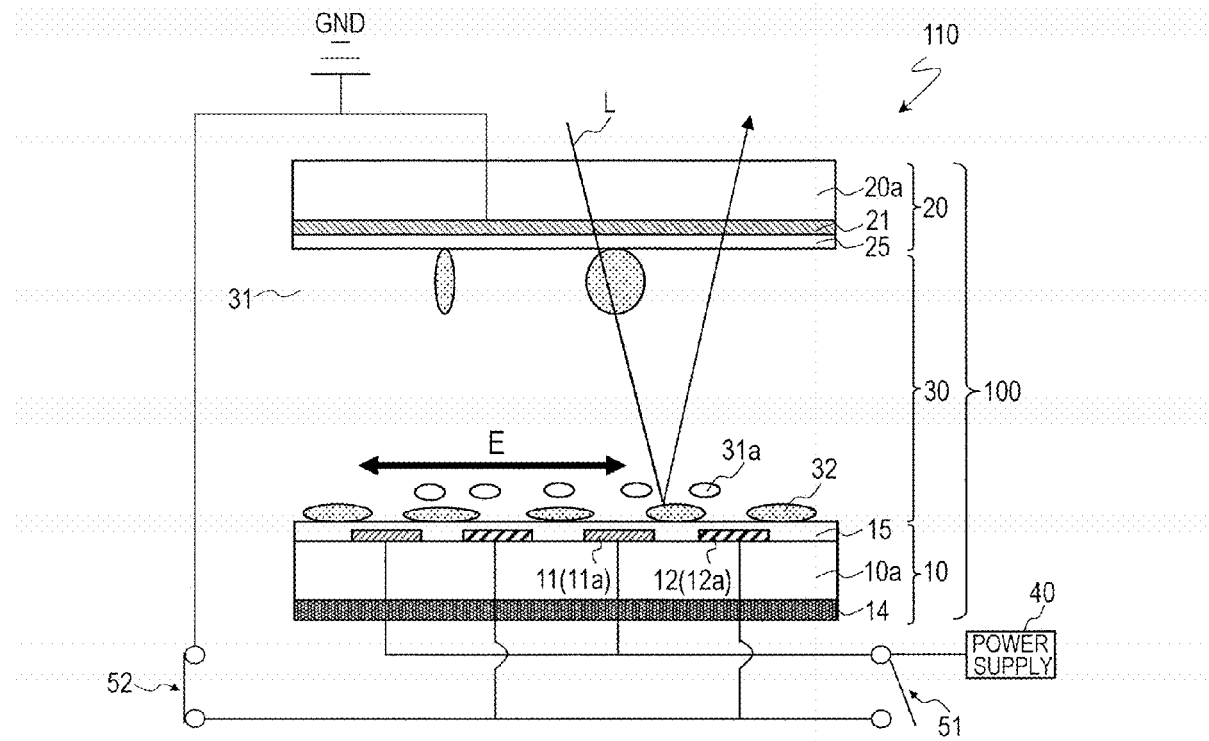
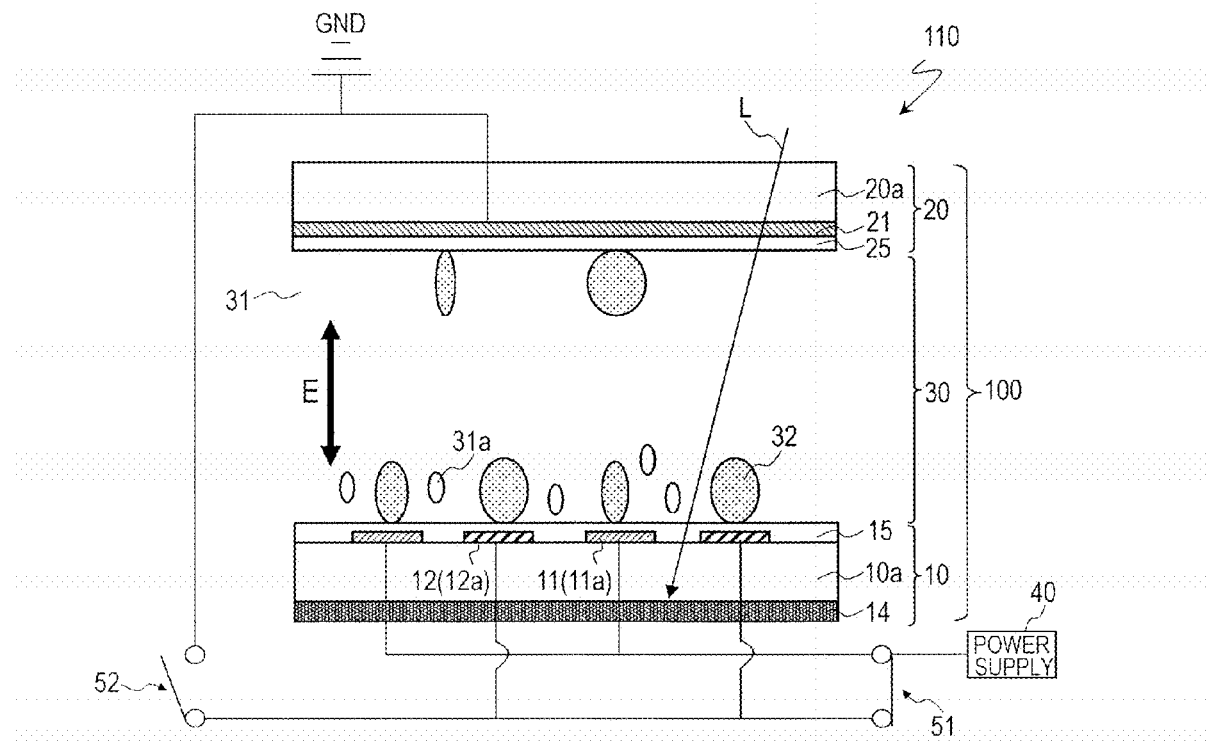

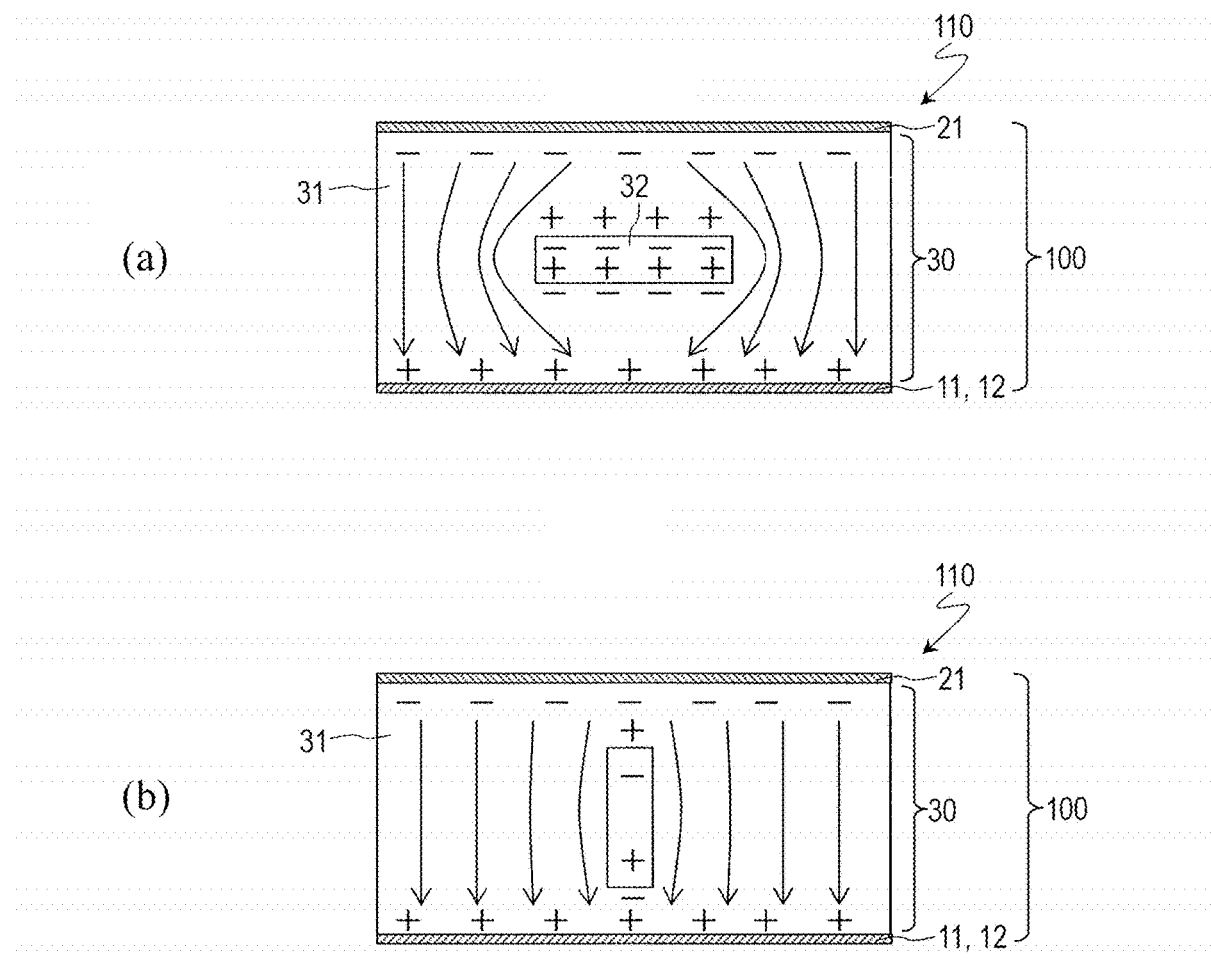

FIG.9
(a) VERTICAL ELECTRIC FIELD REMOVED
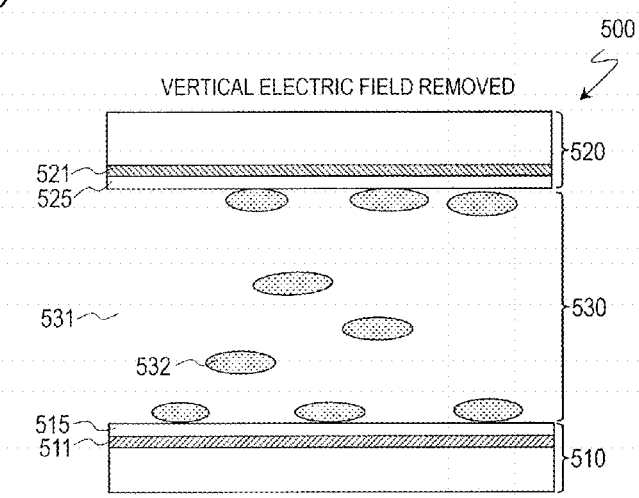
(b) 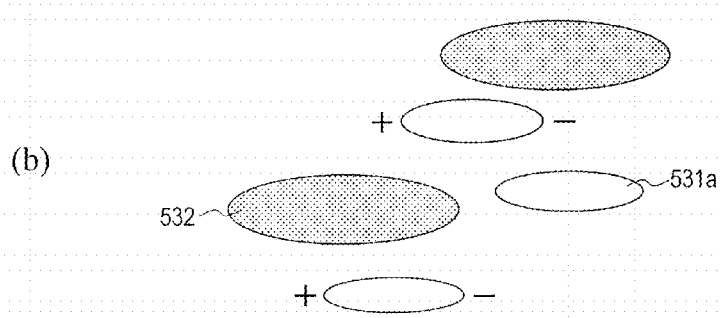
(c) 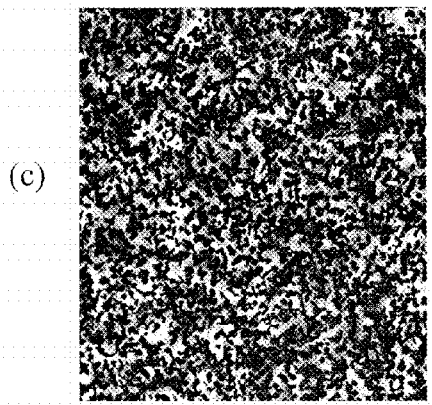
(d) 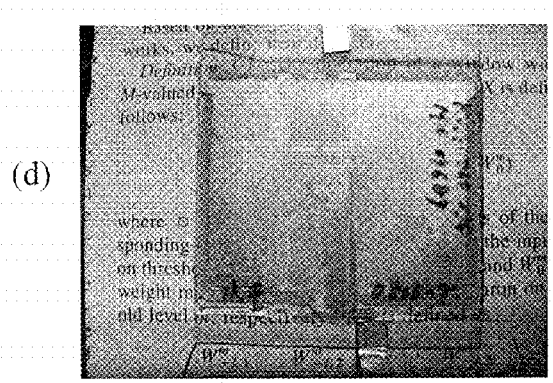

FIG.30
(a) 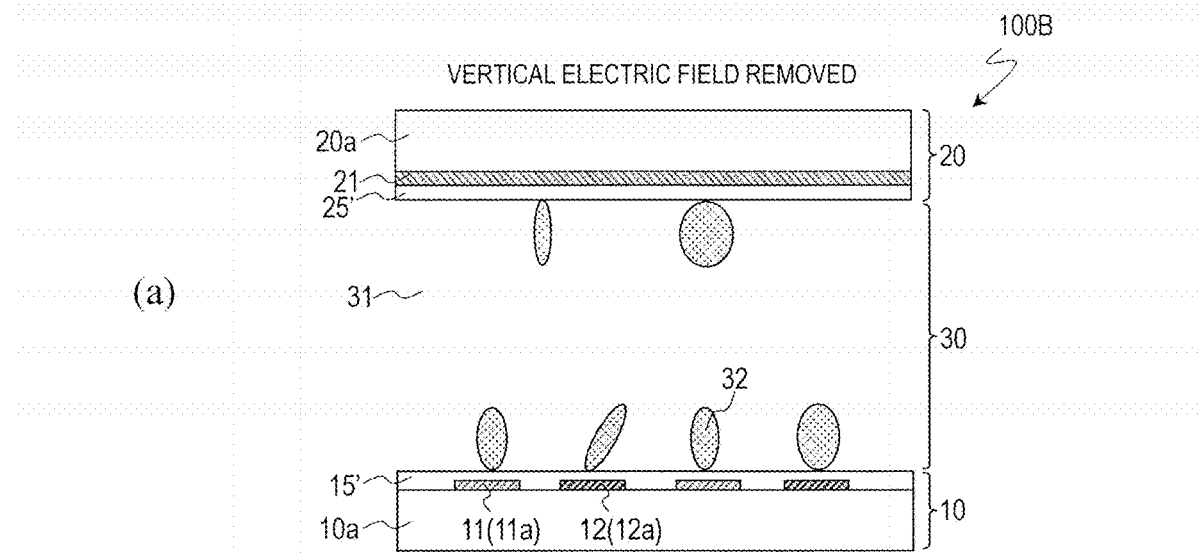
(b) 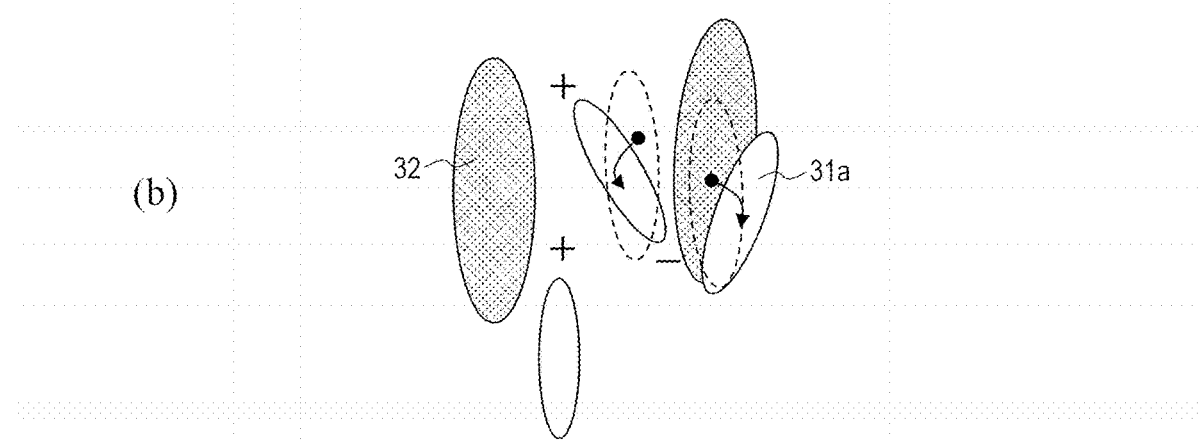
(c) 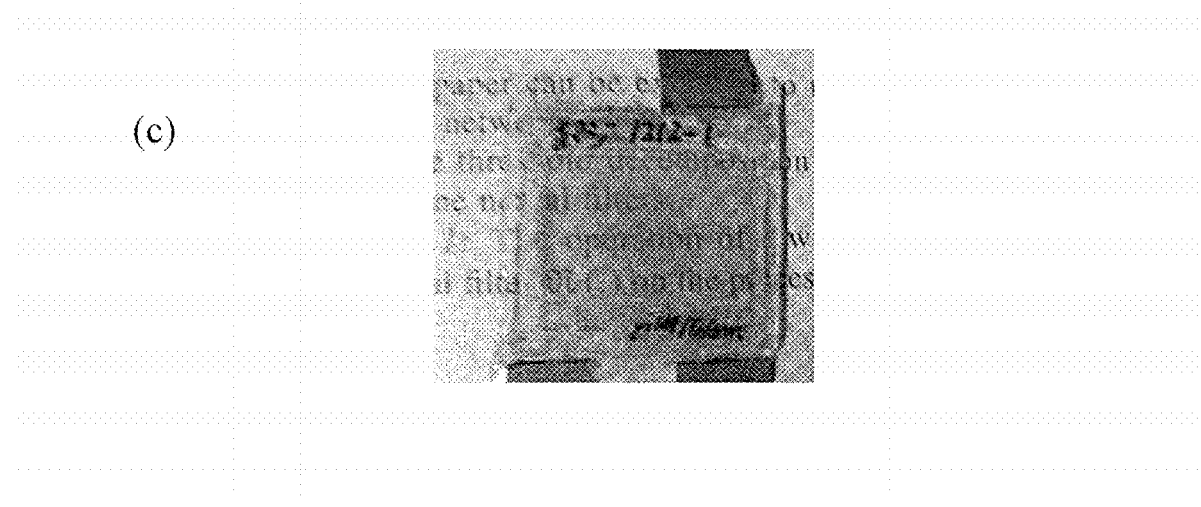

FIG.34
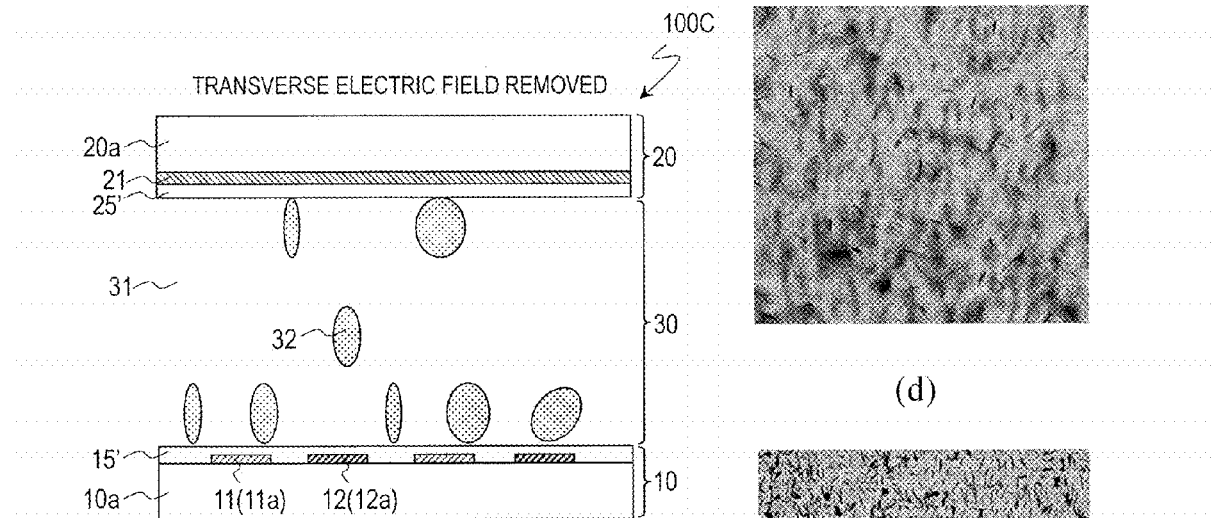
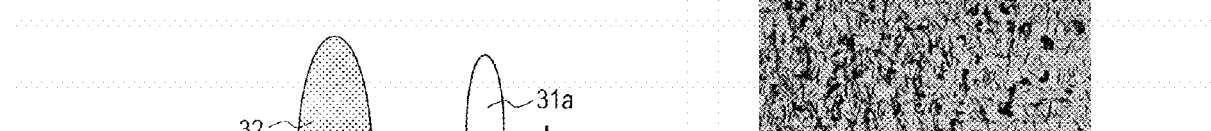

FIG.40
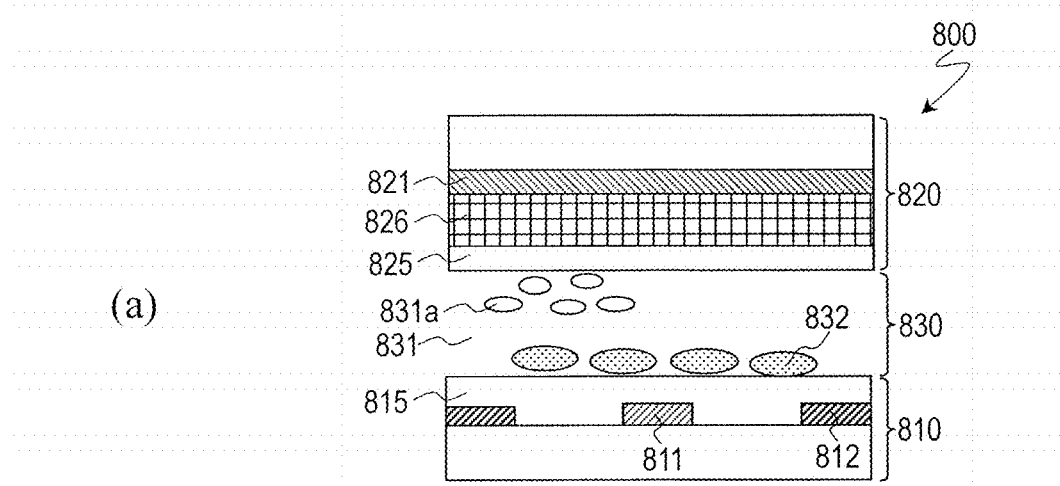
(a)
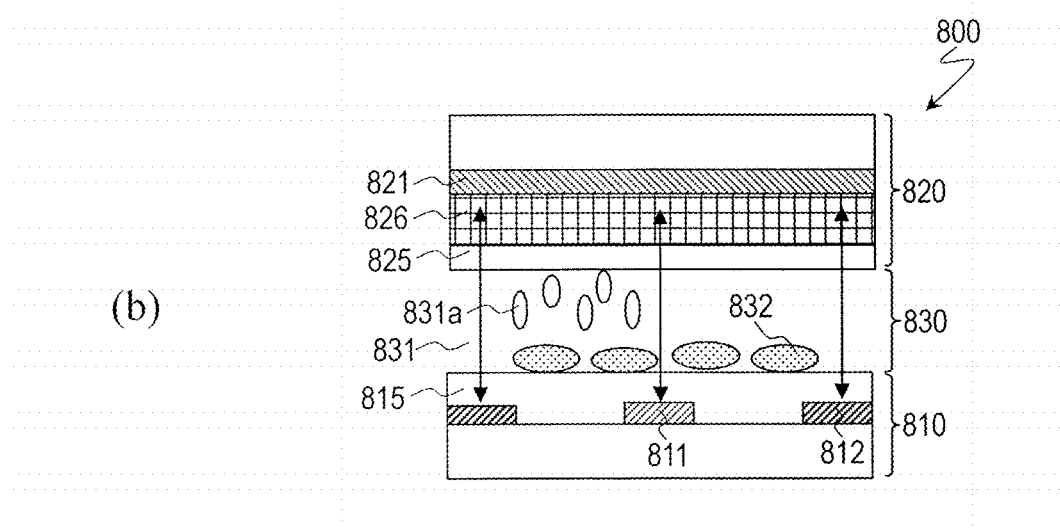
(b)

(a) 0V  (b) 5V  (c) 10V  (d) 15V (a) 0V  (b) 5V  (c) 10V  (d) 15V (a) D=20[μm]  (b) D=10[μm]  (c) D=5[μm]

(a) D=20[μm]  (b) D=10[μm]  (c) D=5[μm]

FIG.52
(a)  
D=50[μm]  
NO ELECTRIC FIELD APPLIED
(b)  
D=50[μm]  
TRANSVERSE ELECTRIC FIELD APPLIED
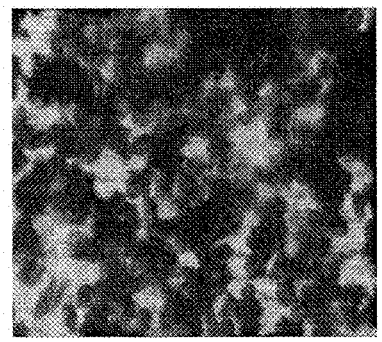
FIG.53
(a)  
D=30[μm]  
NO ELECTRIC FIELD APPLIED
(b)  
D=30[μm]  
TRANSVERSE ELECTRIC FIELD APPLIED
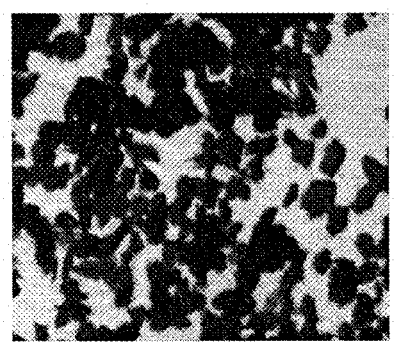

(a) D=20[μm] NO ELECTRIC FIELD APPLIED (b) D=20[μm] TRANSVERSE ELECTRIC FIELD APPLIED (a) D=10[μm] NO ELECTRIC FIELD APPLIED (b) D=10[μm] TRANSVERSE ELECTRIC FIELD APPLIED

FIG.56
(a)
Cf=7.5[wt%]
NO ELECTRIC FIELD APPLIED
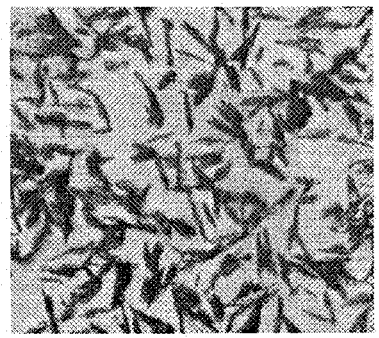
(b)
Cf=7.5[wt%]
TRANSVERSE ELECTRIC FIELD APPLIED
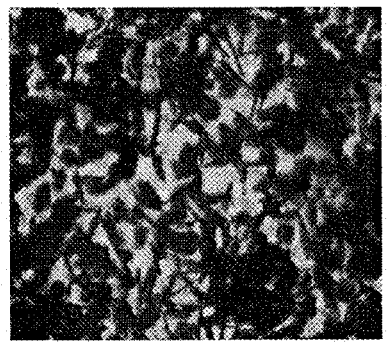
FIG.57
(a)
Cf=3.0[wt%]
NO ELECTRIC FIELD APPLIED
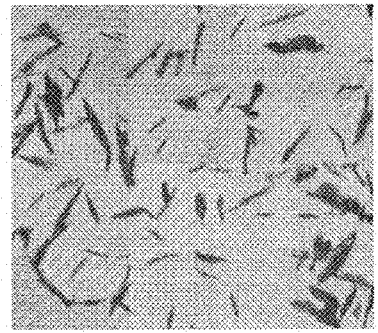
(b)
Cf=3.0[wt%]
TRANSVERSE ELECTRIC FIELD APPLIED
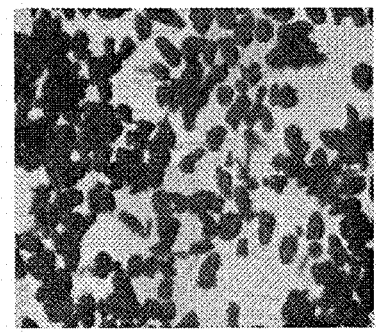

OPTICAL DEVICE

TECHNICAL FIELD

The present application relates to an optical device, and specifically, to an optical device including an optical layer containing shape-anisotropic particles.

BACKGROUND ART

An optical device controlling the transmittance (or the reflectance) of incident light is desired to have a high contrast ratio and a high light utilization factor.

A well known optical device controlling the transmittance of light by applying a voltage is a liquid crystal panel. A liquid crystal panel includes a pair of substrates and a liquid crystal layer provided between the substrates. In such a liquid crystal panel, the alignment of liquid crystal molecules in the liquid crystal layer is changed in accordance with the level of the voltage applied to the liquid crystal layer. This changes the light transmittance of light incident on the liquid crystal panel. The liquid crystal panel provides a very high contrast ratio, and therefore is widely used for a liquid crystal display device.

However, most of such liquid crystal panels are of a system using polarization plates. A half or more of the light to be used for display is absorbed by the polarization plates. This decreases the light utilization factor. Thus, optical devices that do not need any polarization plate have recently been developed progressively.

Non-patent Document 1 proposes a display cell that does not need any polarization plate. The display cell disclosed in Non-patent Document 1 has a structure in which a host fluid (medium) and polymer (resin coat) flakes dispersed in the medium are held between a pair of electrodes. Application of an electric field between the pair of electrodes changes the alignment direction of the polymer flakes, and thus an optical characteristic (light reflectance) of the display cell is changed. Non-patent Document 1 discloses propylene carbonate and epoxy-terminated polydimethylsiloxane (DMS-E09) as specific examples of materials of the medium.

Patent Document 1 discloses an optical device including a suspension liquid layer containing polymer flakes. This optical device applies an electric field to the suspension liquid layer to rotate the polymer flakes, thus to change the optical characteristic of the suspension liquid layer.

The display cell described in Non-patent Document 1 and the optical device described in Patent Document 1, neither of which requires any polarization plate, provide a higher light utilization factor than a liquid crystal panel.

CITATION LIST

Patent Literature

Patent Document 1: U.S. Pat. No. 6,665,042

Non-Patent Literature

Non-patent Document 1: G. P. Cox and five others, "Modeling the Effects of Microencapsulation on the Electro-Optic Behavior of Polymer Cholesteric Liquid Crystal Flakes", LLE Review, UNIVERSITY OF ROCHESTER LABORATORY FOR LASER ENERGETICS, January-March 2009, volume 118, pp. 86-99

SUMMARY OF INVENTION

Technical Problem

Currently, active matrix driving is adopted as a driving system of liquid crystal panels. A liquid crystal panel of an active matrix driving system includes a thin film transistor (TFT) in each of pixels. A pixel is scanned to turn on the TFT thereof to write data to the pixel. The TFT is kept off until the next time the pixel is scanned. Therefore, until the next time data is written to the pixel, the level of voltage applied to the liquid crystal layer is maintained (namely, the charge is retained at the pixel capacitance), and thus the alignment state of the liquid crystal molecules in the liquid crystal layer is maintained.

The display cell proposed in Non-patent Document 1 is difficult to be driven by active matrix driving. It is now assumed that propylene carbonate or DMS-E09 is used as the medium. Such a material has a specific resistance that is lower by several digits than that of a typical liquid crystal material (the specific resistance of a typical liquid crystal material is about $1 \times 10^{13}$ Ω·cm, whereas the specific resistance of propylene carbonate is about $1 \times 10^{4}$ Ω·cm and the specific resistance of DMS-E09 is about $1.1 \times 10^{7}$ Ω·cm). In the case where, for example, propylene carbonate or DMS-E09 is used as the medium, in the state where the TFT is in an off state after data is written to the pixel, the voltage holding ratio is significantly decreased by off-leak caused via the medium. Therefore, the polymer flakes, which are to be aligned in a vertical direction, are tilted to a horizontal direction (direction parallel to a substrate surface) by the weight thereof. As a result, the luminance of the pixel is changed. This is why it is difficult to drive the display cell by active matrix driving.

In the state where no voltage is applied, the polymer flakes are not kept aligned in the vertical direction, but are tilted to the horizontal direction by the weight thereof. Therefore, the display cell disclosed in Non-patent Document 1 does not have a so-called memory function, and thus is difficult to be operated at lower power consumption. In addition, in the state where the display cell is inclined, the polymer flakes move in the cell by the weight thereof and precipitate to the bottom of the display cell.

Patent Document 1 describes an example (example 6) in which a nematic liquid crystal material is used as the medium of the suspension liquid layer. In this example, an alignment film (polyimide coating) is provided on each of a pair of substrates, each of which includes a transparent electrode. The polymer flakes are aligned parallel to the substrate surface in the state where no electric field is formed in the suspension liquid layer. When a vertical electric field is formed in the suspension liquid layer, the polymer flakes tend to align vertically to the substrate surface.

In the above-described example of Patent Document 1, it is considered that the decrease in the voltage holding ratio caused by off-leak via the medium is suppressed. In actuality, however, in this example, the polymer flakes are attached to a surface of the alignment film having a strong polarity. Therefore, even if a vertical electric field is formed in the suspension liquid layer, the polymer flakes in the vicinity of the alignment layer are not separated from the alignment film. Thus, most of the polymer flakes are kept aligned parallel to the substrate surface. Because of such a situation, the light transmittance in the state where an electric field is applied is not made much different from the light transmittance in the state where no electric field is applied. Thus, a sufficiently high contrast ratio is not realized. In addition, in the optical device described in Patent Document 1, an electric field is applied to cause the polymer flakes, aligned parallel to the substrate surface, to be aligned vertically to the substrate surface (or cause the polymer flakes, aligned vertically to the substrate surface, to be aligned parallel to the substrate surface). The change opposite to the above is realized by thermal dispersion or gravity. Therefore, the response speed is not sufficiently high, and thus the optical device is difficult to be used for a display device.

The present invention made in light of the above-described problems has an object of providing an optical device that is drivable by active matrix driving, consumes very low power, and realizes a high light utilization factor and a high contrast ratio.

Solution to Problem

An optical device in an embodiment according to the present invention includes a first substrate and a second substrate provided to face each other; and an optical layer provided between the first substrate and the second substrate. The optical layer includes a medium, and shape-anisotropic particles dispersed in the medium and having shape anisotropy; the medium contains a liquid crystal material; and at least one of the first substrate and the second substrate includes a film provided on the side of the optical layer, the film having a surface energy of 40 mJ/m² or less, or having a contact angle with pure water of 75 degrees or greater or a contact angle with $CH_2I_2$ of 40 degrees or greater.

An optical device in another embodiment according to the present invention includes a first substrate and a second substrate provided to face each other; and an optical layer provided between the first substrate and the second substrate. The optical layer includes a medium, and shape-anisotropic particles dispersed in the medium and having shape anisotropy; the medium contains a liquid crystal material; and at least one of the first substrate and the second substrate includes a vertical alignment film provided on the side of the optical layer, the vertical alignment film vertically aligning liquid crystal molecules contained in the liquid crystal material.

In an embodiment, the first substrate includes a first electrode and a second electrode allowed to be supplied with different potentials from each other; and the optical device is allowed to apply a transverse electric field to the optical layer.

In an embodiment, one of the first electrode and the second electrode is provided on the other of the first electrode and the second electrode with an insulating layer being held therebetween, and includes at least one slit; and the other of the first electrode and the second electrode includes a portion facing the at least one slit.

In an embodiment, the first electrode and the second electrode have such shapes as to be geared with each other while having a predetermined gap therebetween; the first substrate includes a further electrode located below the first electrode and the second electrode with an insulating layer being held between the further electrode and the first and second electrodes; and the further electrode includes a portion facing the gap.

In an embodiment, at least one of the first electrode and the second electrode includes at least one branch; and a width w of the at least one branch and a length l of each of the shape-anisotropic particles fulfill the relationship of w<l.

In an embodiment, the first electrode and the second electrode have such shapes as to be geared with each other while having a predetermined gap therebetween; and a width g of the gap and a length l of each of the shape-anisotropic particles fulfill the relationship of g>l·(½).

In an embodiment, the second substrate includes a third electrode facing the first electrode and the second electrode; and the optical device is allowed to apply a vertical electric field to the optical layer.

In an embodiment, the second substrate further includes a dielectric layer provided on the third electrode.

In an embodiment, a specific dielectric constant εr and a thickness t [μm] of the dielectric layer fulfill the relationship of εr·t>7.

In an embodiment, the liquid crystal material has positive dielectric anisotropy.

In an embodiment, the liquid crystal material has a dielectric anisotropy value Δε exceeding 15.

In an embodiment, a length l of each of the shape-anisotropic particles is 3 μm or greater and 10 μm or less.

In an embodiment, a content Cf [wt. %] of the shape-anisotropic particles in the optical layer and a thickness D [μm] of the optical layer fulfill the relationship of 4≤(Cf·D)/10≤15.

In an embodiment, the shape-anisotropic particles are formed of a metal material having an insulating layer provided on a surface thereof.

In an embodiment, a thickness D of the optical layer is 10 μm or greater and 20 μm or less.

In an embodiment, the film or the vertical alignment film is not subjected to a rubbing treatment.

Advantageous Effects of Invention

An embodiment of the present invention provides an optical device that is drivable by active matrix driving, consumes very low power, and realizes a high light utilization factor and a high contrast ratio.

BRIEF DESCRIPTION OF DRAWINGS

FIG. 3 schematically shows the display device 110 when a transverse electric field is applied to an optical layer 30.

FIG. 4 schematically shows the display device 110 when a vertical electric field is applied to the optical layer 30.

FIG. 5(a) shows the optical layer 30 immediate after the electric field applied to the optical layer 30 is changed from the transverse electric field to the vertical electric field, and FIG. 5(b) shows the optical layer 30 when a sufficiently long time passes thereafter.

FIG. 9(a) schematically shows the optical device 500 in the state where the vertical electric field applied to the optical layer 530 is removed, FIG. 9(b) shows the alignment direction of the shape-anisotropic particles 532 and the liquid crystal molecules 531a in this state, FIG. 9(c) is an optical micrograph of the optical layer 530 in this state as seen in a direction of the normal to the substrate surface, and FIG. 9(d) shows the optical device 500 in this state.

FIG. 18(a) shows the alignment directions in the state where no electric field is applied to the optical layer 730, and FIG. 18(b) shows the alignment directions in the state where a vertical electric field is applied to the optical layer 730.

FIG. 30(a) schematically shows the optical device 100B in the state where the vertical electric field applied to the optical layer 30 is removed, FIG. 30(*b*) shows the alignment directions of the shape-anisotropic particles 32 and the liquid crystal molecules 31*a* in this state, and FIG. 30(*c*) is a photograph showing the optical device 100B in this state.

FIG. 34(*a*) schematically shows the optical device 100C in the state where the transverse electric field applied to the optical layer 30 is removed, FIG. 34(*b*) shows the alignment direction of the shape-anisotropic particles 32 and the liquid crystal molecules 31*a* in this state, FIG. 34(*c*) and FIG. 34(*d*) are each an optical micrograph of the optical layer 30 in this state as seen in a direction of the normal to the substrate surface, and FIG. 34(*e*) is a photograph showing the optical device 100C in this state.

FIG. 40(*a*) and FIG. 40(*b*) are cross-sectional view schematically showing an optical device 800 in comparative example 4; FIG. 40(*a*) shows the optical device 800 in the state where no electric field is applied to an optical layer 830, and FIG. 40(*b*) shows the optical device 800 in the state where a vertical electric field is applied to the optical layer 830.

FIG. 52(*a*) and FIG. 52(*b*) are optical micrographs of the optical layer 30 having a thickness D of 50 µm, respectively in the state where no electric field is applied to the optical layer 30 and in the state where a transverse electric field is applied to the optical layer 30.

FIG. 53(a) and FIG. 53(b) are optical micrographs of the optical layer 30 having a thickness D of 30 μm, respectively in the state where no electric field is applied to the optical layer 30 and in the state where a transverse electric field is applied to the optical layer 30.

FIG. 56(a) and FIG. 56(b) are optical micrographs of the optical layer 30 containing the shape-anisotropic particles 32 at content Cf of 7.5 wt. %, respectively in the state where no electric field is applied to the optical layer 30 and in the state where a transverse electric field is applied to the optical layer 30.

FIG. 57(a) and FIG. 57(b) are optical micrographs of the optical layer 30 containing the shape-anisotropic particles 32 at a content Cf of 3.0 wt. %, respectively in the state where no electric field is applied to the optical layer 30 and in the state where a transverse electric field is applied to the optical layer 30.

DESCRIPTION OF EMBODIMENTS

Hereinafter, an embodiment of the present invention will be described with reference to the drawings. The present invention is not limited to the following embodiment.

Figure 1:
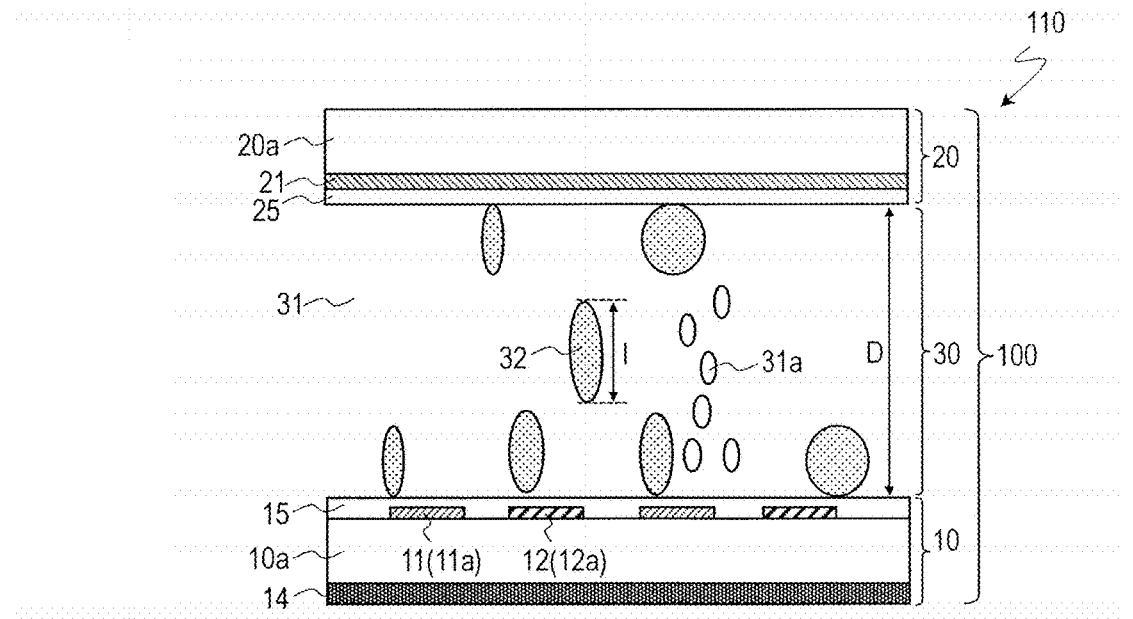
FIG. 1 is a cross-sectional view schematically showing a display device 110 in an embodiment according to the present invention.

FIG. 1 shows a display device 110 in an embodiment according to the present invention. FIG. 1 is a cross-sectional view schematically showing the display device 110.

The display device 110 is a reflection-type display device that provides display in a reflection mode by use of light incident from outside (ambient light). As shown in FIG. 1, the display device 110 includes a display panel (optical device) 100, which includes a plurality of pixels arrayed in a matrix.

The display panel 100 includes a first substrate 10 and a second substrate 20 provided to face each other and an optical layer (display medium layer) 30 provided between the first substrate 10 and the second substrate 20. Herein-after, the first substrate 10 located relatively on the rear side, among the first substrate 10 and the second substrate 20, may be referred to as the "rear-side substrate". The second substrate 20 located relatively on the front side (i.e., side closer to a viewer), among the first substrate 10 and the second substrate 20, may be referred to as the "front-side substrate".

Figure 2:
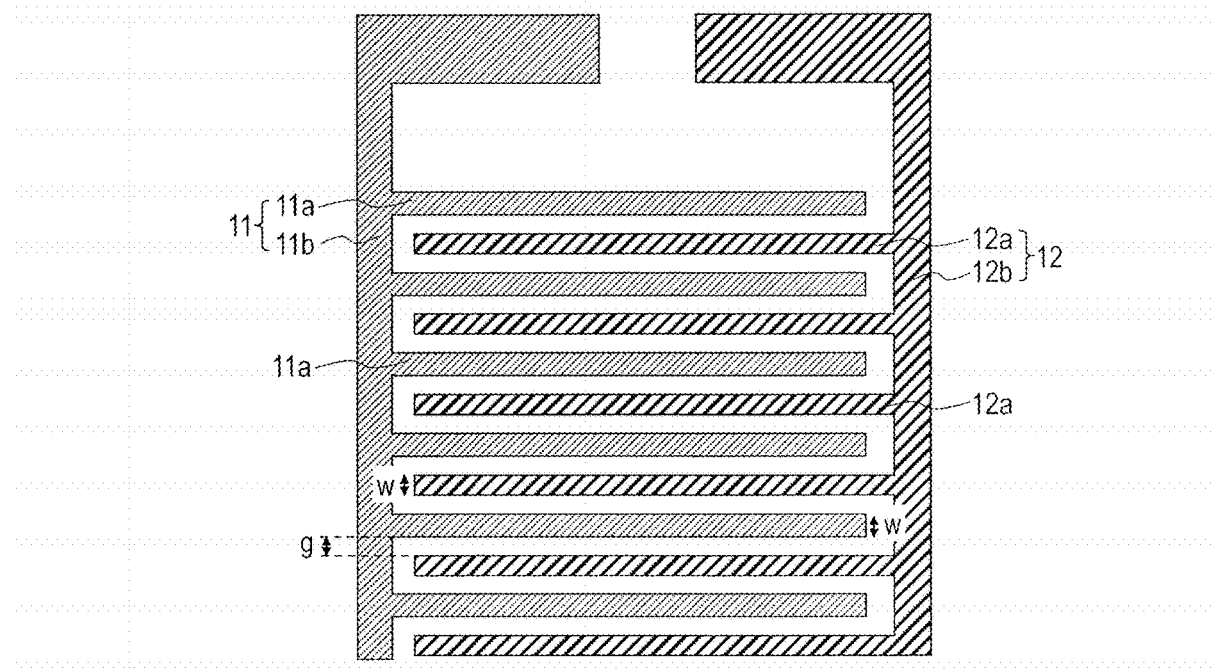
FIG. 2 is a plan view schematically showing a first electrode 11 and a second electrode 12 included in the display device 110.

The first substrate (rear-side substrate) 10 includes a first electrode 11 and a second electrode 12 allowed to be supplied with different potentials from each other. The first electrode 11 and the second electrode 12 are provided on each of the plurality of pixels. The first electrode 11 and the second electrode 12 are respectively comb-like electrodes respectively including a plurality of branches 11a and a plurality of branches 12a. FIG. 2 shows a planar structure of the first electrode 11 and the second electrode 12.

As shown in FIG. 2, the first electrode 11 includes a stem 11b and the plurality of branches 11a extending from the stem 11b. Similarly, the second electrode 12 includes a stem 12b and the plurality of branches 12a extending from the stem 12b. The first electrode 11 and the second electrode 12 are located such that the plurality of branches 11a and 12a are geared with each other while having a predetermined gap therebetween. Namely, the first electrode 11 and the second electrode 12 have such shapes as to be geared with each other while having a predetermined gap therebetween. Hereinafter, width g of the gap between the first electrode 11 and the second electrode 12 may be referred to as the "inter-electrode distance".

There is no specific limitation on width w of each of the branches 11a of the first electrode 11 and each of the branches 12a of the second electrode 12. There is no specific limitation on the inter-electrode distance width g. However, as described below, it is preferable that the width w of each of the branches 11a and each of the branches 12a and the inter-electrode distance g fulfill a predetermined relationship with length l of each of shape-anisotropic particles 32.

The first substrate 10 is an active matrix substrate, and includes a thin film transistor (TFT) provided in each of the pixels and various types of lines (gate lines, source lines, etc. electrically connected with the TFTs) (none of the TFTs and the lines is shown here).

The first substrate 10 further includes a light absorption layer 14 absorbing light. There is no specific limitation on the material of the light absorption layer 14. The material of the light absorption layer 14 may be, for example, a pigment usable as a material of a black matrix of a liquid crystal display device or the like. Alternatively, the light absorption layer 14 may be formed of a two-layer low-reflection chromium film (having a stack structure of a chromium layer and a chromium oxide layer).

The elements of the first substrate 10 (e.g., the first electrode 11, the second electrode 12, the light absorption layer 14 described above) are supported by an insulating substrate (e.g., glass substrate) 10a. In FIG. 1, the light absorption layer 14 is provided on the rear side of the substrate 10a. Alternatively, the light absorption layer 14 may be provided on the optical layer 30 side of the substrate 10a.

The second substrate (front-side substrate) 20 includes a third electrode 21 facing the first electrode 11 and the second electrode 12. The third electrode 21 may be a so-called solid substrate with no slit or cut-out portion. The third electrode 21 does not need to be provided electrically independently in correspondence with each of the pixels, but may be formed of a single continuous conductive film common to all the pixels (namely, may be a common electrode). In the case where the third electrode 21 is a solid electrode common to all the pixels, patterning by a photolithography does not need to be used for forming the third electrode 21, and thus the production cost is decreased. For providing color display, the second substrate 20 further includes color filters (not shown). The elements of the second substrate 20 (e.g., the third electrode 21 described above) are supported by an insulating substrate (e.g., glass substrate) 20a.

The first electrode 11, the second electrode 12 and the third electrode 21 are each formed of a transparent conductive material such as ITO (indium tin oxide), IZO (indium zinc oxide) or the like. There is no specific limitation on the method for depositing a conductive film to form these electrodes. Any of various known methods including sputtering, vacuum vapor deposition, plasma CVD and the like is usable. There is no specific limitation, either, on the method for patterning the conductive film to form the first electrode 11 and the second electrode 12 each having a comb-like shape. Any of known patterning methods including photolithography and the like is usable. The first electrode 11, the second electrode 12 and the third electrode 13 each have a thickness of, for example, 100 nm.

The optical layer (display medium layer) 30 includes a liquid medium 31 and particles having shape anisotropy (hereinafter, referred to as the shape-anisotropic particles) 32 dispersed in the medium 31. The first substrate 10 and the second substrate 20 described above are bonded together with a sealing portion (not shown here) formed to enclose a display region. The medium 31 and the shape-anisotropic particles 32 are sealed in the region enclosed by the sealing portion (i.e., in the display region). There is no specific limitation on thickness (cell gap) D of the optical layer 30. However, for the reason described below, it is preferable that the thickness D of the optical layer 30 is 10 µm or greater and 20 µm or less.

In this example, the shape-anisotropic particles 32 are light-reflective. The shape-anisotropic particles 32 are, for example, flake-like (thin piece-like).

The shape-anisotropic particles 32 have the alignment direction thereof changed in accordance with the direction of the electric field applied to the optical layer 30. Namely, the alignment direction of the shape-anisotropic particles 32 is different in the case where a vertical electric field is formed in the optical layer 30 by the first electrode 11, the second electrode 12 and the third electrode 21, from in the case where a transverse electric field is formed by the first electrode 11 and the second electrode 12. The shape-anisotropic particles 32 have shape anisotropy. Therefore, when the alignment direction of the shape-anisotropic particles 32 is changed, the size of the projection area of a substrate surface (substrate surface of the first substrate 10) on which the shape-anisotropic particles 32 are projected is changed. Along with this, the optical characteristic (in this example, reflectance) of the optical layer 30 is also changed. The display device 110 in this embodiment provides display by use of such changes. The reason why the alignment direction of the shape-anisotropic particles 32 is changed in accordance with the direction of the applied electric field will be described below in detail.

In the display device 110 in this embodiment, the medium 31 is a liquid crystal material containing liquid crystal molecules 31a. In this example, the liquid crystal material has positive dielectric anisotropy. Namely, the medium 31 is a so-called positive liquid crystal material, and the liquid crystal molecules 31a each have a dielectric constant $\varepsilon_{\parallel}$ in a longer axis direction that is greater than a dielectric constant $\varepsilon_{\perp}$ in a shorter axis direction thereof.

The medium 31 may contain a material other than the liquid crystal material. For example, the medium 31 may contain an additive improving the dispersibility of the shape-anisotropic particles 32. Such an additive may be a solvent putting the shape-anisotropic particles 32 into a paste (e.g., mineral spirit), a surfactant, a surface treatment agent for the shape-anisotropic particles 32, or the like. In the case where a certain type of additive is contained, the liquid crystal material may not be in a liquid crystal state (namely, may be in an isotropic state) in the medium 31.

The first substrate 10 and the second substrate 20 respectively include vertical alignment films 15 and 25 provided on the optical layer 30 side. The vertical alignment films 15 and 25 vertically align the liquid crystal molecules 31a contained in the medium 31 (liquid crystal material) at least in the vicinity of surfaces thereof. Namely, the vertical alignment films 15 and 25 have an alignment control force that aligns the liquid crystal molecules 31a generally vertically with respect to the substrate surfaces (substrate surfaces of the first substrate 10 and the second substrate 20). It is not absolutely necessary that both of the first substrate 10 and the second substrate 20 have such a vertical alignment film, but only one of the first substrate 10 and the second substrate 20 (e.g., only the first substrate 10) may have the vertical alignment film. The liquid crystal molecules 31a do not need to be vertically aligned in the entirety of the optical layer 30, but may be vertically aligned at least in the vicinity of the interface with the vertical alignment film. Namely, in a region other than the vicinity of the interface with the vertical alignment film, the liquid crystal molecules 31 do not need to be vertically aligned but may be horizontally aligned or may be tilted. Needless to say, as shown in FIG. 1, the liquid crystal molecules 31a may be vertically aligned in the entirety of the optical layer 30.

Hereinafter, with reference to FIG. 3 and FIG. 4, the reason why the alignment direction of the shape-anisotropic particles 32 is changed in accordance with the direction of the applied electric field will be described more specifically. FIG. 3 schematically shows the display device 110 when a transverse electric field is applied to the optical layer 30. FIG. 4 schematically shows the display device 110 when a vertical electric field is applied to the optical layer 30. FIG. 3 and FIG. 4 show a power supply 40 and switches 51 and 52 in order to represent which of the first electrode 11, the second electrode 12 and the third electrode 21 have a higher or lower level of potential. One of the switches, namely, the switch 51, controls the electric connection between the second electrode 12 and the power supply 40 to be on or off. The other switch, namely the switch 52, controls the electric connection between the second electrode 12 and the ground (GND) to be on or off.

In the state where no electric field is applied to the optical layer 30, as shown in FIG. 1, the liquid crystal molecules 31a are aligned generally vertically to the substrate surface of the first substrate 10 (namely, are in a vertical alignment state) by the alignment control force of the vertical alignment films 15 and 25. Because of this, the shape-anisotropic particles 32 are also in a vertical alignment state (namely, are aligned such that a longitudinal direction thereof is generally vertical to the substrate surface of the first substrate 10).

As shown in FIG. 3, when a predetermined voltage is applied between the first electrode 11 and the second electrode 12 (the switch 51 is off and the switch 52 is on), a transverse electric field is formed in the optical layer 30. In FIG. 3, the direction of the electric field is represented by arrow E. As is seen from FIG. 3, the direction E of the electric field is generally parallel to the substrate surface of the first substrate 10 (generally vertically to a thickness direction of the optical layer 30).

In this state, as shown in FIG. 3, the liquid crystal molecules 31a are aligned generally parallel to the substrate surface of the first substrate 10. The shape-anisotropic particles 32 (i.e., the longitudinal direction thereof) are also aligned generally parallel to the substrate surface of the first substrate 10 (namely, are in a horizontal alignment state). In this state, most of incident ambient light L is reflected by the shape-anisotropic particles 32 in the optical layer 30. Namely, the optical layer 30 is in a reflective state. In this state, white display is provided. A relatively low voltage may be applied, so that gray scale display is provided. In the vicinity of the second substrate 20, the shape-anisotropic particles 32 may be kept aligned vertically to the substrate surface. However, white display (gray scale display) is provided with no problem.

By contrast, as shown in FIG. 4, when a predetermined voltage is applied between the first and second electrodes 11 and 21 and the third electrode 21 (the switch 51 is on and the switch 52 is off), a vertical electric field is formed in the optical layer 30. In FIG. 4, the direction of the electric field is represented by the arrow E. As is seen from FIG. 4, the direction E of the electric field is generally vertically to the substrate surface of the first substrate 10 (generally parallel to the thickness direction of the optical layer 30).

In this state, as shown in FIG. 4, the liquid crystal molecules 31a are aligned generally vertically to the substrate surface of the first substrate 10. The shape-anisotropic particles 32 (i.e., the longitudinal direction thereof) are also aligned generally vertically to the substrate surface of the first substrate 10 (namely are in the vertical alignment state). In this state, most of the incident ambient light L is transmitted through the optical layer 30. Namely, the optical layer 30 is in a transparent state. The ambient light transmitted through the optical layer 30 is absorbed by the light absorption layer 14. Therefore, in this state, black display is provided.

The above-described change in the alignment direction of the shape-anisotropic particles 32 occurs by a dielectrophoretic force caused by an interaction of the electric field and the electric dipole moment induced by the electric field. Hereinafter, with reference to FIG. 5(a) and FIG. 5(b), this will be described more specifically. FIG. 5(a) and FIG. 5(b) show the optical layer 30 (the charge distribution and the electric force lines), immediately after the electric field applied to the optical layer 30 is changed from the transverse electric field to the vertical electric field and when a sufficiently long time passes thereafter, respectively.

In the case where the dielectric constant of the shape-anisotropic particles 32 and the dielectric constant of the medium 31 are different from each other, when the direction of the electric field applied to the optical layer 30 is changed, the electric force lines are significantly distorted as shown in FIG. 5(a). Therefore, as shown in FIG. 5(b), the shape-anisotropic particles 32 are rotated so as to minimize the energy.

In general, dielectrophoretic force $F_{dep}$ acting on particles dispersed in a medium is represented by the following expression (1), where the dielectric constant of the particles is $\varepsilon_p$, the dielectric constant of the medium is $\varepsilon_m$, the radius of the particles is a, and the intensity of the electric field is E. In expression (1), Re is an operator used to retrieve the real part. In this embodiment, the medium 31 is a liquid crystal material and has dielectric anisotropy. Namely, the dielectric constant r, in the longer axis direction and the dielectric constant $\varepsilon_\perp$ in the shorter axis direction of the liquid crystal molecules 31a are different from each other, and $\varepsilon_m = \varepsilon_{//} - \varepsilon_\perp = \Delta\varepsilon$.

[Expression 1]

$$F_{dep} = 2\pi\varepsilon_m \cdot a^3 \cdot \text{Re} \cdot \left(\frac{\varepsilon_p - \varepsilon_m}{\varepsilon_p + 2\varepsilon_m}\right) \cdot \nabla|E|^2 \qquad (1)$$

As is seen from the above description, the shape-anisotropic particles 32 may assume the vertical alignment state by the alignment control force of the vertical alignment films 15 and 25 and the support provided by the liquid crystal molecules 31a, in addition to the dielectrophoretic force, so that the vertical alignment operation and the horizontal alignment operation of the shape-anisotropic particles 32 may be switched to each other in a preferable manner.

As described above, the display device 110 in an embodiment according to the present invention provides display by switching the state of the shape-anisotropic particles 32 between the state where a vertical electric field is formed in the optical layer 30 and the state where a transverse electric field is formed in the optical layer 30. The change from the former to the latter, and the change from the latter to the former, are both caused by changing the direction of the applied electric field. Therefore, unlike the optical device in Patent Document 1, the display device 110 provides a sufficiently high response speed. In addition, the display device 110 does not need any polarization plate and thus realizes a high light utilization factor.

In the display device 110, a liquid crystal material is used for the medium 31. In general, a liquid crystal material has a specific resistance higher by several digits than the specific resistance of the medium described in Non-patent Document 1 as an example (propylene carbonate, etc.). Therefore, in the display device 110, in the state where the TFT is off after data is written to the pixel, off-leak via the medium 31 is prevented. This provides a high voltage holding ratio, and thus the display device 110 is driven by active matrix driving in a preferable manner. In addition, the leak current of the device 110 is low and thus power consumption is decreased. Power consumption P of the display device 110 is represented by the following expression (2), where the capacitance of the display panel 100 is C, the voltage applied to the optical layer 30 is V, the driving frequency is f, and the leak current is 1.

$$P = C \cdot V \cdot f + 1 \cdot V \qquad (2)$$

The first term of expression (2) may be referred to as a "pixel capacitance term", and the second term of expression (2) may be referred to as a leak current term. Namely, the power consumption P may be considered as being divided into the pixel capacitance component and the leak current component. When the specific resistance of the medium 31 is high, the leak current I is low. Therefore, as is apparent from expression (2), the power consumption P is decreased.

In the display device 110, the first substrate 10 and the second substrate 20 respectively include the vertical alignment films 15 and 25 on the optical layer 30 side. This prevents the shape-anisotropic particles 32 from being attached to the alignment films in the horizontal state. Therefore, when a vertical electric field is formed in the optical layer 30, most of the shape-anisotropic particles 32 assume the vertical alignment state. Thus, the display device 110 realizes a high contrast ratio. In addition, the alignment control force of the vertical alignment films 15 and 25 prevents the shape-anisotropic particles 32 from being precipitated by the weight thereof.

As described above, the display panel (optical device) 100 in an embodiment according to the present invention uses a liquid crystal material for the medium 31 and includes the vertical alignment films 15 and 25 in the first substrate 10 and the second substrate 20 on the optical layer 30 side. Because of such a structure, the display panel 100 is drivable by active matrix driving, consumes very low power, and realizes a high light utilization factor and a high contrast ratio.

Now, the results of investigations performed by the present inventor on optical devices in comparative examples will be described.

Figure 6:
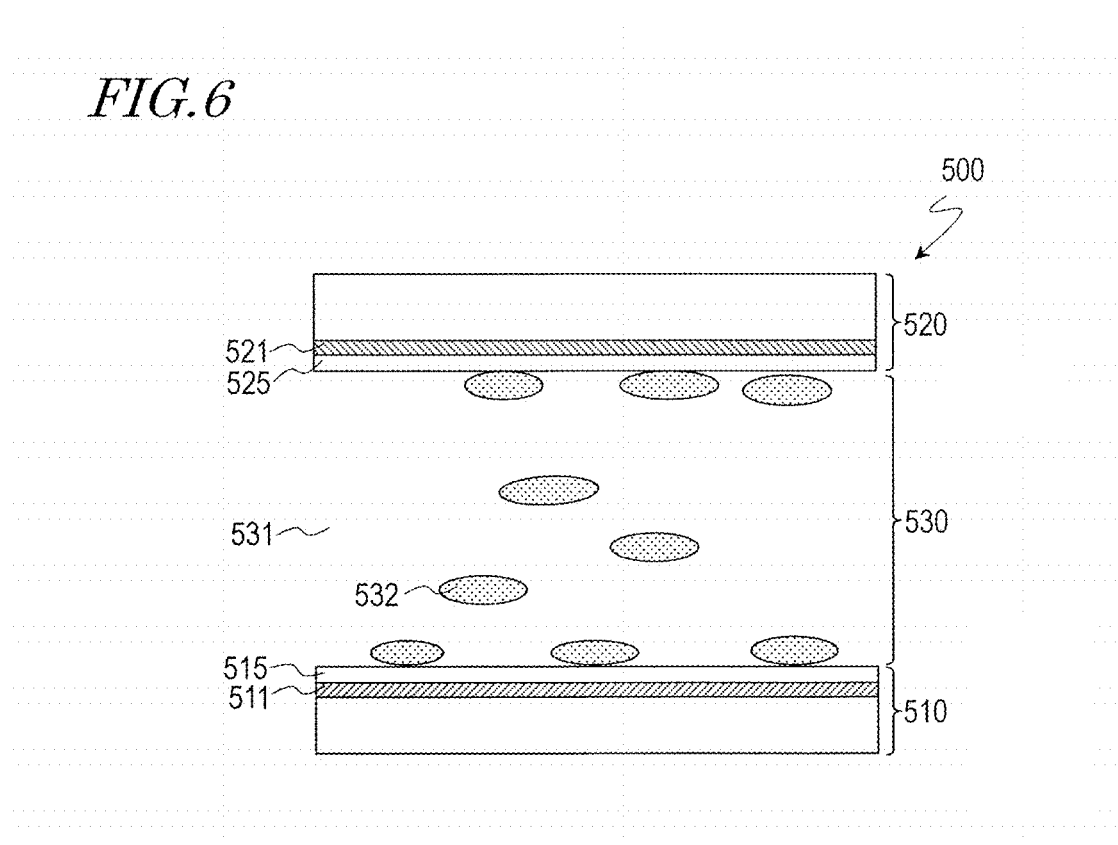
FIG. 6 is a cross-sectional view schematically showing an optical device 500 in comparative example 1.

First, an investigation was performed on an optical device 500 in comparative example 1 shown in FIG. 6.

As shown in FIG. 6, the optical device 500 in comparative example 1 includes a rear-side substrate 510, a front-side substrate 520, and an optical layer 530 provided between the rear-side substrate 510 and the front-side substrate 520.

The rear-side substrate 510 includes a rear-side electrode 511 and a horizontal alignment film 515 provided on the rear-side electrode 511. The front-side substrate 520 includes a front-side electrode 521 and a horizontal alignment film 525 provided on the front-side electrode 521.

The optical layer 530 includes a medium 531 and shape-anisotropic particles 532 dispersed in the medium 531. The medium 531 is a positive liquid crystal material.

Figure 7:
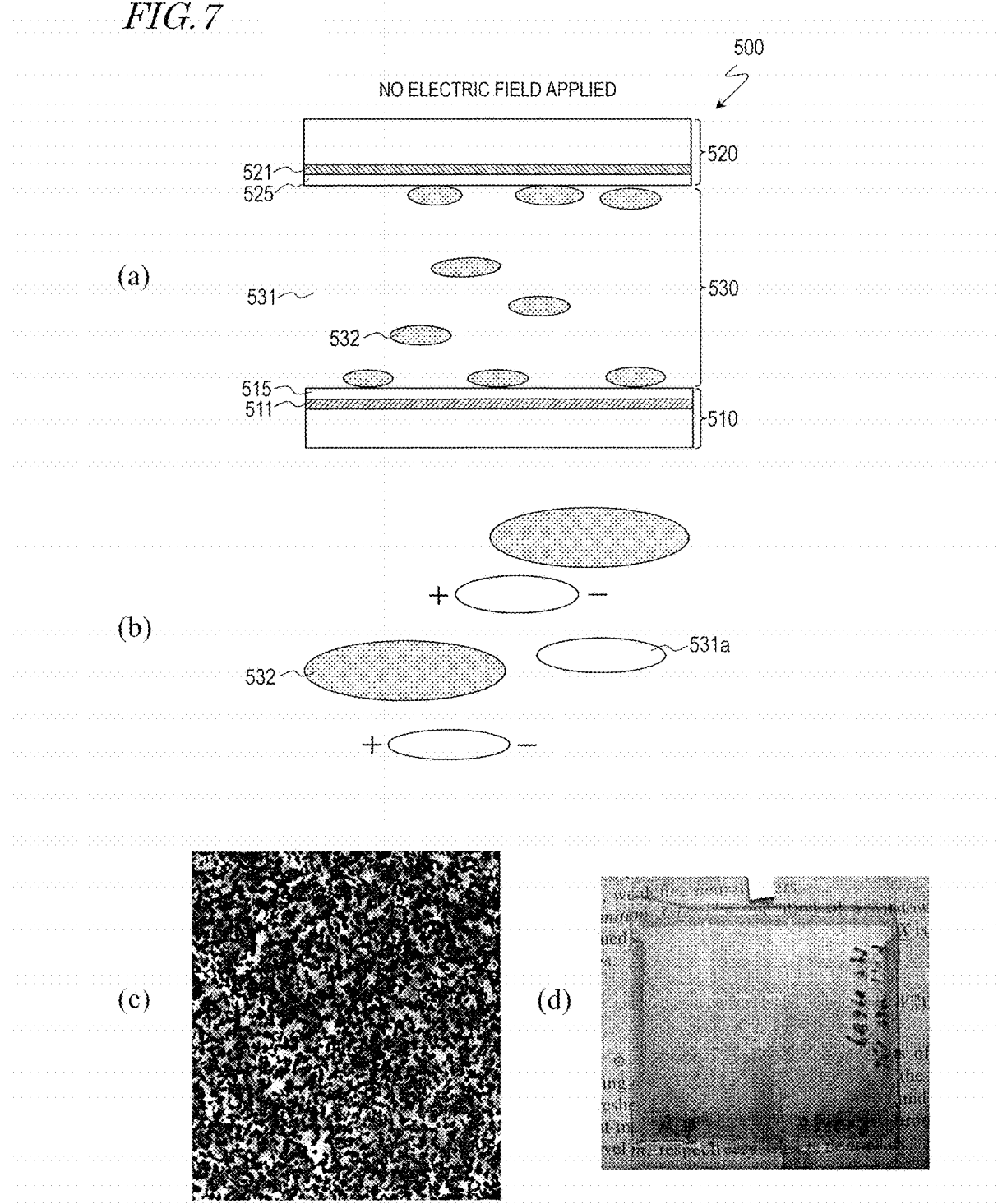
FIG. 7(a) schematically shows the optical device 500 in the state where no electric field is applied to an optical layer 530.
FIG. 7(b) shows the alignment direction of shape-anisotropic particles 532 and liquid crystal molecules 531a in this state.
FIG. 7(c) is an optical micrograph of the optical layer 530 in this state as seen in a direction of the normal to a substrate surface.
FIG. 7(d) shows the optical device 500 in this state.
Figure 8:
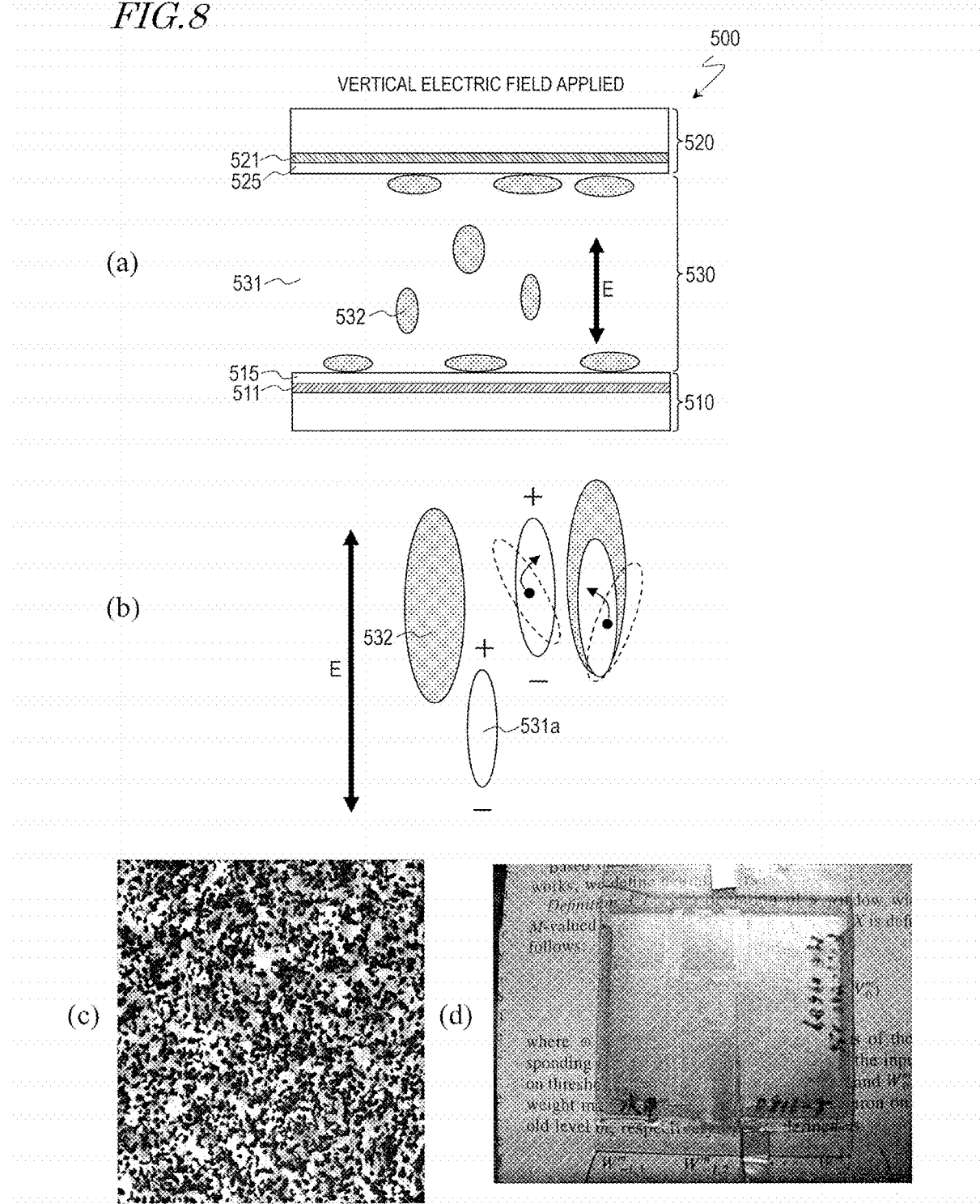
FIG. 8(a) schematically shows the optical device 500 in the state where a vertical electric field is applied to the optical layer 530.
FIG. 8(b) shows the alignment direction of the shape-anisotropic particles 532 and the liquid crystal molecules 531a in this state.
FIG. 8(c) is an optical micrograph of the optical layer 530 in this state as seen in a direction of the normal to the substrate surface.
FIG. 8(d) shows the optical device 500 in this state.

FIG. 7, FIG. 8 and FIG. 9 show the results of the investigation performed on the optical device 500 in comparative example 1.

FIG. 7(a) schematically shows the optical device 500 in the state where no electric field is applied to the optical layer 530. FIG. 7(b) shows the alignment direction of the shape-anisotropic particles 532 and liquid crystal molecules 531a in this state. FIG. 7(c) is an optical micrograph of the optical layer 530 (optical layer 530 of a panel produced on a trial basis) in this state as seen in a direction of the normal to the substrate surface. FIG. 7(d) shows the optical device (panel produced on a trial basis) 500 in this state.

In the state where no electric field is applied to the optical layer 530, the liquid crystal molecules 531a are in a horizontal alignment state as shown in FIG. 7(b) by the alignment control force of the horizontal alignment films 515 and 525. In this state, the shape-anisotropic particles 532 are also in a horizontal alignment state as shown in FIG. 7(a) and FIG. 7(b). It is also seen from FIG. 7(c) that the shape-anisotropic particles 532 are in the horizontal alignment state. It is seen from FIG. 7(d) that the optical layer 530 is in a reflective state.

FIG. 8(a) schematically shows the optical device 500 in the state where a vertical electric field is applied to the optical layer 530. FIG. 8 (b) shows the alignment direction of the shape-anisotropic particles 532 and the liquid crystal molecules 531a in this state. FIG. 8(c) is an optical micrograph of the optical layer 530 (optical layer 530 of the panel produced on a trial basis) in this state as seen in a direction of the normal to the substrate surface. FIG. 8(d) shows the optical device (panel produced on a trial basis) 500 in this state.

When a vertical electric field is applied to the optical layer 530 (namely, when a predetermined voltage is applied between the rear-side electrode 511 and the front-side electrode 521), the liquid crystal molecules 531a assume a vertical alignment state as shown in FIG. 8(b). At this point, the shape-anisotropic particles 532 located in the vicinity of the center of the optical layer 530 also assume a vertical alignment state as shown in FIG. 8(a) and FIG. 8(b). However, as shown in FIG. 8(a) and FIG. 8(b), the shape-anisotropic particles 532 in the vicinity of the horizontal alignment films 515 and 525 are kept attached to surfaces of the horizontal alignment films 515 and 525, and are not separated therefrom almost at all even when the level of the applied voltage is increased. According to the investigation performed by the present inventor, even when the applied voltage was increased to Vpp=700 [V], the attached shape-anisotropic particles 532 were not separated almost at all. It is also seen from FIG. 8(c) that the most of the shape-anisotropic particles 532 are kept in the horizontal alignment state. It is seen from FIG. 8(d) that the optical layer 530 is in the reflective state.

FIG. 9(a) schematically shows the optical device 500 in the state where the vertical electric field applied to the optical layer 530 is removed. FIG. 9(b) shows the alignment direction of the shape-anisotropic particles 532 and the liquid crystal molecules 531a in this state. FIG. 9(c) is an optical micrograph of the optical layer 530 (optical layer 530 of the panel produced on a trial basis) in this state as seen in a direction of the normal to the substrate surface. FIG. 9(d) shows the optical device (panel produced on a trial basis) 500 in this state.

When the vertical electric field applied to the optical layer 530 is removed, the liquid crystal molecules 531a assume the horizontal alignment state again as shown in FIG. 9(b). At this point, the shape-anisotropic particles 532 located in the vicinity of the center of the optical layer 530 also assume the horizontal alignment state as shown in FIG. 9(a) and FIG. 9(b). As shown in FIG. 9(a), the shape-anisotropic particles 532 in the vicinity of the horizontal alignment films 515 and 525 are kept in the horizontal alignment state. It is also seen from FIG. 9(c) that the shape-anisotropic particles 532 are kept in the horizontal alignment state. It is seen from FIG. 9(d) that the optical layer 530 is in the reflective state.

As described above, the optical device 500 in comparative example 1 includes many shape-anisotropic particles 532 that do not assume the vertical alignment state even when a vertical electric field is applied. Therefore, the optical layer 530 is kept in the reflective state regardless of presence/absence of the electric field. Thus, naturally, the optical device 500 does not realize a sufficiently high contrast ratio.

Figure 10:
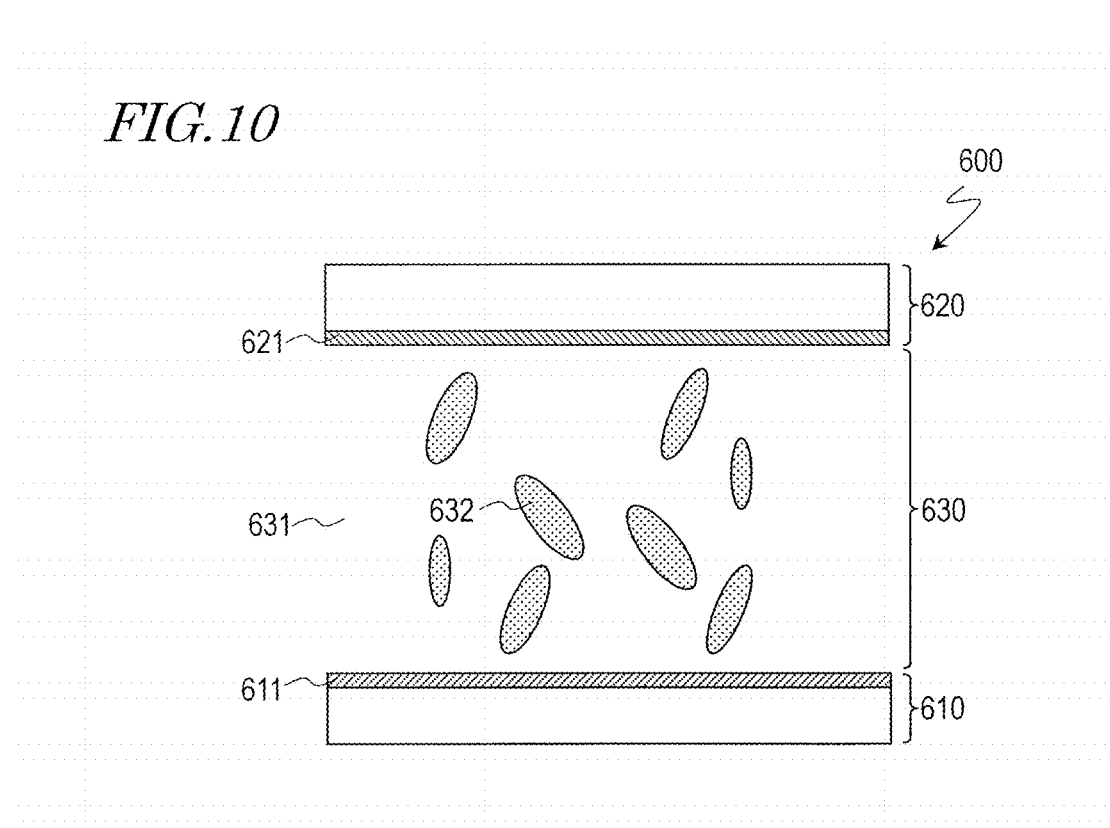
FIG. 10 is a cross-sectional view schematically showing an optical device 600 in comparative example 2.

Next, an investigation was performed on an optical device 600 in comparative example 2 shown in FIG. 10. The optical device 600 in comparative example 2 has a structure obtained as a result of the horizontal alignment films 515 and 525 being removed from the optical device 500 in comparative example 1.

As shown in FIG. 10, the optical device 600 in comparative example 2 includes a rear-side substrate 610, a front-side substrate 620, and an optical layer 630 provided between the rear-side substrate 610 and the front-side substrate 620.

The rear-side substrate 610 includes a rear-side electrode 611, and the front-side substrate 620 includes a front-side electrode 621. Neither the rear-side substrate 610 nor the front-side substrate 620 includes an alignment film.

The optical layer 630 includes a medium 631 and shape-anisotropic particles 632 dispersed in the medium 631. The medium 631 is a positive liquid crystal material.

Figure 11:
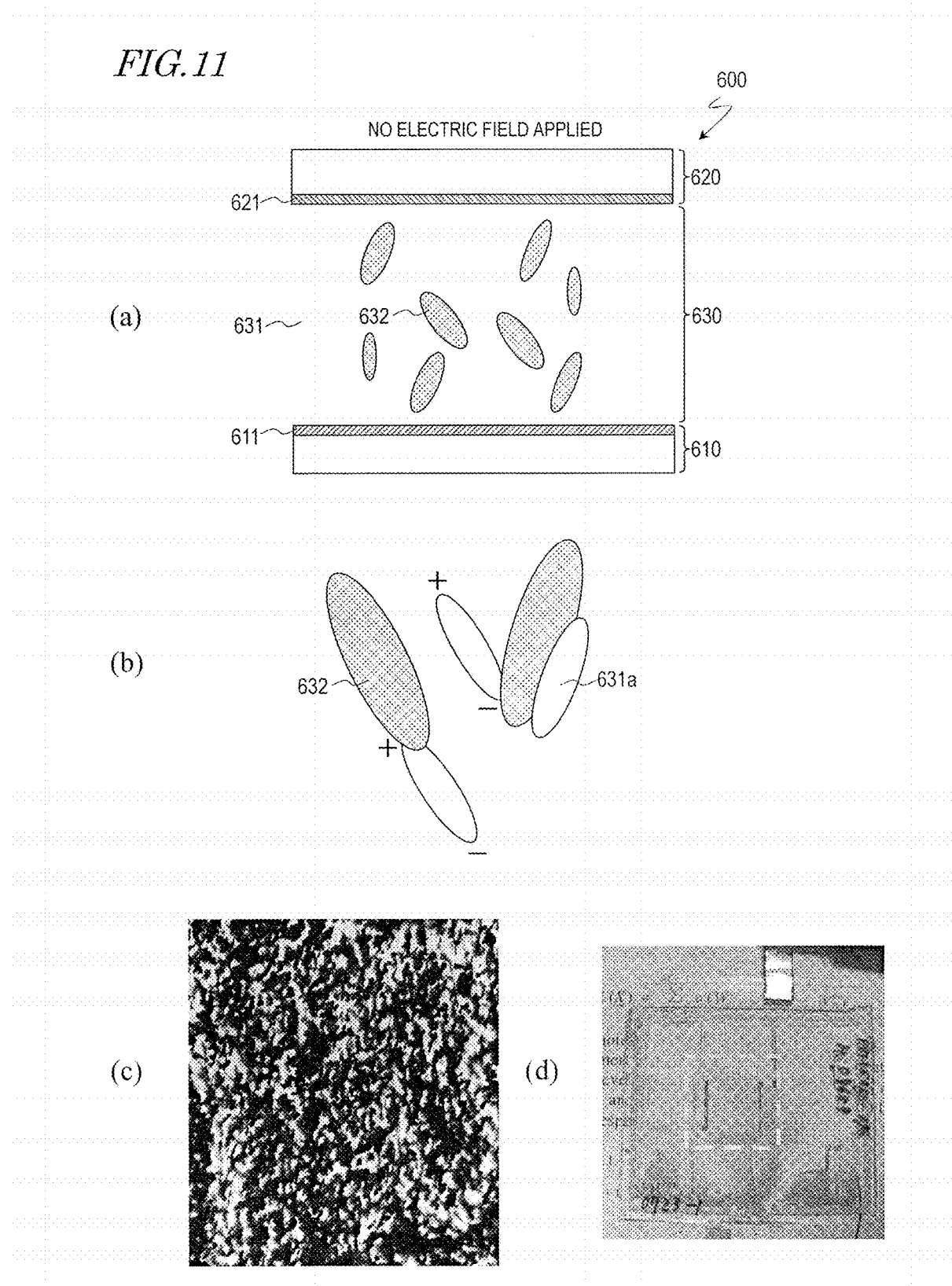
FIG. 11(a) schematically shows the optical device 600 in the state where no electric field is applied to an optical layer 630.
FIG. 11(b) shows the alignment directions of shape-anisotropic particles 632 and liquid crystal molecules 631a in this state.
FIG. 11(c) is an optical micrograph of the optical layer 630 in this state as seen in a direction of the normal to the substrate surface.
FIG. 11(d) shows the optical device 600 in this state.
Figure 12:
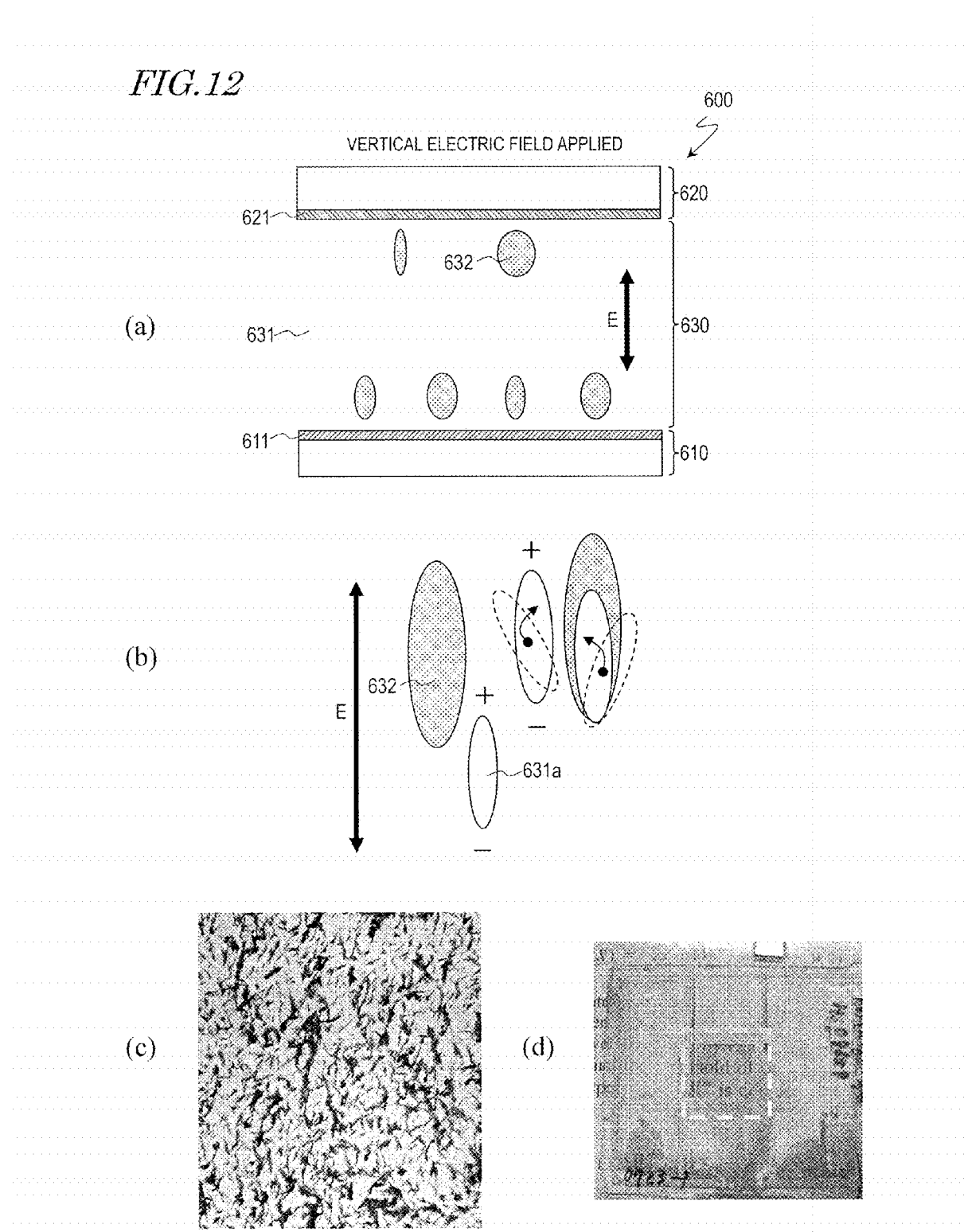
FIG. 12(a) schematically shows the optical device 600 in the state where a vertical electric field is applied to the optical layer 630.
FIG. 12(b) shows the alignment direction of the shape-anisotropic particles 632 and the liquid crystal molecules 631a in this state.
FIG. 12(c) is an optical micrograph of the optical layer 630 in this state as seen in a direction of the normal to the substrate surface.
FIG. 12(d) shows the optical device 600 in this state.
Figure 13:
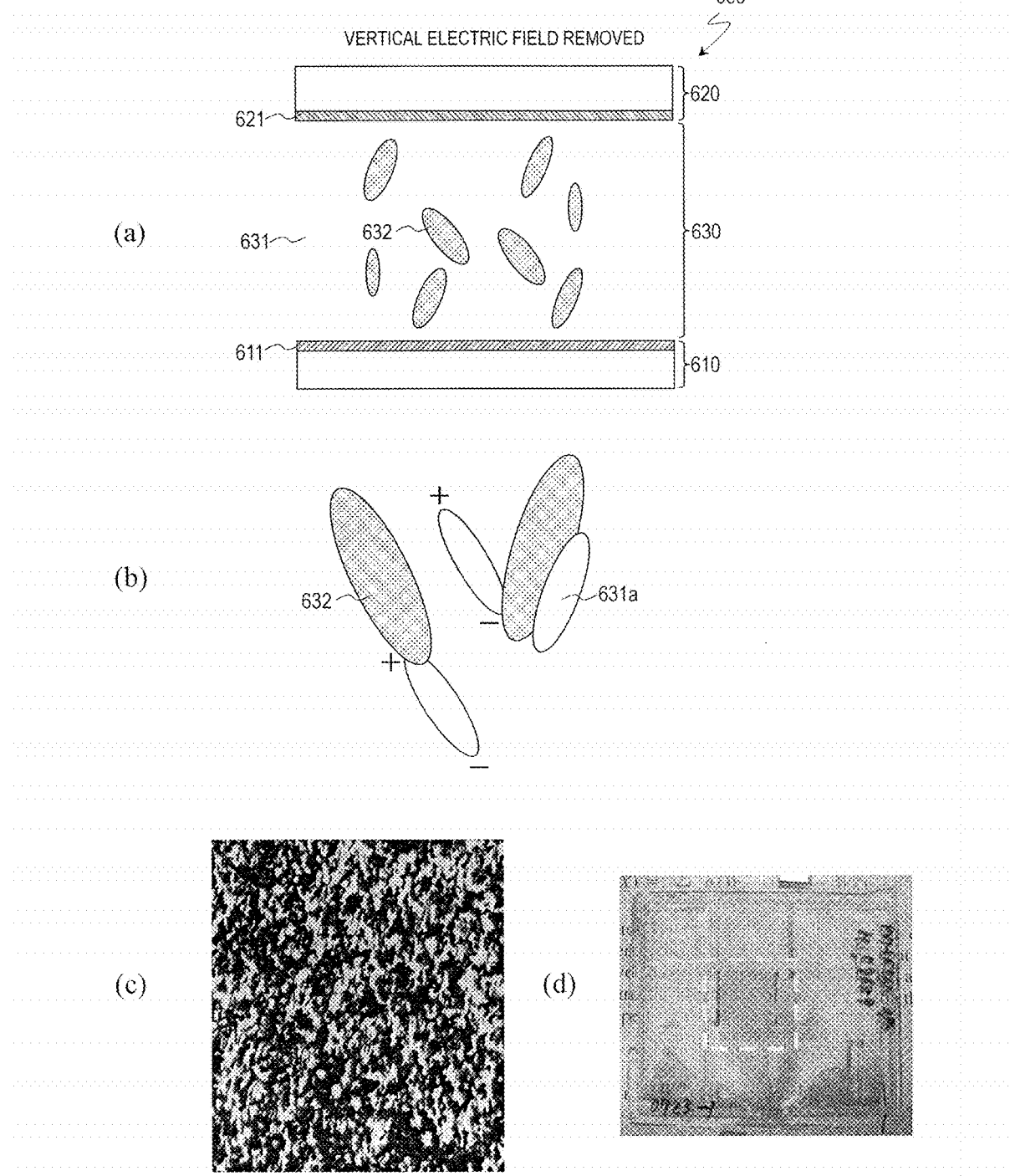
FIG. 13(a) schematically shows the optical device 600 in the state where the vertical electric field applied to the optical layer 630 is removed.
FIG. 13(b) shows the alignment directions of the shape-anisotropic particles 632 and the liquid crystal molecules 631a in this state.
FIG. 13(c) is an optical micrograph of the optical layer 630 in this state as seen in a direction of the normal to the substrate surface.
FIG. 13(d) shows the optical device 600 in this state.

FIG. 11, FIG. 12 and FIG. 13 show the results of the investigation performed on the optical device 600 in comparative example 2.

FIG. 11(a) schematically shows the optical device 600 in the state where no electric field is applied to the optical layer 630. FIG. 11(b) shows the alignment directions of the shape-anisotropic particles 632 and liquid crystal molecules 631a in this state. FIG. 11(c) is an optical micrograph of the optical layer 630 (optical layer 630 of a panel produced on a trial basis) in this state as seen in a direction of the normal to the substrate surface. FIG. 11(d) shows the optical device (panel produced on a trial basis) 600 in this state.

In the state where no electric field is applied to the optical layer 630, the liquid crystal molecules 631a are in a randomly aligned state as shown in FIG. 11(b) because no alignment control force is provided by any alignment film. In this state, the shape-anisotropic particles 632 are also in a randomly aligned state as shown in FIG. 11(a) and FIG. 11(b). It is also seen from FIG. 11(c) that the shape-anisotropic particles 632 are in the randomly aligned state. It is seen from FIG. 11(d) that the optical layer 630 is not in a transparent state.

FIG. 12(a) schematically shows the optical device 600 in the state where a vertical electric field is applied to the optical layer 630. FIG. 12(b) shows the alignment direction of the shape-anisotropic particles 632 and the liquid crystal molecules 631a in this state. FIG. 12(c) is an optical micrograph of the optical layer 630 (optical layer 630 of the panel produced on a trial basis) in this state as seen in a direction of the normal to the substrate surface. FIG. 12(d) shows the optical device (panel produced on a trial basis) 600 in this state.

When a vertical electric field is applied to the optical layer 630 (namely, when a predetermined voltage (e.g., AC voltage of Vpp=10 [V] at a duty ratio of 50% and at a frequency of 60 Hz) is applied between the rear-side electrode 611 and the front-side electrode 621), the liquid crystal molecules 631a assume a vertical alignment state as shown in FIG. 12(b). At this point, the shape-anisotropic particles 632 also assume a vertical alignment state as shown in FIG. 12(a) and FIG. 12(b). It is also seen from FIG. 12(c) that the shape-anisotropic particles 632 assume the vertical alignment state. It is seen from FIG. 12(d) that the optical layer 630 is in the transparent state.

FIG. 13(a) schematically shows the optical device 600 in the state where the vertical electric field applied to the optical layer 630 is removed. FIG. 13(b) shows the alignment directions of the shape-anisotropic particles 632 and the liquid crystal molecules 631a in this state. FIG. 13(c) is an optical micrograph of the optical layer 630 (optical layer 630 of the panel produced on a trial basis) in this state as seen in a direction of the normal to the substrate surface. FIG. 13(d) shows the optical device (panel produced on a trial basis) 600 in this state.

When the vertical electric field applied to the optical layer 630 is removed, the liquid crystal molecules 631a assume the randomly aligned state again as shown in FIG. 13(b). At this point, the shape-anisotropic particles 632 also assume the randomly aligned state again as shown in FIG. 13(a) and FIG. 13(b) very slowly by the weight thereof. It is also seen from FIG. 13(c) that the shape-anisotropic particles 632 are in the randomly aligned state. It is seen from FIG. 13(d) that the optical layer 630 is not in a sufficiently transparent state.

As described above, in the optical device 600 in comparative example 2, in the state where no electric field is applied to the optical layer 630, the shape-anisotropic particles 632 are in the randomly aligned state. Therefore, the optical device 600 does not provide a sufficiently high reflectance (or transmittance). For this reason, the optical device 600 does not realize a sufficiently high contrast ratio. It has also been found that the shape-anisotropic particles 632 move to the vicinity of an outer perimeter of the panel, which causes display non-uniformity.

Figure 14:
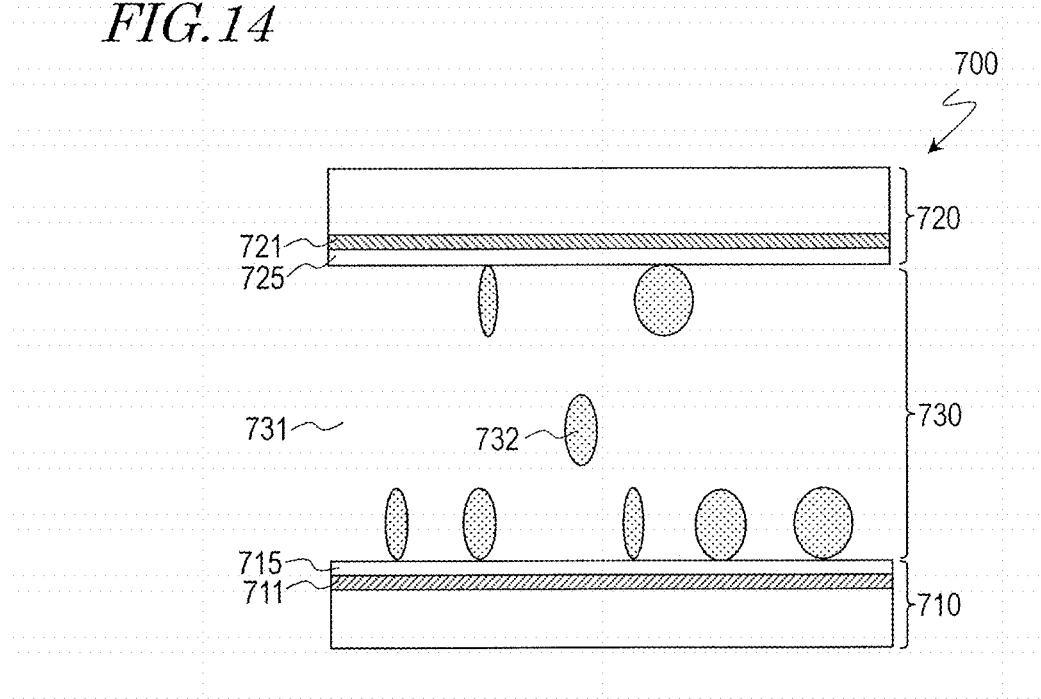
FIG. 14 is a cross-sectional view schematically showing an optical device 700 in comparative example 3.

Next, an investigation was performed on an optical device 700 in comparative example 3 shown in FIG. 14.

As shown in FIG. 14, the optical device 700 in comparative example 3 includes a rear-side substrate 710, a front-side substrate 720, and an optical layer 730 provided between the rear-side substrate 710 and the front-side substrate 720.

The rear-side substrate 710 includes a rear-side electrode 711 and a vertical alignment film 715 provided on the rear-side electrode 711. The front-side substrate 720 includes a front-side electrode 721 and a vertical alignment film 725 provided on the front-side electrode 721.

The optical layer 730 includes a medium 731 and shape-anisotropic particles 732 dispersed in the medium 731. The medium 731 is a positive liquid crystal material.

Figure 15:
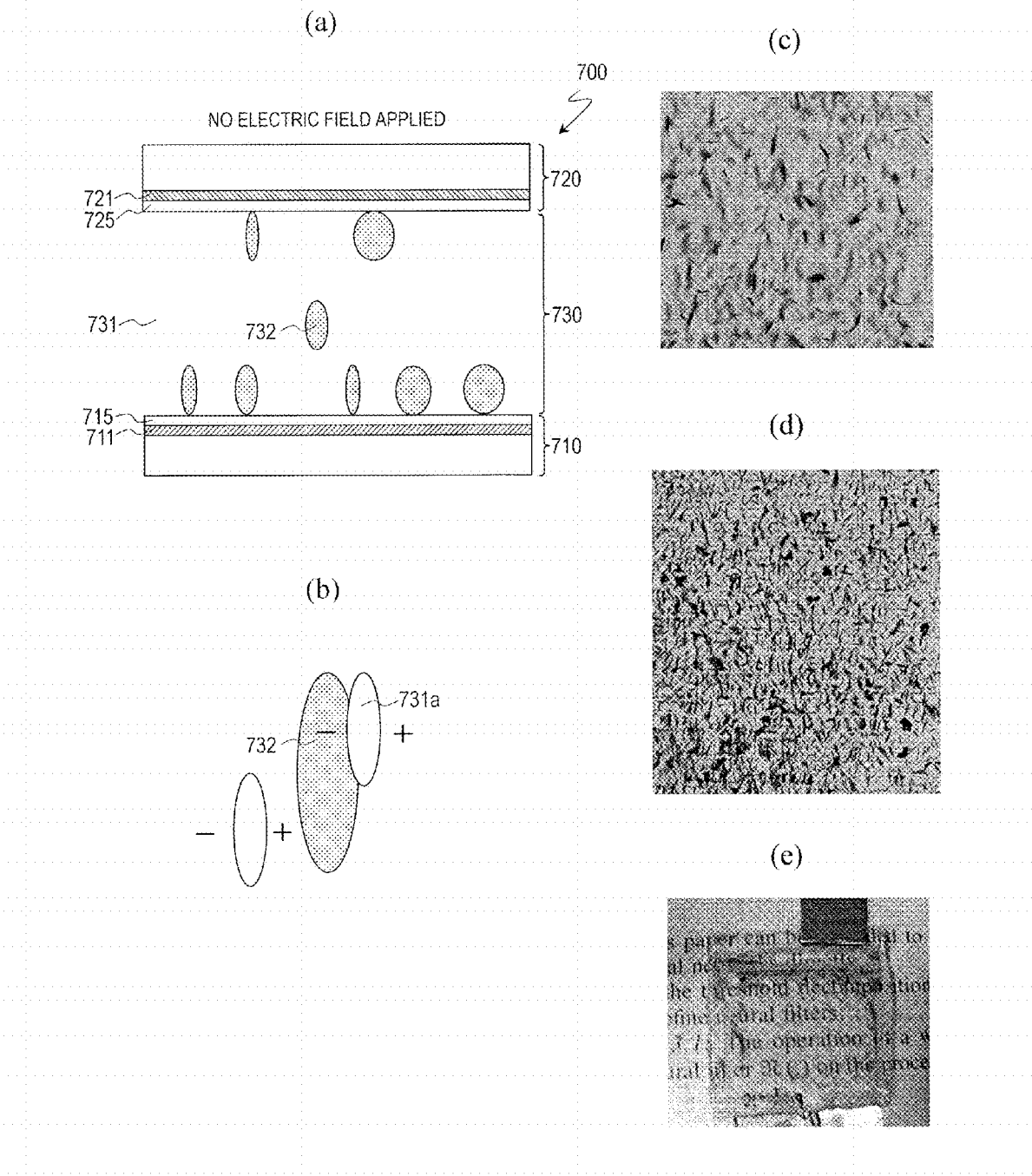
FIG. 15(a) schematically shows the optical device 700 in the state where no electric field is applied to an optical layer 730.
FIG. 15(b) shows the alignment direction of shape-anisotropic particles 732 and liquid crystal molecules 731a in this state.
FIG. 15(c) and FIG. 15(d) are each an optical micrograph of the optical layer 730 in this state as seen in a direction of the normal to the substrate surface.
FIG. 15(e) shows the optical device 700 in this state.
Figure 16:
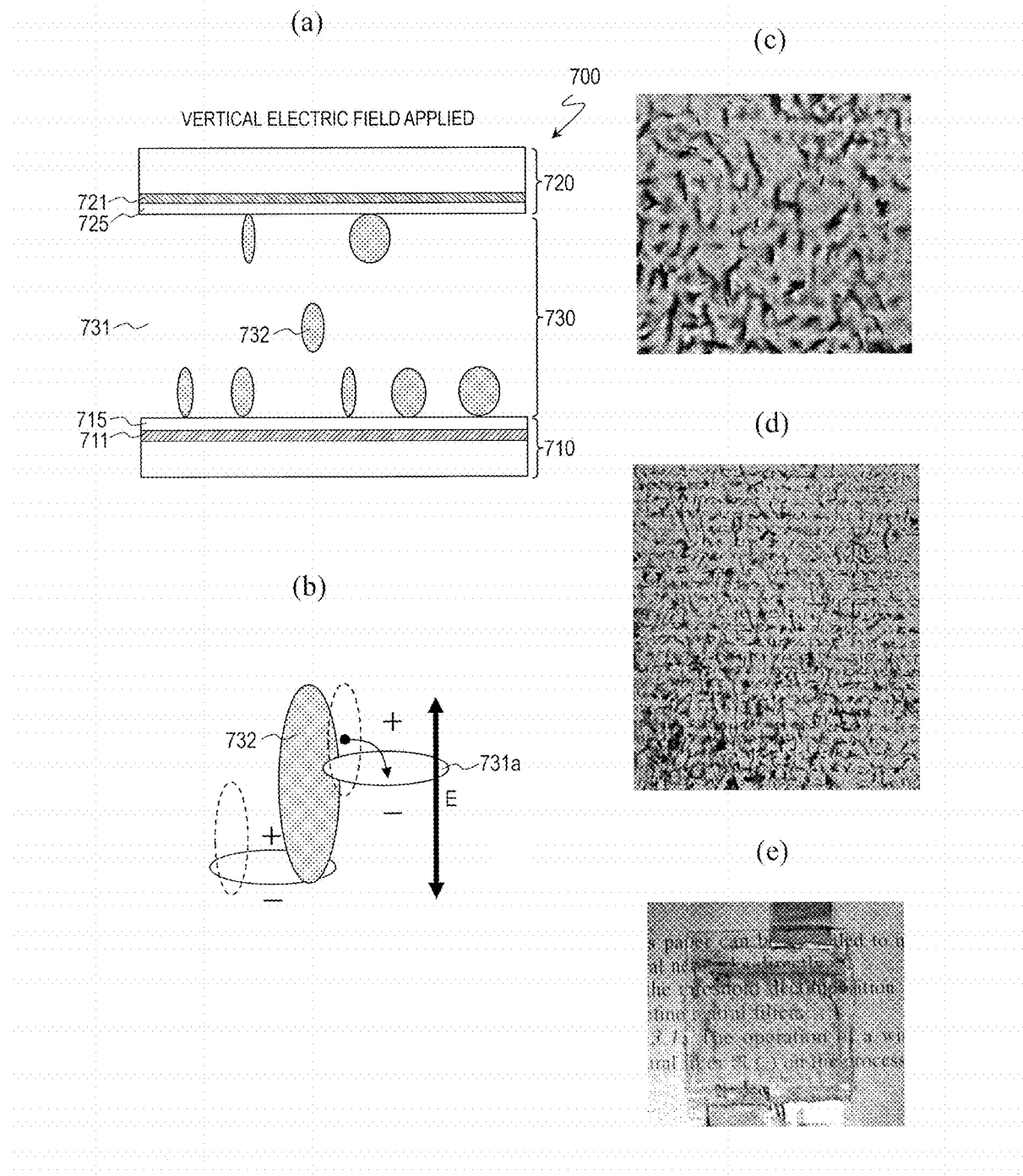
FIG. 16(a) schematically shows the optical device 700 in the state where a vertical electric field is applied to the optical layer 730.
FIG. 16(b) shows the alignment direction of the shape-anisotropic particles 732 and the liquid crystal molecules 731a in this state.
FIG. 16(c) and FIG. 16(d) are each an optical micrograph of the optical layer 730 in this state as seen in a direction of the normal to the substrate surface.
FIG. 16(e) shows the optical device 700 in this state.
Figure 17:
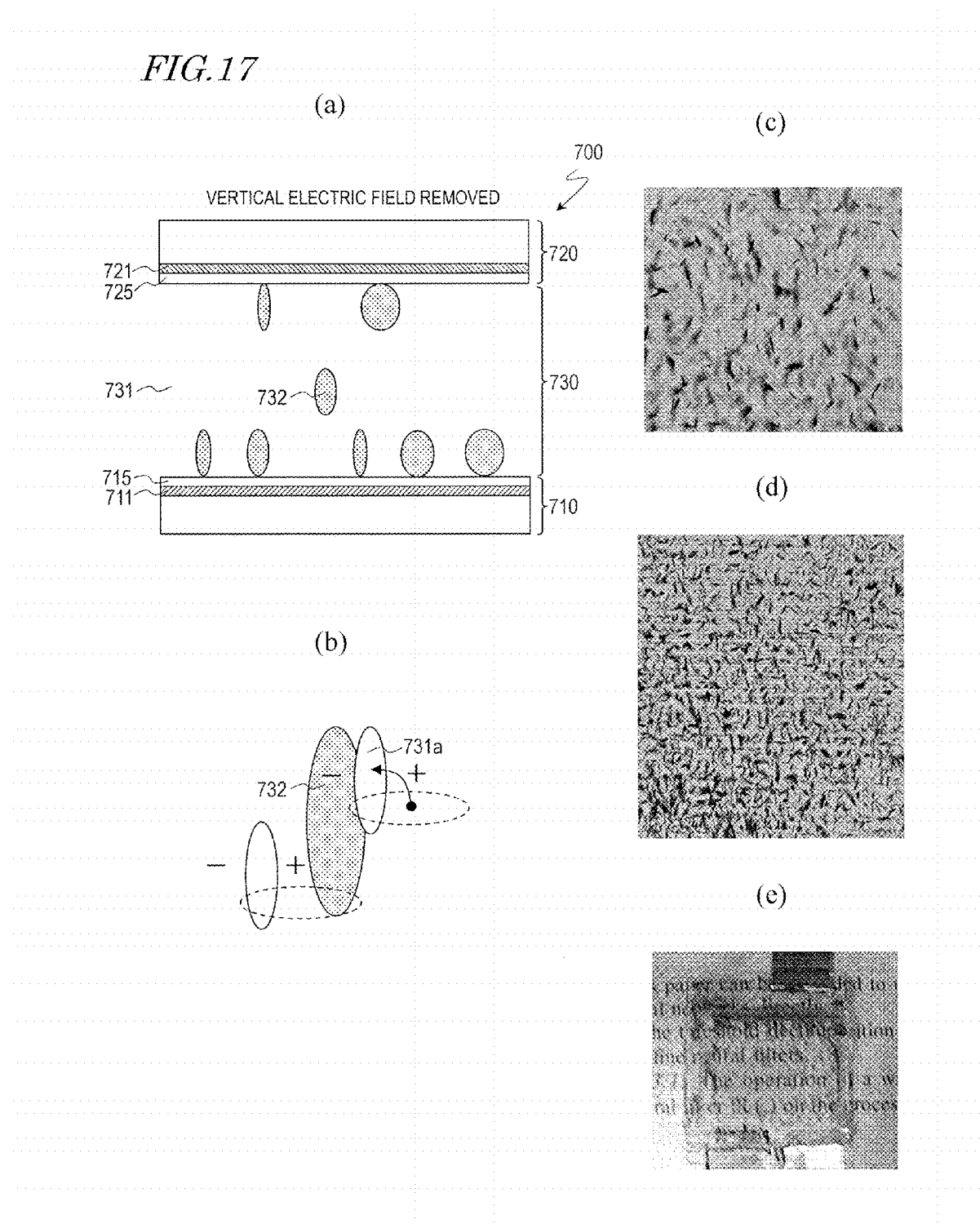
FIG. 17(a) schematically shows the optical device 700 in the state where the vertical electric field applied to the optical layer 730 is removed.
FIG. 17(b) shows the alignment direction of the shape-anisotropic particles 732 and the liquid crystal molecules 731a in this state.
FIG. 17(c) and FIG. 17(d) are each an optical micrograph of the optical layer 730 in this state as seen in a direction of the normal to the substrate surface.
FIG. 17(e) shows the optical device 700 in this state.

FIG. 15, FIG. 16 and FIG. 17 show the results of the investigation performed on the optical device 700 in comparative example 3.

FIG. 15(a) schematically shows the optical device 700 in the state where no electric field is applied to the optical layer 730. FIG. 15(b) shows the alignment direction of the shape-anisotropic particles 732 and liquid crystal molecules 731a in this state. FIG. 15(c) and FIG. 15(d) are each an optical micrograph of the optical layer 730 (optical layer 730 of a panel produced on a trial basis) in this state as seen in a direction of the normal to the substrate surface. FIG. 15(e) shows the optical device (panel produced on a trial basis) 700 in this state.

In the state where no electric field is applied to the optical layer 730, the liquid crystal molecules 731a are in a vertical alignment state as shown in FIG. 15(b) by the alignment control force of the vertical alignment films 715 and 725. In this state, the shape-anisotropic particles 732 are also in a vertical alignment state as shown in FIG. 15(a) and FIG. 15(b). It is also seen from FIG. 15(c) and FIG. 15(d) that the shape-anisotropic particles 532 are in the vertical alignment state. It is seen from FIG. 15(e) that the optical layer 730 is in a transparent state.

FIG. 16(a) schematically shows the optical device 700 in the state where a vertical electric field is applied to the optical layer 730. FIG. 16(b) shows the alignment directions of the shape-anisotropic particles 732 and the liquid crystal molecules 731a in this state. FIG. 16(c) and FIG. 16(d) are each an optical micrograph of the optical layer 730 (optical layer 730 of the panel produced on a trial basis) in this state as seen in a direction of the normal to the substrate surface. FIG. 16(e) shows the optical device (panel produced on a trial basis) 700 in this state.

When a vertical electric field is applied to the optical layer 730 (namely, when a predetermined voltage is applied between the rear-side electrode 711 and the front-side electrode 721), the liquid crystal molecules 731a assume a horizontal alignment state as shown in FIG. 16(b). At this point, the shape-anisotropic particles 732 are kept in the vertical alignment state as shown in FIG. 16(a) and FIG. 16(b). Namely, the shape-anisotropic particles 732 do not follow the change in the alignment direction of the liquid crystal molecules 731a, but are aligned in the direction of the electric field. It is also seen from FIG. 16(c) and FIG. 16(d) that the shape-anisotropic particles 732 are kept in the vertical alignment state. It is seen from FIG. 16(e) that the optical layer 730 is kept in the transparent state.

FIG. 17(a) schematically shows the optical device 700 in the state where the vertical electric field applied to the optical layer 730 is removed. FIG. 17(b) shows the alignment direction of the shape-anisotropic particles 732 and the liquid crystal molecules 731a in this state. FIG. 17(c) and FIG. 17(d) are each an optical micrograph of the optical layer 730 (optical layer 730 of the panel produced on a trial basis) in this state as seen in a direction of the normal to the substrate surface. FIG. 17(e) shows the optical device (panel produced on a trial basis) 700 in this state.

When the vertical electric field applied to the optical layer 730 is removed, the liquid crystal molecules 731a assume the vertical alignment state again as shown in FIG. 17(b). At this point, the shape-anisotropic particles 732 are kept in the vertical alignment state as shown in FIG. 17(a) and FIG. 17(b). It is also seen from FIG. 17(c) and FIG. 17(d) that the shape-anisotropic particles 732 are kept in the vertical alignment state. It is seen from FIG. 17(e) that the optical layer 730 is kept in the transparent state.

As described above, in the optical device 700 in comparative example 3, the alignment state of the shape-anisotropic particles 732 is not changed between in the state where a vertical electric field is applied and in the state where no electric field is applied. Therefore, the optical layer 730 is kept in the transparent state. This makes it impossible to switch the state of the optical layer 730 between the transparent state and the reflective state (naturally, the optical device 700 does not realize a sufficiently high contrast ratio).

Figure 18:
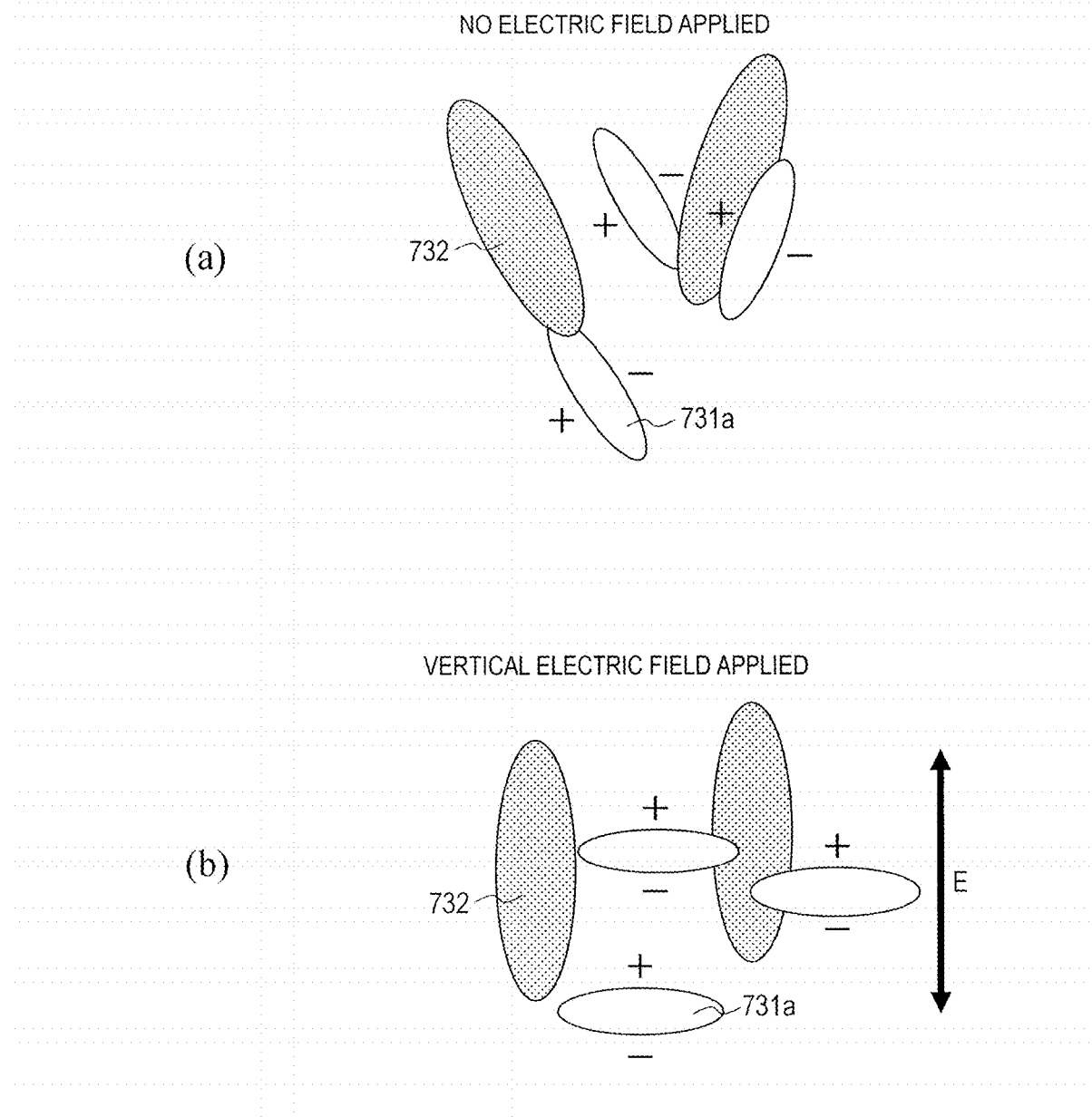
FIG. 18(a) and FIG. 18(b) show the alignment directions of the shape-anisotropic particles 732 and the liquid crystal molecules 731a in the case where vertical alignment films 15 and 25 in the optical device 700 have a weak alignment control force.

In the case where the alignment control force of the vertical alignment films 715 and 725 is weak in the optical device 700 in comparative example 3, the following occurs. In the state where no electric field is applied to the optical layer 730, the liquid crystal molecules 731a and the shape-anisotropic particles 732 are in an incompletely vertical alignment state as shown in FIG. 18(a). Therefore, in accordance with absence/presence of the electric field, the alignment state shown in FIG. 18(a), and the alignment state shown in FIG. 18(b) in which the liquid crystal molecules 731a are horizontally aligned and the shape-anisotropic particles 732 are vertically aligned, are switched to each other. Thus, in this case also, the optical device 700 does not provide a sufficiently high contrast ratio.

As described above, none of the optical devices 500, 600 and 700 in comparative examples 1, 2 and 3 provides a sufficiently high contrast ratio.

By contrast, the optical device 100 (display device 110) in an embodiment according to the present invention switches the state of the shape-anisotropic particles 32 (between the vertical alignment state and the horizontal alignment state) in a preferable manner, and thus provides a sufficiently high contrast ratio.

The studies made by the present inventors have found that in order to switch the state of the shape-anisotropic particles 32 in a preferable manner, it is preferable to combine the following three alignment control forces (first, second and third alignment control forces).

The first alignment control force is an alignment control force caused by a dielectrophoretic force. As described above, when an electric field is applied to the optical layer 30, the shape-anisotropic particles 32 are aligned in the direction of the electric field (namely, in the case of a vertical electric field, aligned in the vertical direction, and in the case of a transverse electric field, aligned in the horizontal direction).

The second alignment control force is an alignment control force caused by the alignment order of the liquid crystal material. The shape-anisotropic particles 32 tend to be aligned parallel to the alignment direction of the liquid crystal molecules 31a. Therefore, the change in the alignment direction of the shape-anisotropic particles 32 is supported by the liquid crystal molecules 31a.

The third alignment control force is an alignment control force of the vertical alignment film. An alignment film has a stronger tendency of vertically aligning the liquid crystal molecules as having a smaller surface energy. An alignment film having a strong tendency of vertically aligning the liquid crystal molecules (namely, an alignment film having a sufficiently small surface energy) makes it difficult for the shape-anisotropic particles 32 to be attached to the substrate. In the case where the medium 31 is a liquid crystal material, the alignment control force caused by the alignment order of the liquid crystal material is also usable. Therefore, the shape-anisotropic particles 32 are prevented from being attached more effectively.

Instead of the vertical alignment films 15 and 25, a film that does not align the liquid crystal molecules 31a contained in the medium 31 vertically in a strict sense may be used. For example, liquid crystal molecules in a positive liquid crystal material having high dielectric anisotropy may be difficult to be aligned completely vertically even when an alignment film generally called a "vertical alignment film" is used. Even in the case where such a liquid crystal material is used, if a film having a sufficiently small surface energy is used, the shape-anisotropic particles 32 are sufficiently suppressed from being attached. Specifically, in the case where a film having a surface energy of 40 mJ/m$^2$ or less (preferably, 37 mJ/m$^2$ or less) is provided, the shape-anisotropic particles 32 are sufficiently prevented from being attached. A liquid crystal material exhibits an intermediate property between hydrophobicity and hydrophilicity. As the surface energy of the film is smaller, the contact angle of the liquid crystal material with the film is increased. Therefore, whether the surface energy of the film is large or small (namely, whether the vertical alignment characteristic is high or low) may be defined by the contact angle of the film with pure water or $CH_2I_2$. The investigation performed by the present inventor has found that in the case where a film having a contact angle with pure water of 75 degrees or greater or a film having a contact angle with $CH_2I_2$ of 40 degrees or greater is provided, the shape-anisotropic particles 32 are sufficiently suppressed from being attached. The horizontal alignment films 515 and 525 included in the optical device 500 in comparative example 1 have a surface energy exceeding 40 mJ/m$^2$ and have a contact angle with pure water that is less than 75 degrees and a contact angle with $CH_2I_2$ that is less than 40 degrees. Therefore, the horizontal alignment films 515 and 525 do not suppress the shape-anisotropic particles 532 from being attached.

Thus, in the case where at least one of the first substrate 10 and the second substrate 20 includes, on the optical layer 30 side, a film (alignment film) having a surface energy of 40 mJ/m$^2$ or less, or having a contact angle with pure water of 75 degrees or greater or a contact angle with $CH_2I_2$ of 40 degrees or greater, the shape-anisotropic particles 32 are suppressed from being attached to the substrate, and thus the switching operation of the state of the shape-anisotropic particles 32 is performed in a preferable manner.

The surface energy of a film may be measured by, for example, automatic contact angle meter CA-W produced by Kyowa Interface Science Co., Ltd. The contact angle of the film with pure water or $CH_2I_2$ may also be measured by the above-mentioned automatic contact angle meter CA-W.

Needless to say, like in the display device 110 in an embodiment according to the present invention, at least one of the first substrate 10 and the second substrate 20 may include the vertical alignment film 15 (or 25) on the optical layer 30 side. Herein, the term "vertical alignment film" refers to a film used to vertically align liquid crystal molecules in a liquid crystal material (positive or negative) usable in a liquid crystal display device of an FFS (Fringe Field Switching) mode or a VA (Vertical Alignment) mode. It is preferable that the vertical alignment film provides a contrast ratio of 5 or greater between the time of observation in a crossed Nicols state and the time of observation in a parallel Nicols state realized by use of a pair of polarization plates. For example, as described below, a panel produced on a trial basis by use of a polyamic vertical alignment film as the vertical alignment film and by use of a fluorine-containing liquid crystal composition having positive dielectric anisotropy as the liquid crystal material provided a contrast ratio of 250, 30, 15 and 5.7 when the cell thickness (thickness of the optical layer) was 3 μm, 10 μm, 20 μm and 50 μm, respectively. As the cell thickness is increased, the contrast ratio is decreased. This is considered to occur because as the cell thickness is increased, the distance between the upper and lower alignment films is increased and thus the alignment control force on the entirety of the optical layer is decreased and the vertical alignment state of the liquid crystal molecules is made slightly unstable. However, even in such a state, the alignment order was maintained as a whole.

Now, the results of investigations performed by the present inventor on optical devices in examples will be described.

Figure 19:
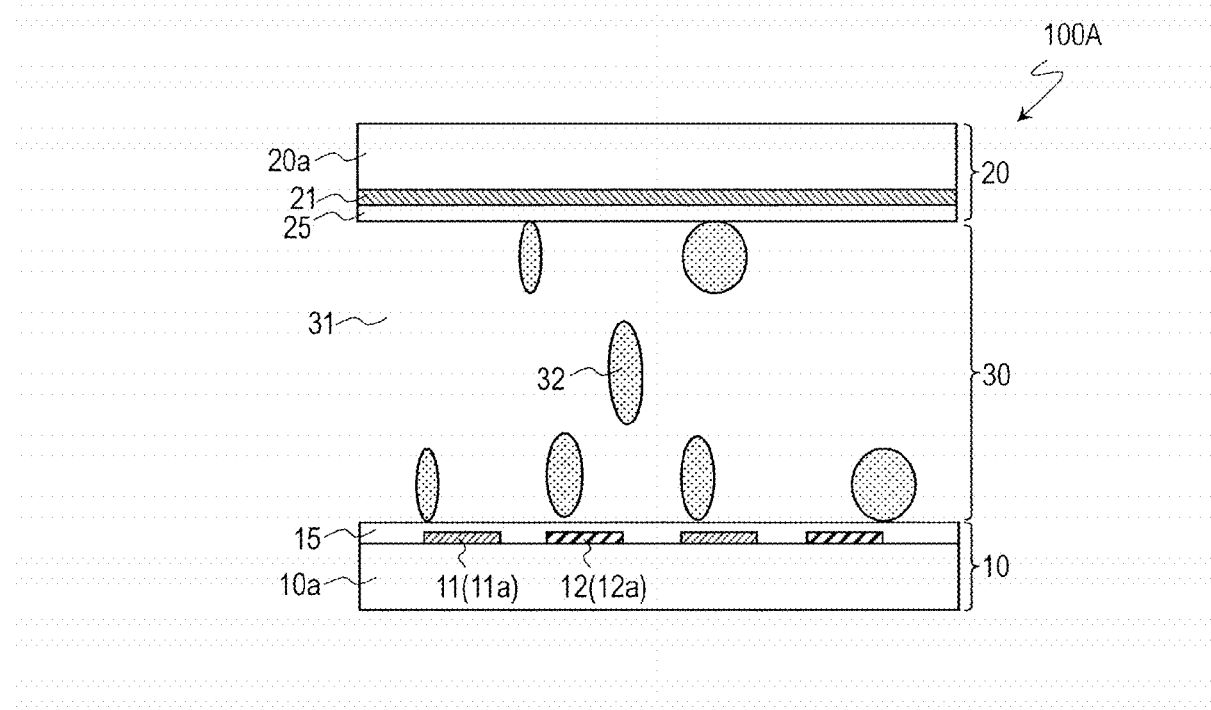
FIG. 19 is a cross-sectional view schematically showing an optical device 100A in example 1.
Figure 20:
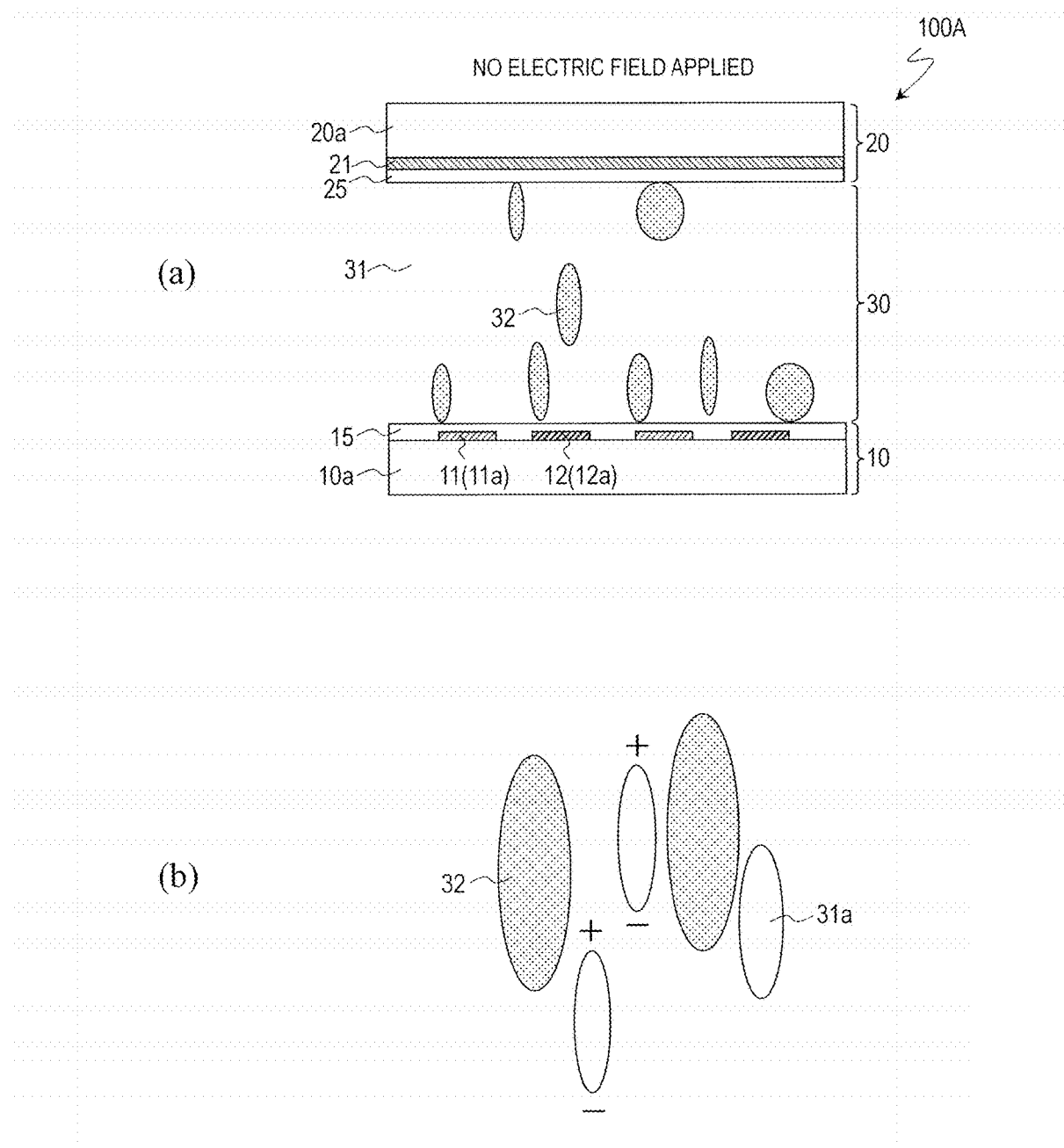
FIG. 20(a) schematically shows the optical device 100A in the state where no electric field is applied to an optical layer 30.
FIG. 20(b) shows the alignment direction of shape-anisotropic particles 32 and liquid crystal molecules 31a in this state.
Figure 21:
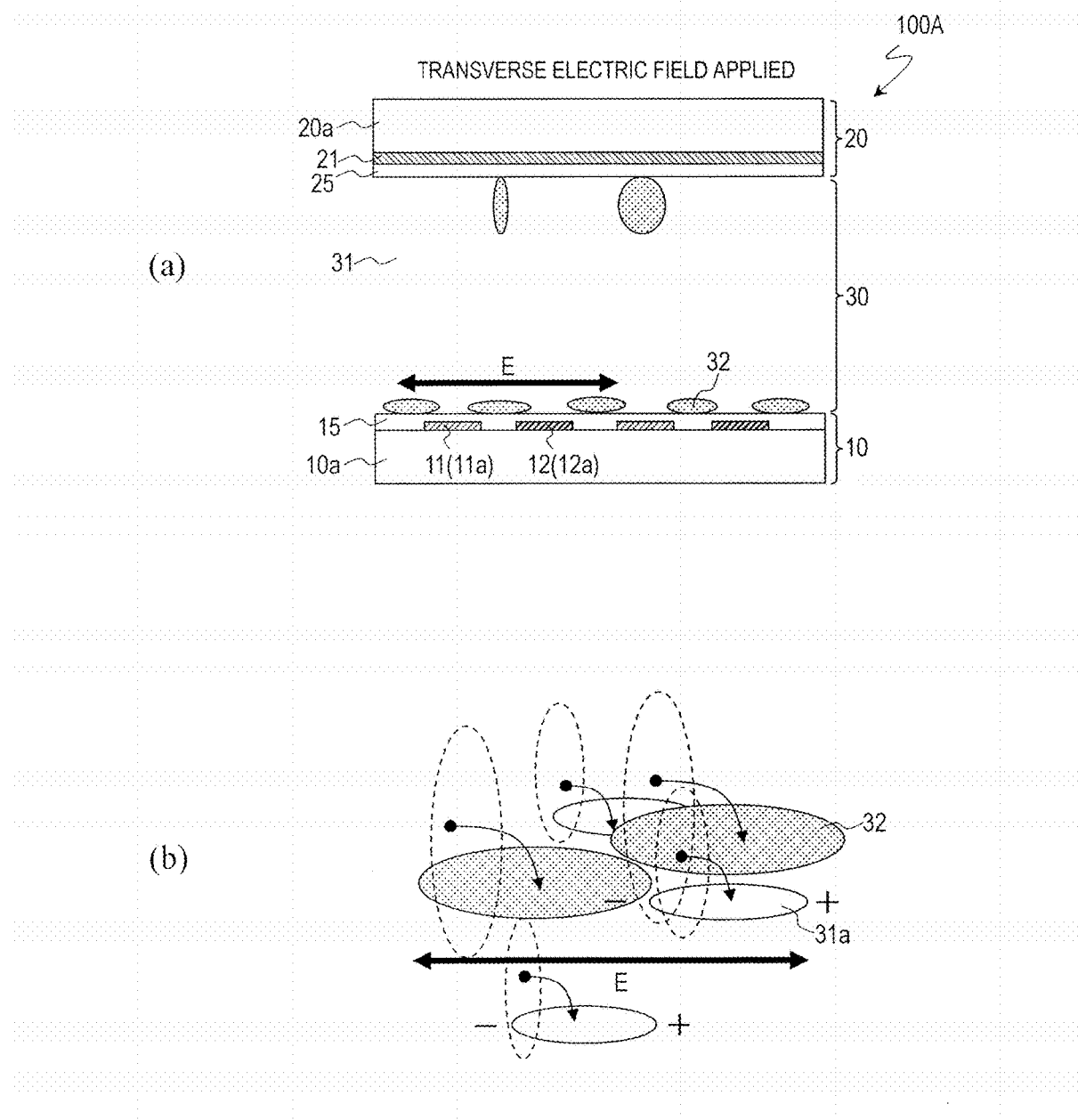
FIG. 21(a) schematically shows the optical device 100A in the state where a transverse electric field is applied to the optical layer 30.
FIG. 21(b) shows the alignment direction of the shape-anisotropic particles 32 and the liquid crystal molecules 31a in this state.
Figure 22:
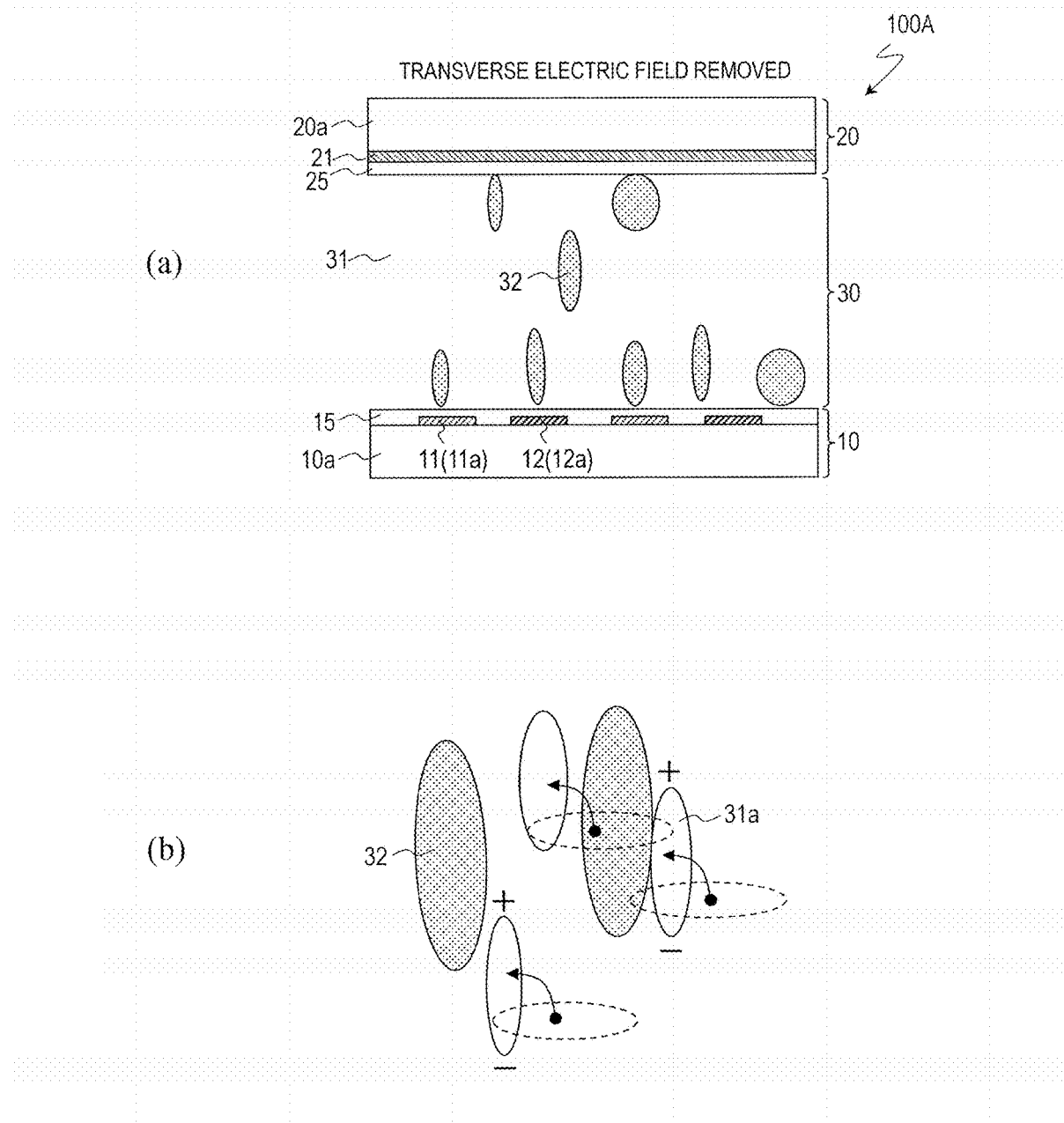
FIG. 22(a) schematically shows the optical device 100A in the state where the transverse electric field applied to the optical layer 30 is removed.
FIG. 22(b) shows the alignment direction of the shape-anisotropic particles 32 and the liquid crystal molecules 31a in this state.
Figure 23:
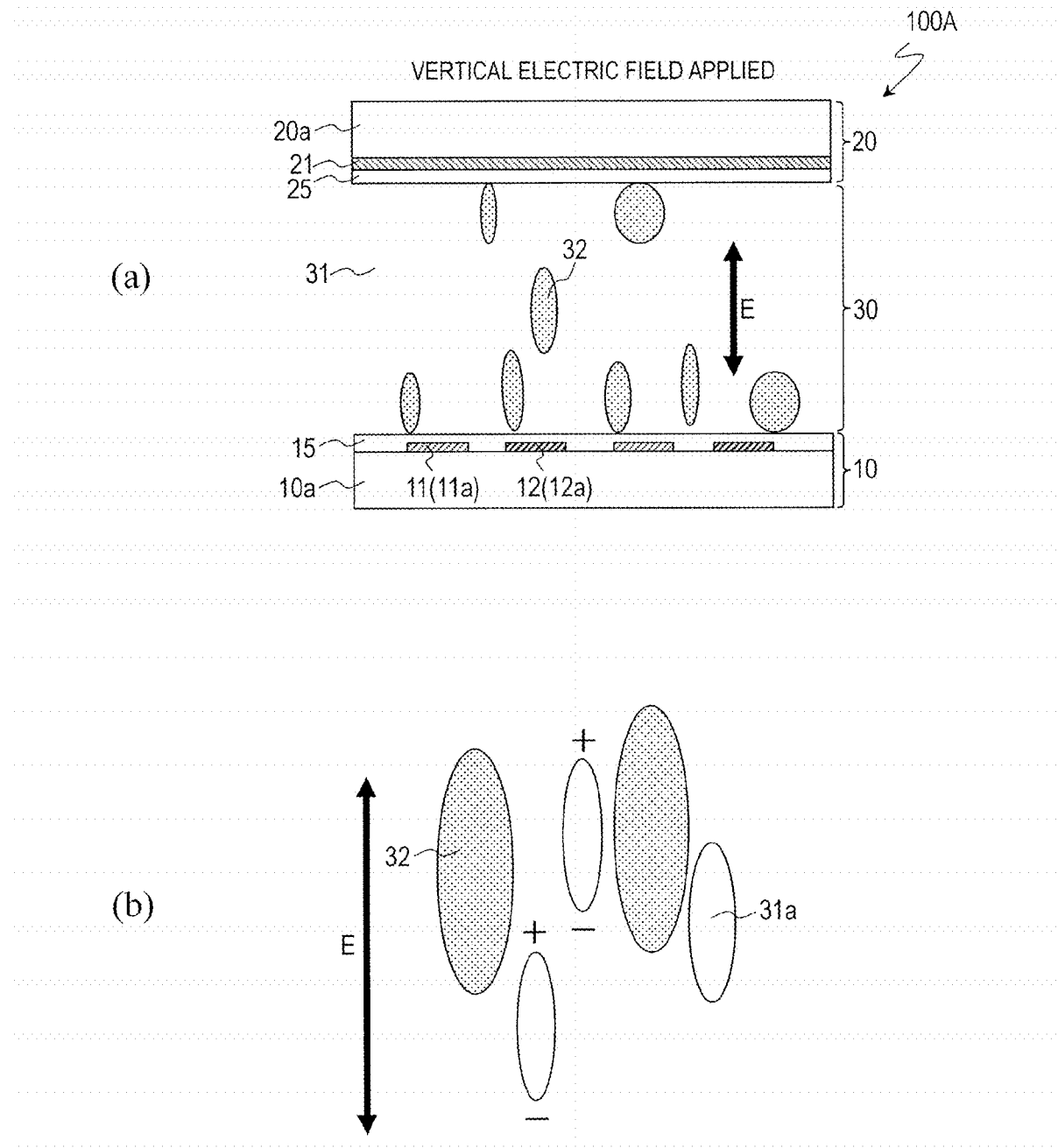
FIG. 23(a) schematically shows the optical device 100A in the state where a vertical electric field is applied to the optical layer 30.
FIG. 23(b) shows the alignment direction of the shape-anisotropic particles 32 and the liquid crystal molecules 31a in this state.
Figure 24:
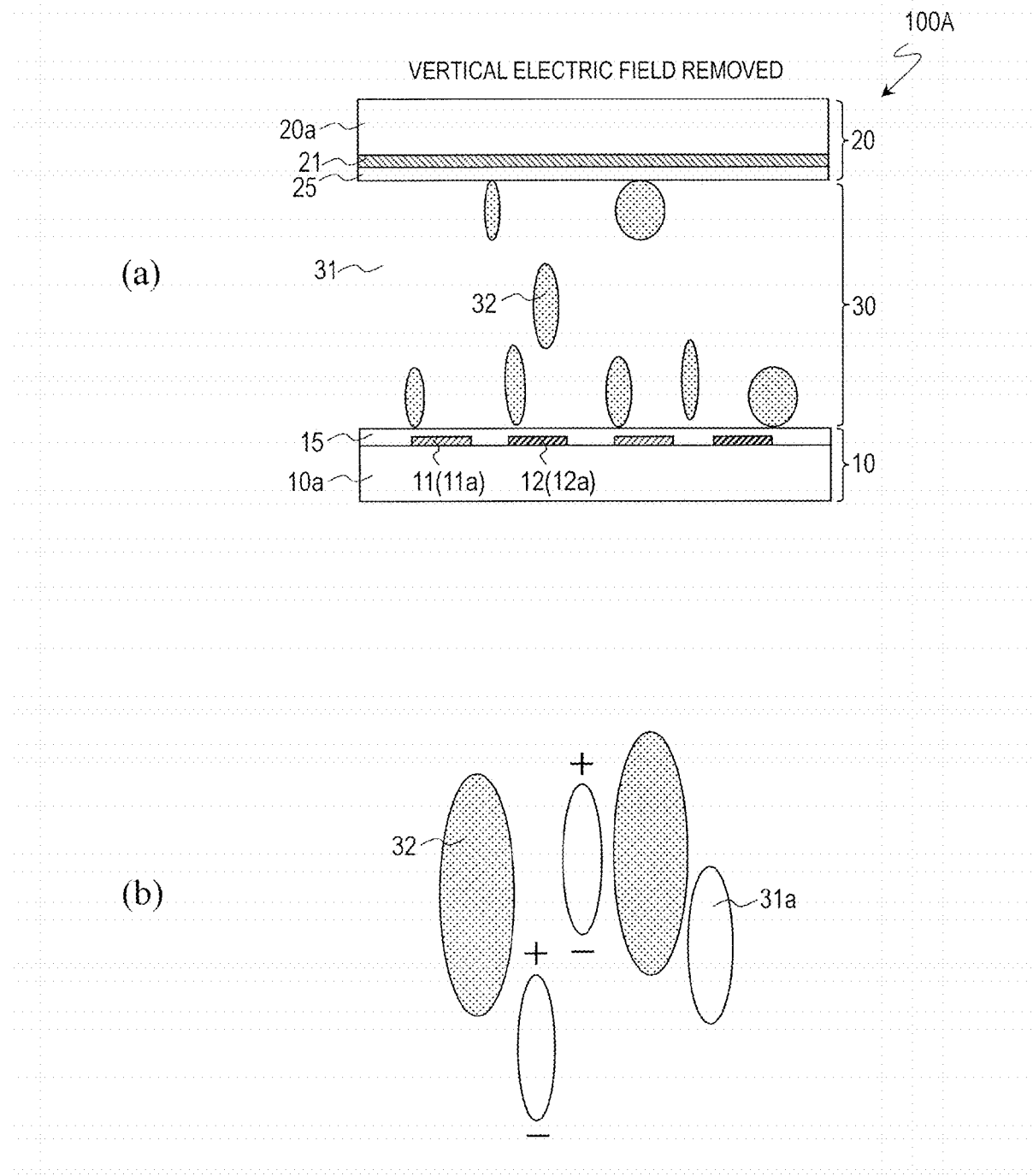
FIG. 24(a) schematically shows the optical device 100A in the state where the vertical electric field applied to the optical layer 30 is removed.
FIG. 24(b) shows the alignment direction of the shape-anisotropic particles 32 and the liquid crystal molecules 31a in this state.

First, an investigation was performed on an optical device 100A in example 1 shown in FIG. 19.

The optical device 100A in example 1 has substantially the same structure as that of the optical device 100 shown in FIG. 1 and the like. The medium 31 included in the optical layer 30 is a positive liquid crystal material. However, the optical device 100A does not include the light absorption layer 14 in the first substrate (rear-side substrate) 10. The vertical alignment layers 15 and 25 of the optical device 100A each have a surface energy as small as 35.0 mJ/m$^2$ and thus have a strong alignment control force to vertically align the liquid crystal molecules 31a.

FIG. 20 through FIG. 24 show the results of the investigation performed on the optical device 100A in example 1.

FIG. 20(a) schematically shows the optical device 100A in the state where no electric field is applied to the optical layer 30. FIG. 20(b) shows the alignment direction of the shape-anisotropic particles 32 and the liquid crystal molecules 31a in this state.

In the state where no electric field is applied to the optical layer 30, the liquid crystal molecules 31a are in a vertical alignment state as shown in FIG. 20(b) by the alignment control force of the vertical alignment films 15 and 25. In this state, the shape-anisotropic particles 32 are also in a vertical alignment state as shown in FIG. 20(a) and FIG. 20(b).

FIG. 21(a) schematically shows the optical device 100A in the state where a transverse electric field is applied to the optical layer 30. FIG. 21(b) shows the alignment direction of the shape-anisotropic particles 32 and the liquid crystal molecules 31a in this state.

When a transverse electric field is applied to the optical layer 30 (namely, when a predetermined voltage is applied between the first electrode 11 and the second electrode 12), the liquid crystal molecules 31a assume a horizontal alignment state as shown in FIG. 21(b). At this point, the shape-anisotropic particles 32 also assume a horizontal alignment state as shown in FIG. 21(a) and FIG. 21(b). Although the shape-anisotropic particles 32 are kept aligned generally vertically to the substrate in the vicinity of the second substrate 20, the display device 100A provides display with no problem.

FIG. 22(a) schematically shows the optical device 100A in the state where the transverse electric field applied to the optical layer 30 is removed. FIG. 22(b) shows the alignment direction of the shape-anisotropic particles 32 and the liquid crystal molecules 31a in this state.

When the transverse electric field applied to the optical layer 30 is removed, the liquid crystal molecules 31a assume the vertical alignment state again as shown in FIG. 22(b). At this point, the shape-anisotropic particles 32 follow the change in the alignment direction of the liquid crystal molecules 31a to assume the vertical alignment state as shown in FIG. 22(a) and FIG. 22(b).

FIG. 23(a) schematically shows the optical device 100A in the state where a vertical electric field is applied to the optical layer 30. FIG. 23(b) shows the alignment direction of the shape-anisotropic particles 32 and the liquid crystal molecules 31a in this state.

When a vertical electric field is applied to the optical layer 30 (namely, when a predetermined voltage is applied between the first and second electrodes 11 and 12 and the third electrode 21), the liquid crystal molecules 31a are kept in the vertical alignment state as shown in FIG. 23(b). In this state, the shape-anisotropic particles 32 are also kept in the vertical alignment state as shown in FIG. 23(a) and FIG. 23(b).

FIG. 24(a) schematically shows the optical device 100A in the state where the vertical electric field applied to the optical layer 30 is removed. FIG. 24(b) shows the alignment direction of the shape-anisotropic particles 32 and the liquid crystal molecules 31a in this state.

When the vertical electric field applied to the optical layer 30 is removed, the liquid crystal molecules 31a are still kept in the vertical alignment state as shown in FIG. 24(b). In this state, the shape-anisotropic particles 32 are also still kept in the vertical alignment state as shown in FIG. 24(a) and FIG. 24(b).

As described above, the optical device 100A in example 1 switches the state of the shape-anisotropic particles 32 between the vertical alignment state and the horizontal alignment state merely in accordance with absence/presence of the transverse electric field. Needless to say, a vertical electric field may be applied to the optical layer 30 when the horizontal alignment state is switched to the vertical alignment state. Such application of the vertical electric field improves the switching speed. The application of the vertical electric field also forcibly returns the shape-anisotropic particles 32 attached to the substrate in the horizontal alignment state into the vertical alignment state (initial alignment state).

Figure 25:
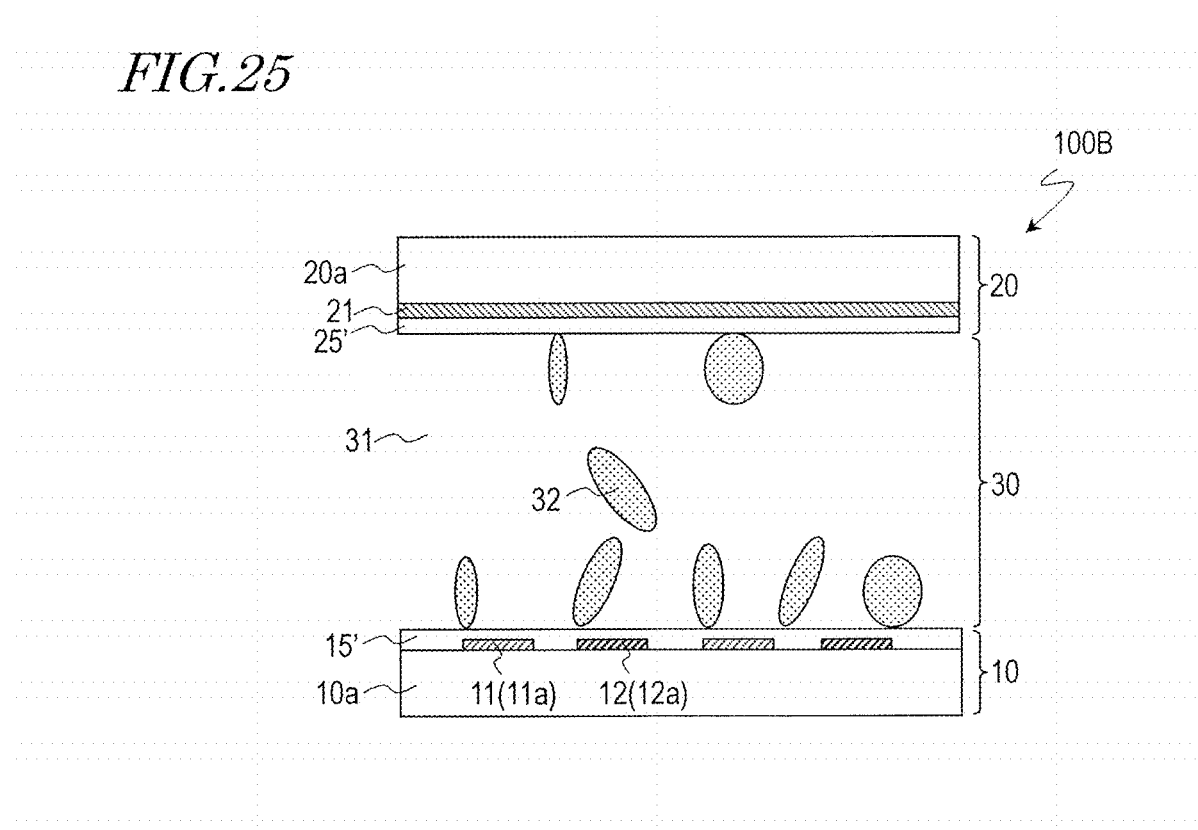
FIG. 25 is a cross-sectional view schematically showing an optical device 100B in example 2.
Figure 26:
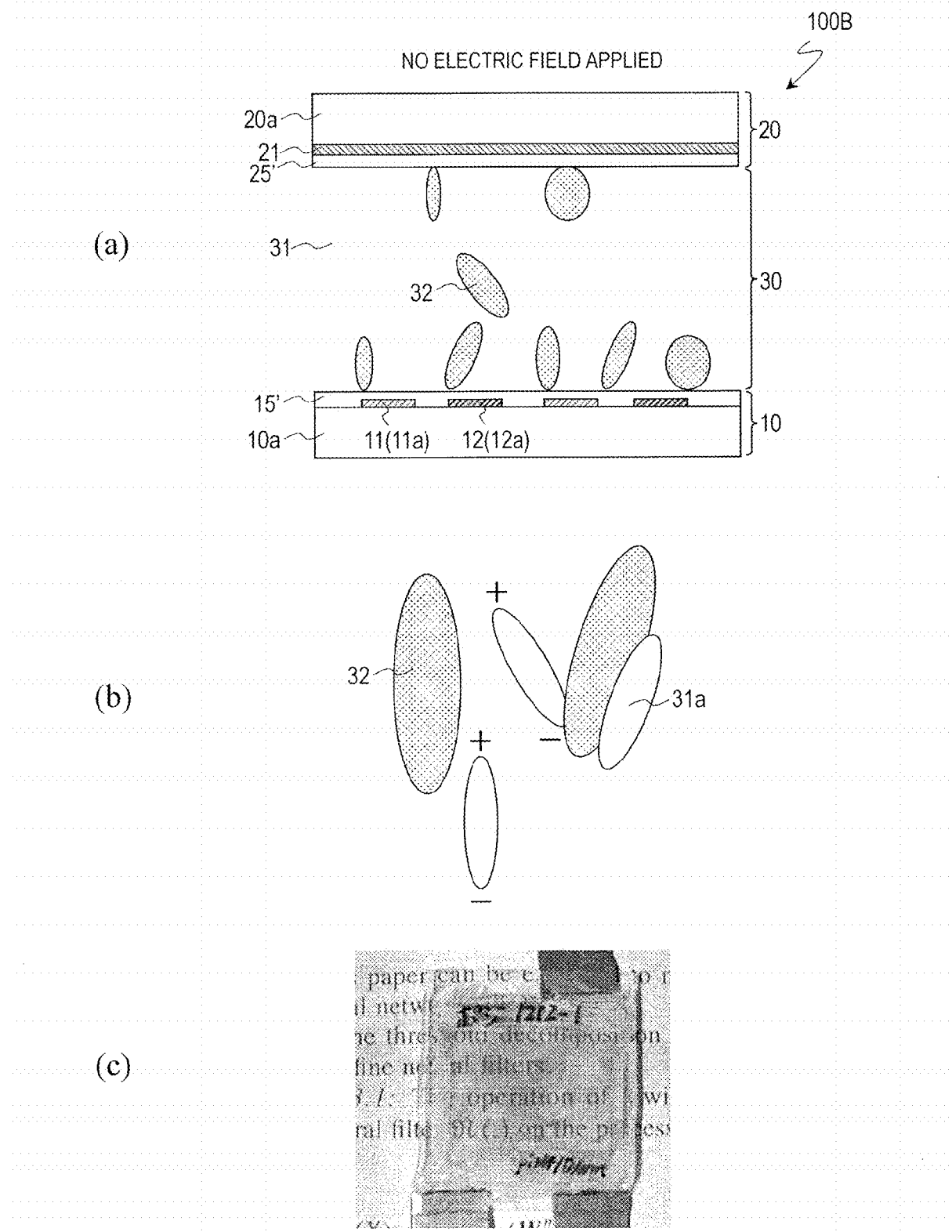
FIG. 26(a) schematically shows the optical device 100B in the state where no electric field is applied to the optical layer 30.
FIG. 26(b) shows the alignment directions of the shape-anisotropic particles 32 and the liquid crystal molecules 31a in this state.
FIG. 26(c) is a photograph showing the optical device 100B in this state.
Figure 27:
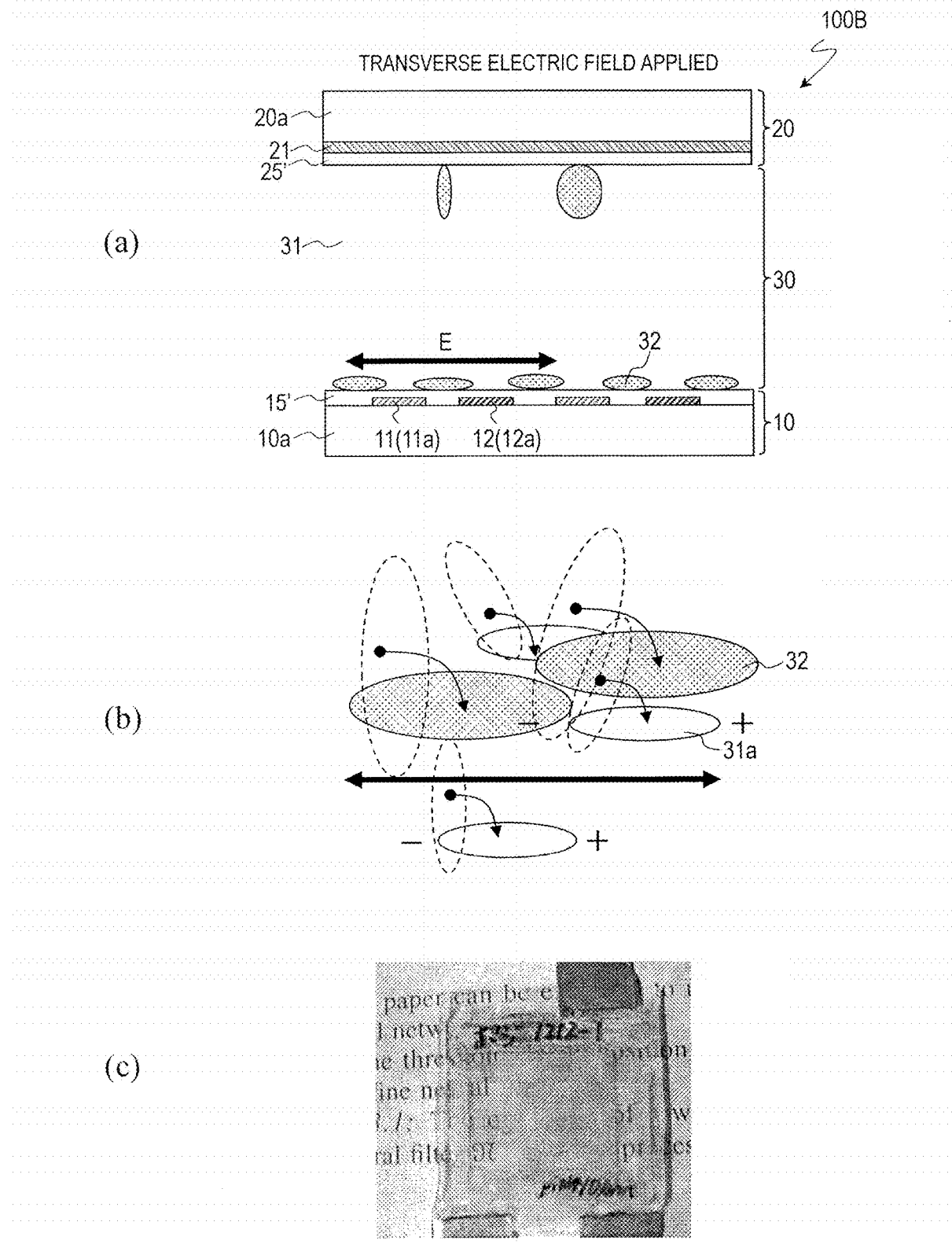
FIG. 27(a) schematically shows the optical device 100B in the state where a transverse electric field is applied to the optical layer 30.
FIG. 27(b) shows the alignment direction of the shape-anisotropic particles 32 and the liquid crystal molecules 31a in this state.
FIG. 27(c) is a photograph showing the optical device 100B in this state.
Figure 28:
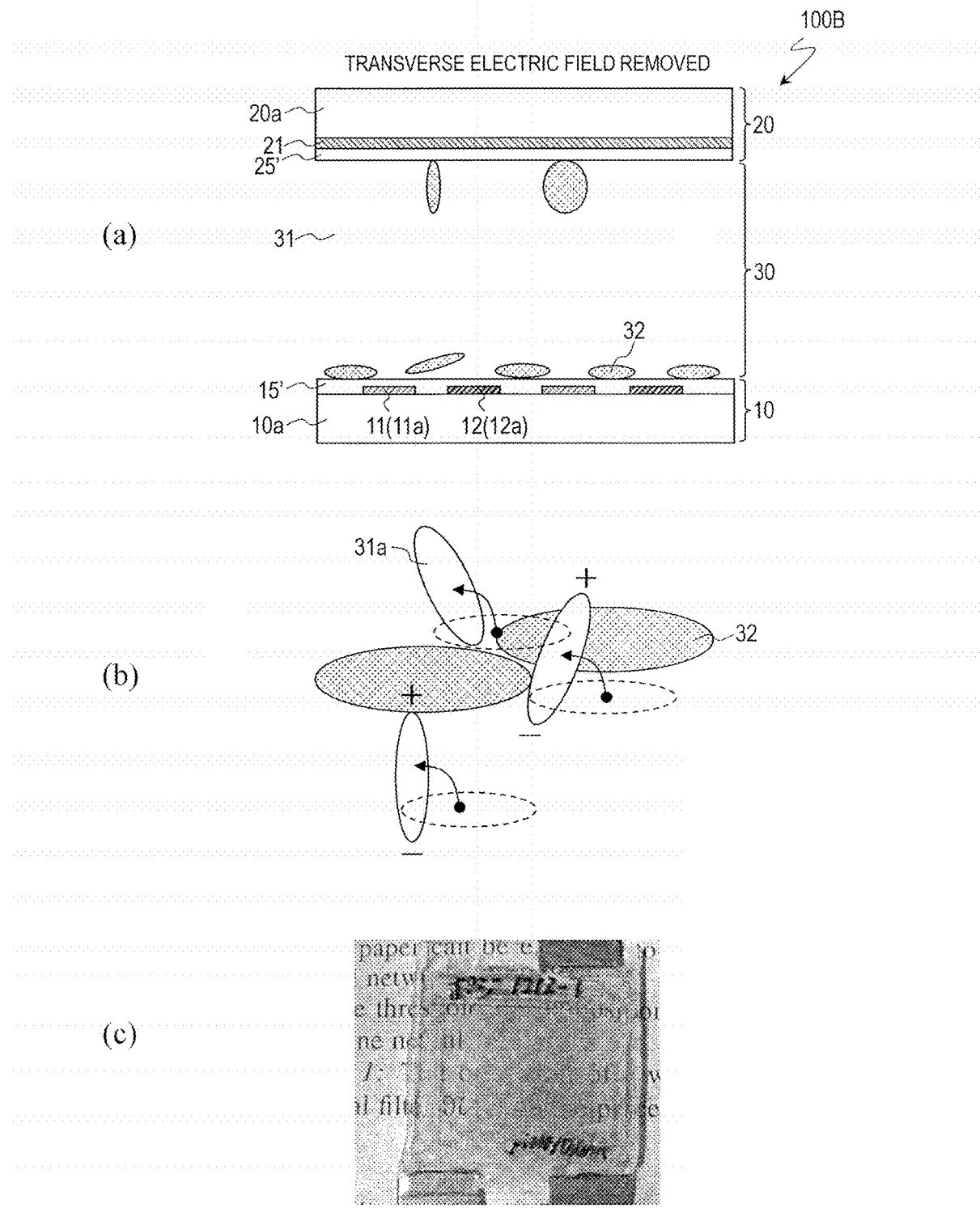
FIG. 28(a) schematically shows the optical device 100B in the state where the transverse electric field applied to the optical layer 30 is removed.
FIG. 28(b) shows the alignment directions of the shape-anisotropic particles 32 and the liquid crystal molecules 31a in this state.
FIG. 28(c) is a photograph showing the optical device 100B in this state.
Figure 29:
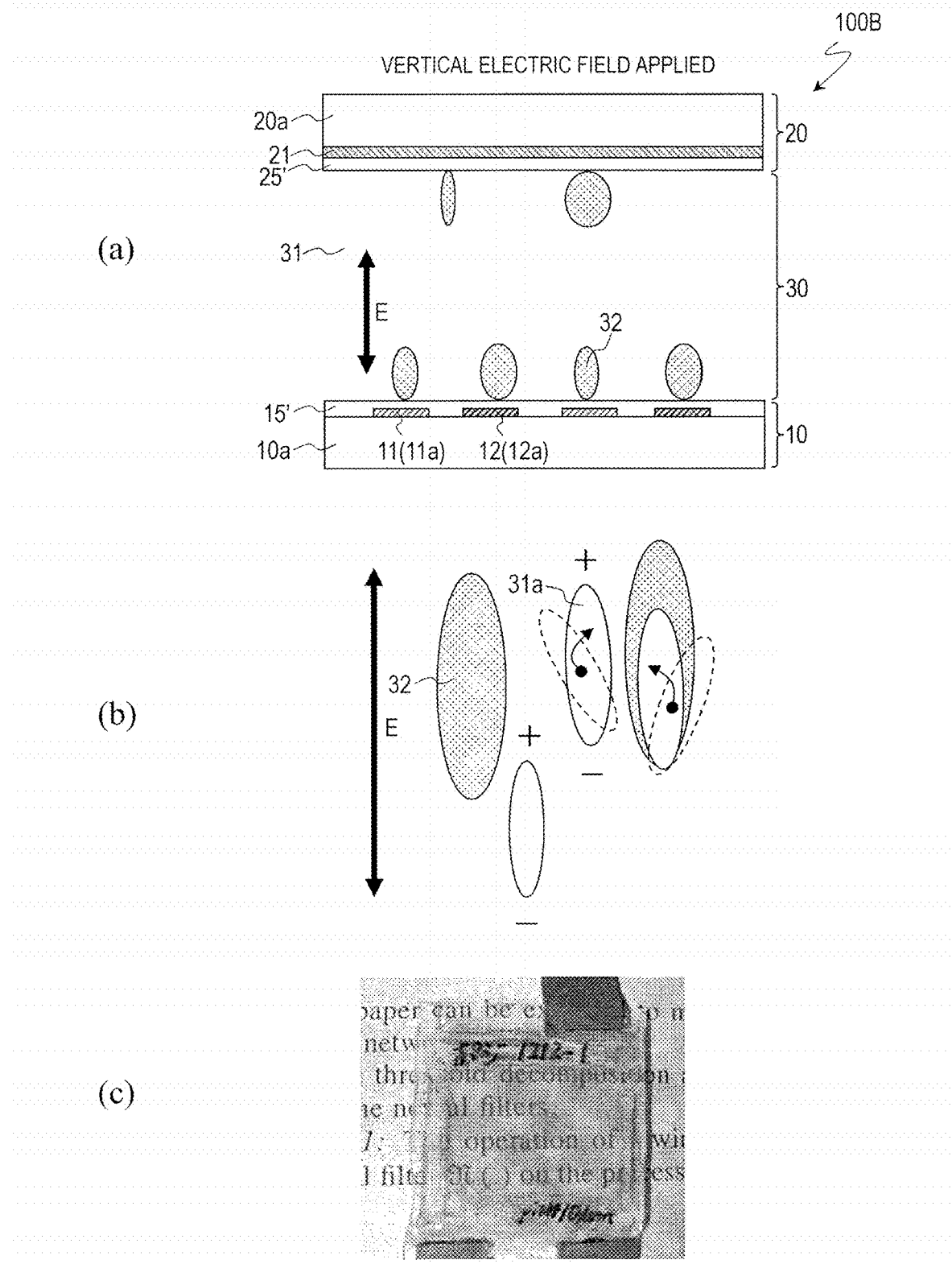
FIG. 29(a) schematically shows the optical device 100B in the state where a vertical electric field is applied to the optical layer 30.
FIG. 29(b) shows the alignment direction of the shape-anisotropic particles 32 and the liquid crystal molecules 31a in this state.
FIG. 29(c) is a photograph showing the optical device 100B in this state.

Next, an investigation was performed on an optical device 100B in example 2 shown in FIG. 25.

The optical device 100B in example 2 has substantially the same structure as that of the optical device 100A in example 1 shown in FIG. 19 and the like. The medium 31 included in the optical layer 30 is a positive liquid crystal material. It should be noted that alignment layers 15' and 25' respectively provided in the first substrate 10 and the second substrate 20 on the optical layer 30 side in the optical device 100B each have a surface energy of 38.4 mJ/m$^2$. Thus, the alignment control force provided by the alignment layers 15' and 25' to vertically align the liquid crystal molecules 31a is slightly weaker than that provided by the vertical alignment layers 15 and 25 of the optical device 100A in example 1.

FIG. 26 through FIG. 30 show the results of the investigation performed on the optical device 100B in example 2.

FIG. 26(a) schematically shows the optical device 100B in the state where no electric field is applied to the optical layer 30. FIG. 26(b) shows the alignment directions of the shape-anisotropic particles 32 and the liquid crystal molecules 31a in this state. FIG. 26(c) is a photograph showing the optical device (panel produced on a trial basis) 100B in this state.

In the state where no electric field is applied to the optical layer 30, the liquid crystal molecules 31a are in a slightly incompletely vertical alignment state as shown in FIG. 26(b). A reason for this is that the alignment control force of the alignment films 15' and 25' is slightly weak. In this state, the shape-anisotropic particles 32 are also in a slightly incompletely vertical alignment state as shown in FIG. 26(a) and FIG. 26(b). It is seen from FIG. 26(c) that the optical layer 30 is substantially in a transparent state.

FIG. 27(a) schematically shows the optical device 100B in the state where a transverse electric field is applied to the optical layer 30. FIG. 27(b) shows the alignment direction of the shape-anisotropic particles 32 and the liquid crystal molecules 31a in this state. FIG. 27(c) is a photograph showing the optical device (panel produced on a trial basis) 100B in this state.

When a transverse electric field is applied to the optical layer 30 (namely, when a predetermined voltage is applied between the first electrode 11 and the second electrode 12), the liquid crystal molecules 31a assume a horizontal alignment state as shown in FIG. 27(b). At this point, the shape-anisotropic particles 32 also assume a horizontal alignment state as shown in FIG. 27(a) and FIG. 27(b). It is seen from FIG. 27(c) that the optical layer 30 is in a reflective state.

FIG. 28(a) schematically shows the optical device 100B in the state where the transverse electric field applied to the optical layer 30 is removed. FIG. 28(b) shows the alignment directions of the shape-anisotropic particles 32 and the liquid crystal molecules 31a in this state. FIG. 28(c) is a photograph showing the optical device (panel produced on a trial basis) 100B in this state.

When the transverse electric field applied to the optical layer 30 is removed, the liquid crystal molecules 31a assume the slightly incompletely vertical alignment state again as shown in FIG. 28(b). At this point, the shape-anisotropic particles 32 do not assume an orderly alignment state because the vertical alignment state of the liquid crystal molecules 31a is slightly incomplete, and are substantially kept in the horizontal alignment state as shown in FIG. 28(a) and FIG. 28(b). It is seen from FIG. 28(c) that the optical layer 30 is substantially in the reflective state.

FIG. 29(a) schematically shows the optical device 100B in the state where a vertical electric field is applied to the optical layer 30. FIG. 29(b) shows the alignment direction of the shape-anisotropic particles 32 and the liquid crystal molecules 31a in this state. FIG. 29(c) is a photograph showing the optical device (panel produced on a trial basis) 100B in this state.

When a vertical electric field is applied to the optical layer 30 (namely, when a predetermined voltage is applied between the first and second electrodes 11 and 12 and the third electrode 21), the liquid crystal molecules 31a assume a vertical alignment state as shown in FIG. 29(b). At this point, the shape-anisotropic particles 32 also assume a vertical alignment state as shown in FIG. 29(a) and FIG. 29(b). It is seen from FIG. 29(c) that the optical layer 30 is in the transparent state.

FIG. 30(a) schematically shows the optical device 100B in the state where the vertical electric field applied to the optical layer 30 is removed. FIG. 30(b) shows the alignment directions of the shape-anisotropic particles 32 and the liquid crystal molecules 31a in this state. FIG. 30(c) is a photograph showing the optical device (panel produced on a trial basis) 100B in this state.

When the vertical electric field applied to the optical layer 30 is removed, the liquid crystal molecules 31a assume the slightly incompletely vertical alignment state again as shown in FIG. 30(b). At this point, the shape-anisotropic particles 32 do not assume an orderly alignment state because the vertical alignment state of the liquid crystal molecules 31a is slightly incomplete, and are substantially kept in the vertical alignment state as shown in FIG. 30(a) and FIG. 30(b). It is seen from FIG. 30(c) that the optical layer 30 is substantially in the transparent state.

As described above, in the optical device 100B in example 2, in the state where no electric field is applied to the optical layer 30, the vertical alignment state of the shape-anisotropic particles 32 is slightly incomplete. Therefore, it is preferable to realize the vertical alignment state of the shape-anisotropic particles 32 by applying a vertical electric field.

Figure 31:
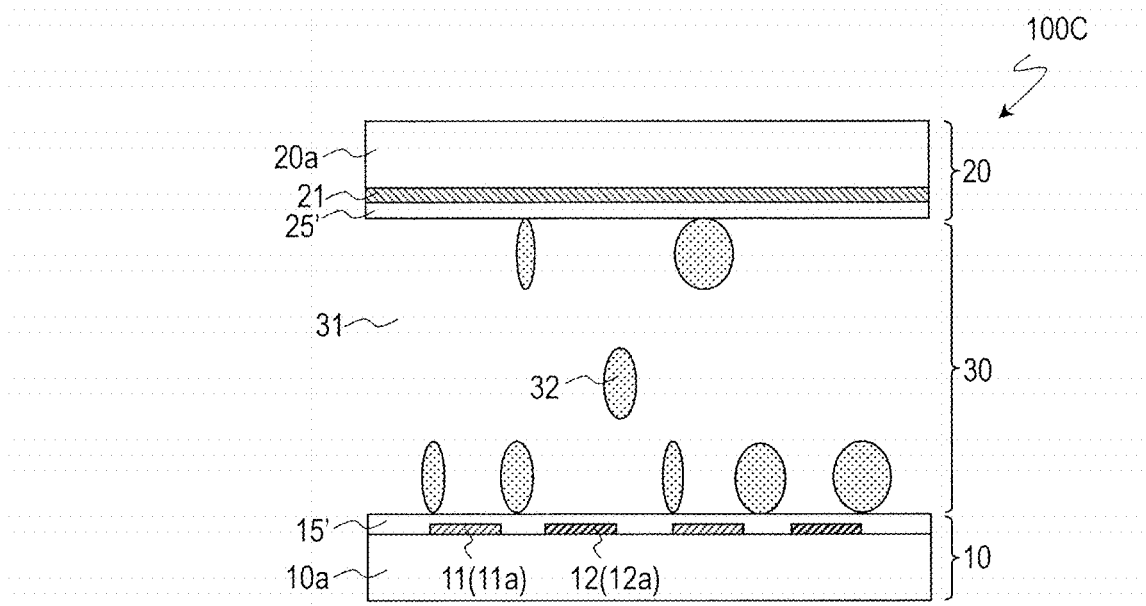
FIG. 31 is a cross-sectional view schematically showing an optical device 100C in example 3.

Next, an investigation was performed on an optical device 100C in example 3 shown in FIG. 31.

Unlike in the optical device 100B in example 2, in the optical device 100C in example 3, the medium 31 included in the optical layer 30 is a negative liquid crystal material.

FIG. 32 through FIG. 36 show the results of the investigation performed on the optical device 100C in example 3.

Figure 32:
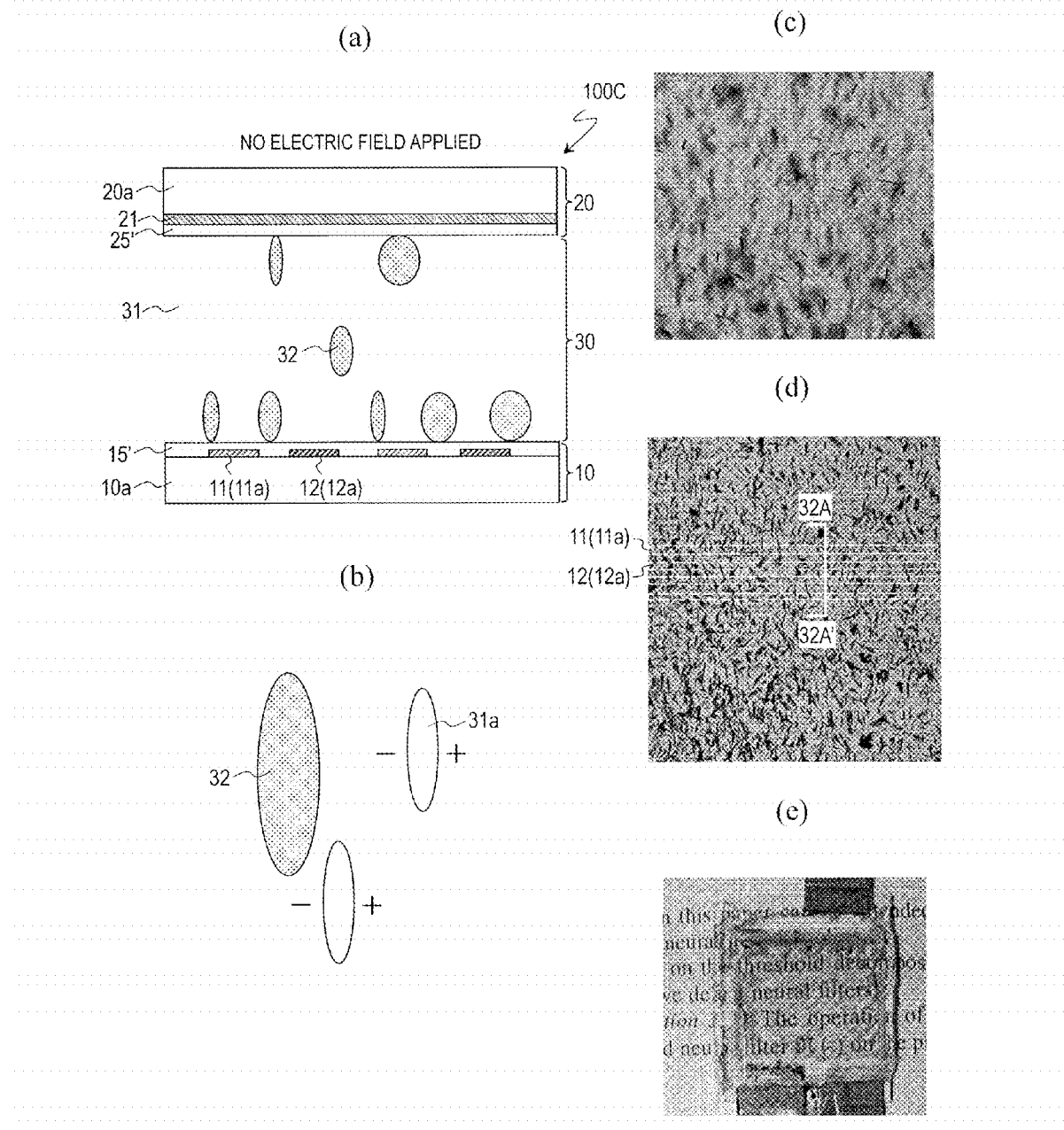
FIG. 32(*a*) schematically shows the optical device 100C in the state where no electric field is applied to the optical layer 30, FIG. 32(*b*) shows the alignment direction of the shape-anisotropic particles 32 and the liquid crystal molecules 31*a* in this state, FIG. 32(*c*) and FIG. 32(*d*) are each an optical micrograph of the optical layer 30 in this state as seen in a direction of the normal to the substrate surface, and FIG. 32(*e*) is a photograph showing the optical device 100C in this state.
Figure 33:
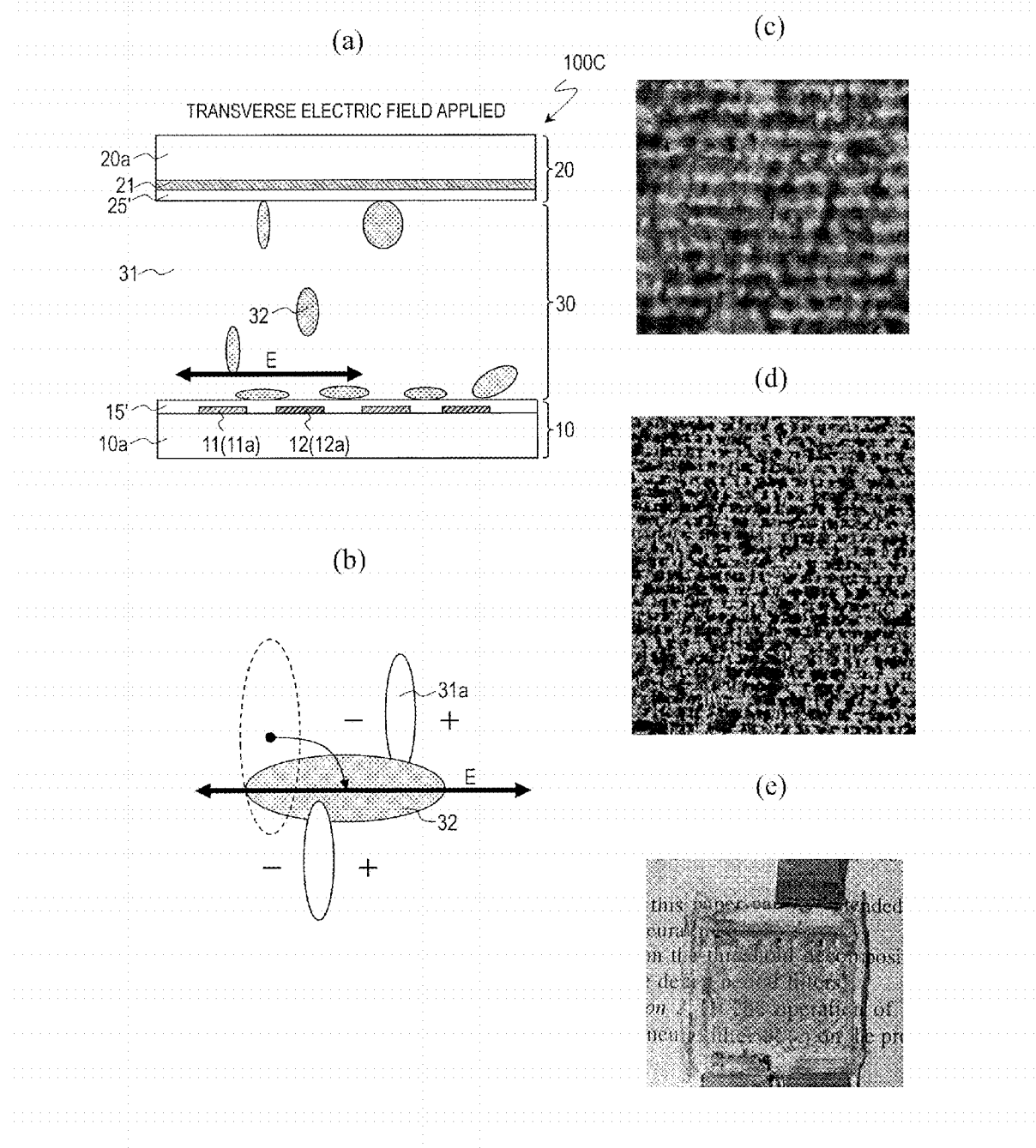
FIG. 33(*a*) schematically shows the optical device 100C in the state where a transverse electric field is applied to the optical layer 30, FIG. 33(*b*) shows the alignment directions of the shape-anisotropic particles 32 and the liquid crystal molecules 31*a* in this state, FIG. 33(*c*) and FIG. 33(*d*) are each an optical micrograph of the optical layer 30 in this state as seen in a direction of the normal to the substrate surface, and FIG. 33(*e*) is a photograph showing the optical device 100C in this state.
Figure 35:
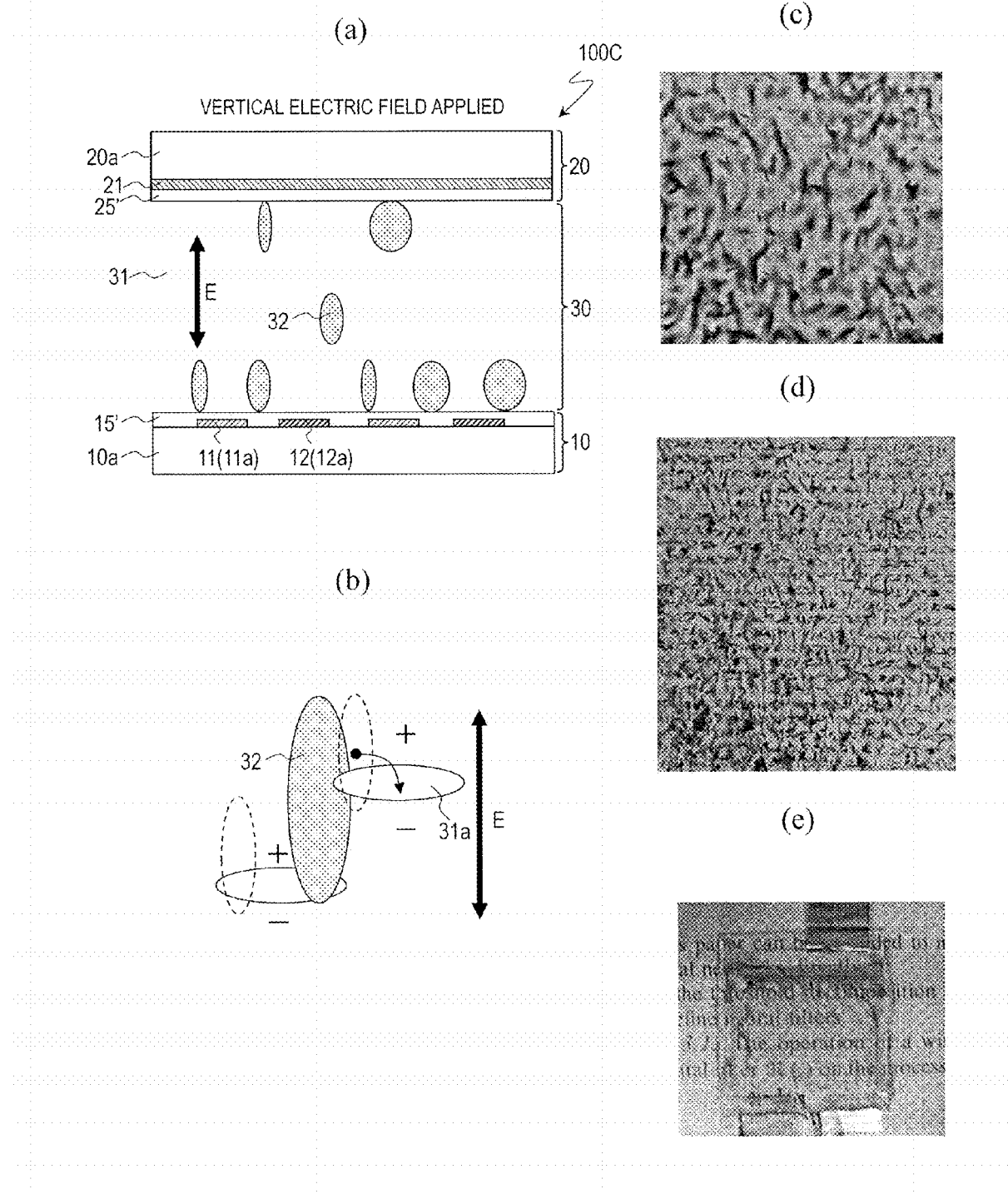
FIG. 35(*a*) schematically shows the optical device 100C in the state where a vertical electric field is applied to the optical layer 30, FIG. 35(*b*) shows the alignment directions of the shape-anisotropic particles 32 and the liquid crystal molecules 31*a* in this state, FIG. 35(*c*) and FIG. 35(*d*) are each an optical micrograph of the optical layer 30 in this state as seen in a direction of the normal to the substrate surface, and FIG. 35(*e*) is a photograph showing the optical device 100C in this state.
Figure 36:
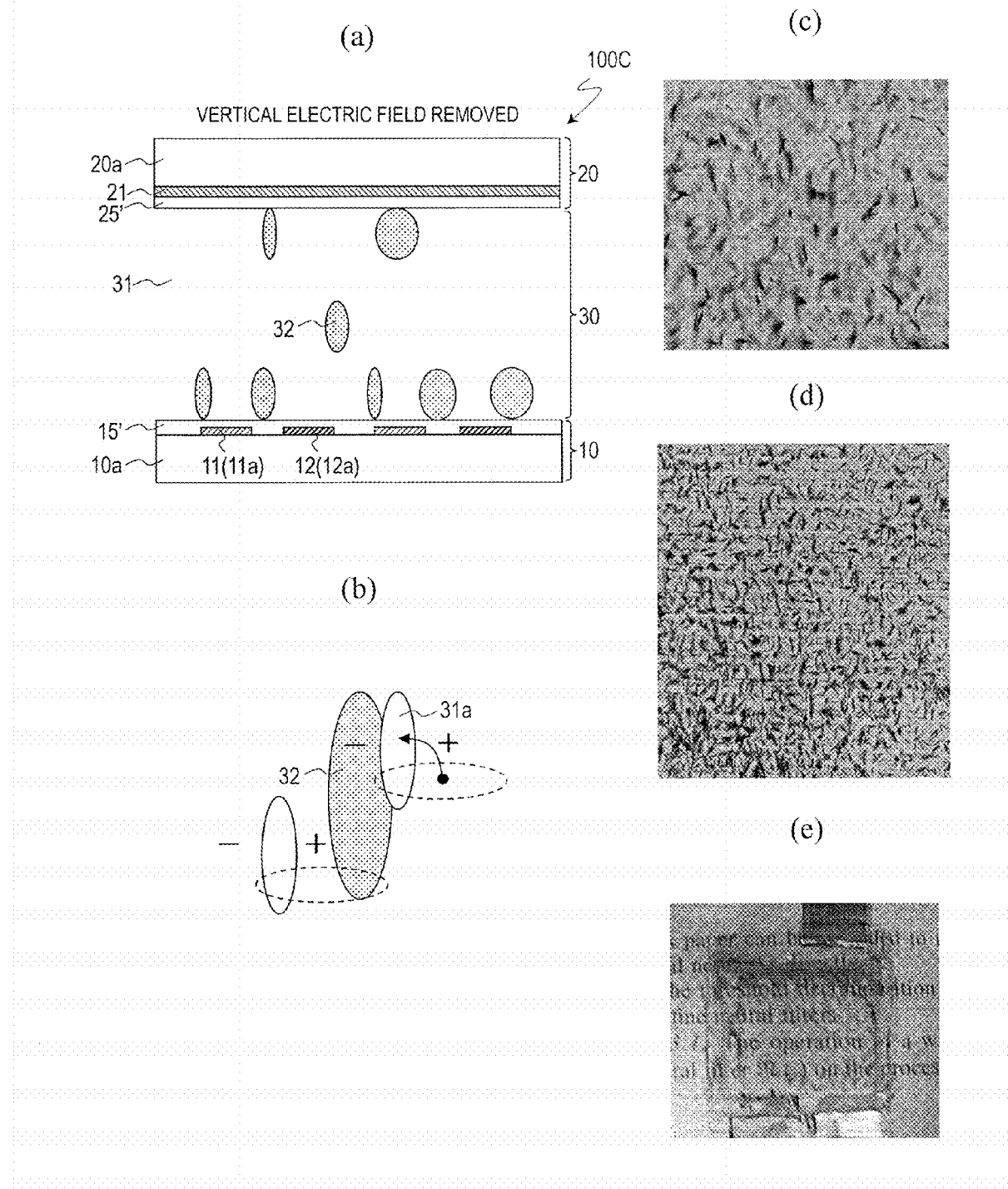
FIG. 36(*a*) schematically shows the optical device 100C in the state where the vertical electric field applied to the optical layer 30 is removed, FIG. 36(*b*) shows the alignment direction of the shape-anisotropic particles 32 and the liquid crystal molecules 31*a* in this state, FIG. 36(*c*) and FIG. 36(*d*) are each an optical micrograph of the optical layer 30 in this state as seen in a direction of the normal to the substrate surface, and FIG. 36(*e*) is a photograph showing the optical device 100C in this state.

FIG. 32(a) schematically shows the optical device 100C in the state where no electric field is applied to the optical layer 30. FIG. 32(b) shows the alignment direction of the shape-anisotropic particles 32 and the liquid crystal molecules 31a in this state. FIG. 32 (c) and FIG. 32 (d) are each an optical micrograph of the optical layer 30 (optical layer 30 of a panel produced on a trial basis) in this state as seen in a direction of the normal to the substrate surface. FIG. 32 (e) is a photograph showing the optical device (panel produced on a trial basis) 100C in this state. FIG. 32(a) is a cross-sectional view taken along line 32A-32A' in FIG. 32(d). FIG. 32(d) shows an outer profile of the branches 11a of the first electrode 11 and the branches 12a of the second electrode 12.

In the state where no electric field is applied to the optical layer 30, the liquid crystal molecules 31a are in a vertical alignment state as shown in FIG. 32(b) by the alignment control force of the alignment films 15' and 25'. A reason why the liquid crystal molecules 31a are in the vertical alignment state although the alignment control force of the alignment films 15' and 25' is slightly weak is that the liquid crystal material is of a negative type. In this state, the shape-anisotropic particles 32 are also in a vertical alignment state as shown in FIG. 32 (a) and FIG. 32 (b). It is seen also from FIG. 32(c) and FIG. 32(d) that the shape-anisotropic particles 32 are in the vertical alignment state. It is seen from FIG. 32 (e) that the optical layer 30 is in a transparent state.

FIG. 33(a) schematically shows the optical device 100C in the state where a transverse electric field is applied to the optical layer 30. FIG. 33(b) shows the alignment directions of the shape-anisotropic particles 32 and the liquid crystal molecules 31a in this state. FIG. 33(c) and FIG. 33(d) are each an optical micrograph of the optical layer 30 (optical layer 30 of the panel produced on a trial basis) in this state as seen in a direction of the normal to the substrate surface.

FIG. 33(e) is a photograph showing the optical device (panel produced on a trial basis) 100C in this state.

When a transverse electric field is applied to the optical layer 30 (namely, when a predetermined voltage is applied between the first electrode 11 and the second electrode 12), the liquid crystal molecules 31a are kept in the vertical alignment state as shown in FIG. 33(b). By contrast, the shape-anisotropic particles 32 in the vicinity of the first substrate 10 assume a horizontal alignment state as shown in FIG. 33(a) and FIG. 33(b). It is also seen from FIG. 33(c) and FIG. 33(d) that the shape-anisotropic particles 32 in the vicinity of the first substrate 10 assume the horizontal alignment state. It is seen from FIG. 33(e) that the optical layer 30 is in a reflective state although being slightly incomplete.

FIG. 34(a) schematically shows the optical device 100C in the state where the transverse electric field applied to the optical layer 30 is removed. FIG. 34(b) shows the alignment direction of the shape-anisotropic particles 32 and the liquid crystal molecules 31a in this state. FIG. 34(c) and FIG. 34(d) are each an optical micrograph of the optical layer 30 (optical layer 30 of the panel produced on a trial basis) in this state as seen in a direction of the normal to the substrate surface. FIG. 34(e) is a photograph showing the optical device (panel produced on a trial basis) 100C in this state.

When the transverse electric field applied to the optical layer 30 is removed, the liquid crystal molecules 31a are still kept in the vertical alignment state as shown in FIG. 34(b). At this point, the shape-anisotropic particles 32 in the vicinity of the first substrate 10 assume the vertical alignment state again as shown in FIG. 34(a) and FIG. 34(b). It is also seen from FIG. 34(c) and FIG. 34(d) that the shape-anisotropic particles 32 assume the vertical alignment state. It is seen from FIG. 34(e) that the optical layer 30 is in the transparent state.

FIG. 35(a) schematically shows the optical device 100C in the state where a vertical electric field is applied to the optical layer 30. FIG. 35(b) shows the alignment directions of the shape-anisotropic particles 32 and the liquid crystal molecules 31a in this state. FIG. 35(c) and FIG. 35(d) are each an optical micrograph of the optical layer 30 (optical layer 30 of the panel produced on a trial basis) in this state as seen in a direction of the normal to the substrate surface. FIG. 35(e) is a photograph showing the optical device (panel produced on a trial basis) 100C in this state.

When a vertical electric field is applied to the optical layer 30 (namely, when a predetermined voltage is applied between the first and second electrodes 11 and 12 and the third electrode 21), the liquid crystal molecules 31a assume a horizontal alignment state as shown in FIG. 35(b). By contrast, the shape-anisotropic particles 32 are kept in the vertical alignment state as shown in FIG. 35(a) and FIG. 35(b). It is also seen from FIG. 35(c) and FIG. 35(d) that the shape-anisotropic particles 32 are in the vertical alignment state. It is seen from FIG. 35(e) that the optical layer 30 is in the transparent state.

FIG. 36(a) schematically shows the optical device 100C in the state where the vertical electric field applied to the optical layer 30 is removed. FIG. 36(b) shows the alignment direction of the shape-anisotropic particles 32 and the liquid crystal molecules 31a in this state. FIG. 36(c) and FIG. 36(d) are each an optical micrograph of the optical layer 30 (optical layer 30 of the panel produced on a trial basis) in this state as seen in a direction of the normal to the substrate surface. FIG. 36(e) is a photograph showing the optical device (panel produced on a trial basis) 100C in this state.

When the vertical electric field applied to the optical layer 30 is removed, the liquid crystal molecules 31a assume the vertical alignment state again as shown in FIG. 36(b). At this point, the shape-anisotropic particles 32 are still kept in the vertical alignment state as shown in FIG. 36(a) and FIG. 36(b). It is also seen from FIG. 36(c) and FIG. 36(d) that the shape-anisotropic particles 32 are in the vertical alignment state. It is seen from FIG. 36(e) that the optical layer 30 is in the transparent state.

As described above, the optical device 100C in example 3 switches the state of the shape-anisotropic particles 32 between the vertical alignment state and the horizontal alignment state merely in accordance with absence/presence of the transverse electric field. Needless to say, a vertical electric field may be applied to the optical layer 30 when the horizontal alignment state is switched to the vertical alignment state. However, in the optical device 100C in example 3, the change in the alignment direction of the shape-anisotropic particles 32 is not supported by the rotation of the liquid crystal molecules 31a. Therefore, the effect of improving the switching speed and the effect of forcibly returning the shape-anisotropic particles 32 attached to the substrate into the vertical alignment state (initial alignment state) are higher in the optical device 100A in example 1.

As described so far, at least one of the first substrate 10 and the second substrate 20 includes, on the optical layer 30 side, a film having a surface energy of 40 mJ/m$^2$ or less, or having a contact angle with pure water of 75 degrees or greater or a contact angle with $CH_2I_2$ of 40 degrees or greater, or a vertical alignment film. Such a structure prevents the shape-anisotropic particles 32 from being attached to the substrate, and thus allows the switching operation of the state of the shape-anisotropic particles 32 to be performed in a preferable manner. Such a structure also prevents the shape-anisotropic particles 32 from being precipitated by the weight thereof.

The optical device 100 is allowed to apply a transverse electric field to the optical layer 30 (namely, the first substrate 10 includes the first electrode 11 and the second electrode 12 allowed to be supplied with different potentials from each other). Such a structure allows the state of the shape-anisotropic particles 32 to be switched from the vertical alignment state to the horizontal alignment state.

The optical device 100 is allowed to apply a vertical electric field to the optical layer 30 (namely, the second substrate 20 includes the third electrode 21 facing the first electrode 11 and the second electrode 12). Such a structure allows the shape-anisotropic particles 32 attached to the substrate in the horizontal alignment state to be forcibly returned into the vertical alignment state (initial alignment state). Such a structure also improves the switching speed of the shape-anisotropic particles 32 from the horizontal alignment state to the vertical alignment state.

It is preferable that the width w (see FIG. 2) of each of the branches 11a and 12a of the first electrode 11 and the second electrode 12, and the length l (see FIG. 1) of each of the shape-anisotropic particles 32, fulfill the relationship of w<l. Namely, the structure shown in FIG. 37(a) in which the width w of the branches 11a and 12a is shorter than the length l of the shape-anisotropic particles 32 is more preferable to the structure shown in FIG. 37(b) in which the width w of the branches 11a and 12a is longer than the length l of the shape-anisotropic particles 32. Region R1 above the branches 11a and 12a is a region to which the transverse electric field is not applied. Therefore, in the case where the width w of the branches 11a and 12a is shorter (namely, the region R1 to which the transverse electric field is not applied is smaller) than the length l of the shape-anisotropic particles 32, the transverse electric field effectively acts on the shape-anisotropic particles 32. Thus, the switching of the state of the shape-anisotropic particles 32 is performed in a preferable manner.

Figure 37:
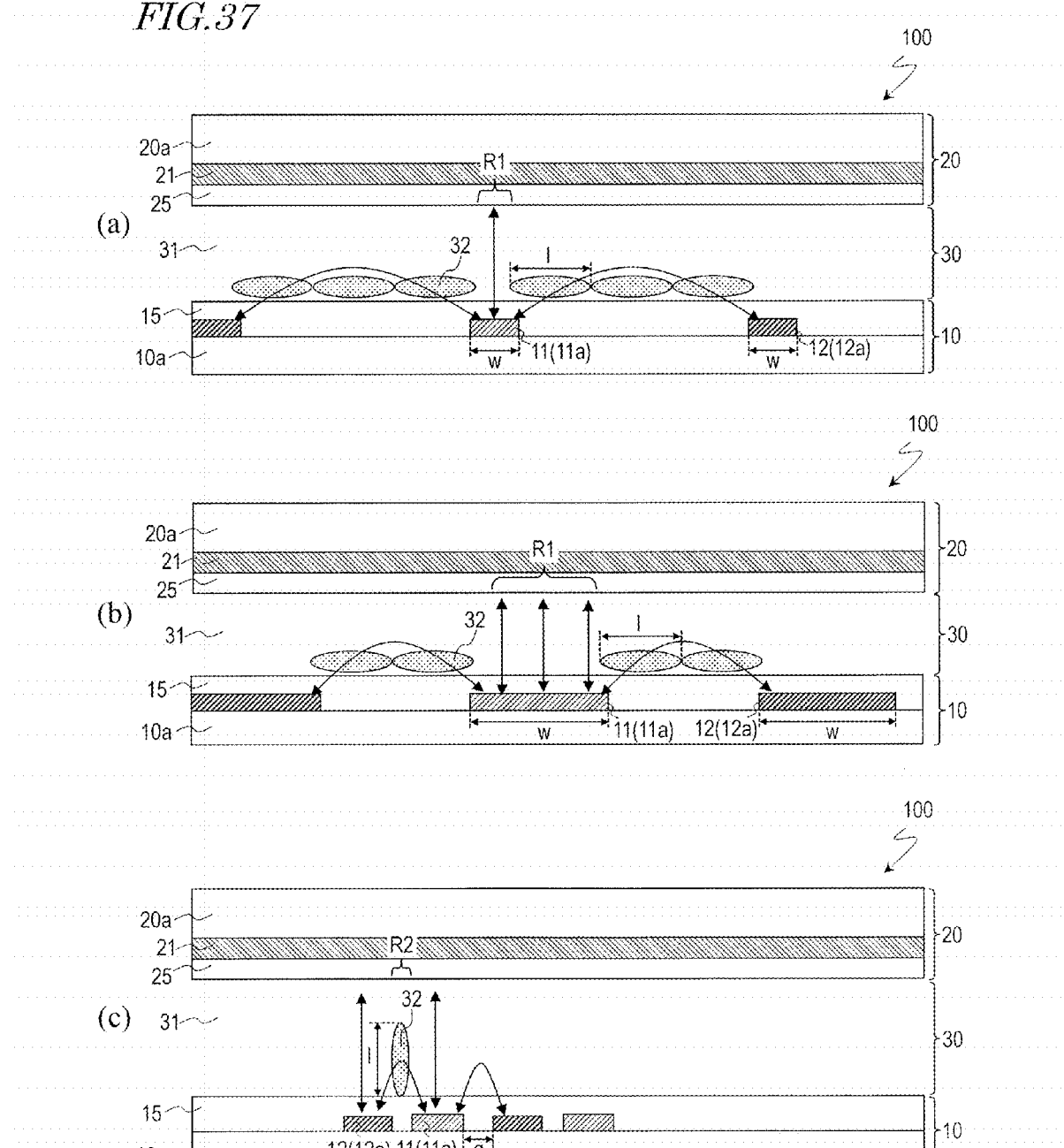
FIG. 37(*a*) is a cross-sectional view schematically showing a structure in which width w of branches 11*a* and 12*a* of the first electrode 11 and the second electrode 12 is shorter than length l of the shape-anisotropic particles 32, FIG. 37(*b*) is a cross-sectional view schematically showing a structure in which the width w of the branches 11*a* and 12*a* of the first electrode 11 and the second electrode 12 is longer than the length l of the shape-anisotropic particles 32, and FIG. 37(*c*) is a cross-sectional view schematically showing a structure in which inter-electrode distance g is shorter than half of the length l of the shape-anisotropic particles 32.

It is preferable that the width g between the branches 11a and 12a (inter-electrode distance g), and the length l of the shape-anisotropic particles 32, fulfill the relationship of $g > 1 \cdot (½)$. Namely, it is preferable that the inter-electrode distance g is longer than half of the length l of the shape-anisotropic particles 32. Region R2 between the branches 11a of the first electrode 11 and the branches 12a of the first electrode 12 is a region to which the transverse electric field is applied. Therefore, in the case where the inter-electrode distance g is longer (namely, the region R2 to which the transverse electric field is applied is larger) than half of the length l of the shape-anisotropic particles 32, the transverse electric field effectively acts on the shape-anisotropic particles 32. Thus, the switching of the state of the shape-anisotropic particles 32 is performed in a preferable manner. By contrast, in the case where as shown in FIG. 37(c), the inter-electrode distance g is shorter than half of the length l of the shape-anisotropic particles 32, the transverse electric field may not effectively act on the shape-anisotropic particles 32.

It is preferable that the liquid crystal material contained in the medium 31 has positive dielectric anisotropy (namely, is of a positive type). In the case where the liquid crystal material is of a positive type, the alignment direction of the liquid crystal molecules 31a matches the alignment direction of the shape-anisotropic particles 32 when an electric field is applied. Therefore, the number of the shape-anisotropic particles 32 that are switched in the state is made larger, and also the switching speed is improved.

It is preferable that a dielectric anisotropy value $\Delta \varepsilon$ of the liquid crystal material exceeds 15. In the case where the dielectric anisotropy value $\Delta \varepsilon$ of the liquid crystal material exceeds 15, the dielectrophoretic force is increased. This allows the shape-anisotropic particles 32 to be switched in the state in a more preferable manner.

The positive liquid crystal material may be any in a wide range of liquid crystal materials usable for liquid crystal display devices. For example, a fluorine-based liquid crystal material containing fluorine introduced to a side chain thereof may be preferably used. A fluorine-based liquid crystal material is widely used for active matrix-drivable liquid crystal display devices, and has a large dielectric constant and a high specific resistance. Specifically, for example, a liquid crystal material having a dielectric constant $\varepsilon_{//}$ in the longer axis direction of 24.7, a dielectric constant $\varepsilon_\perp$ in the shorter axis direction of 4.3, and a specific resistance $\rho$ of $6 \times 10^{13}$ Ω·cm is usable. Needless to say, the dielectric constant and the specific resistance of the liquid crystal material are not limited to those described above as examples. From the point of view of sufficiently suppressing generation of off-leak via the medium 31, it is preferable that the specific resistance of the liquid crystal material is $1 \times 10^{11-12}$ Ω·cm or greater.

Regarding the shape-anisotropic particles 32, there is no specific limitation on the shape or the material thereof as long as the size of the projection area of the substrate surface on which the shape-anisotropic particles 32 are projected is changed in accordance with the direction of the applied electric field. The shape-anisotropic particles 32 may be flake-like (thin piece-like), cylindrical, ellipsoidal or the like. From the point of view of realizing a high contrast ratio, it is preferable that the shape-anisotropic particles 32 have a shape with which the ratio of the maximum projection area size and the minimum projection area size is 2:1 or greater.

It is preferable that the length l of the shape-anisotropic particles 32 is 3 μm or greater and 10 μm or less. As described below, the investigation made by the present inventor has found that the transverse electric field extends in the optical layer 30 over an area of about 10 μm from the side of the first substrate 10 in a vertical direction (thickness direction). Therefore, in the case where the length l of the shape-anisotropic particles 32 exceeds 10 μm, the transverse electric field does not act on the entirety of the shape-anisotropic particles 32. In this case, the switching of the state of the shape-anisotropic particles 32 may not be performed in a preferable manner. In the case where the length l of the shape-anisotropic particles 32 is less than 3 μm, the reflectance may be decreased and the production of the shape-anisotropic particles 32 may not be easy.

The content Cf [wt. %] of the shape-anisotropic particles 32 in the optical layer 32, and the thickness D [μm] of the optical layer 30, preferably fulfill the relationship of $4 \leq (Cf \cdot D)/10 \leq 15$, and more preferably fulfill the relationship of $5 \leq (Cf \cdot D)/10 \leq 13$. In the case where $(Cf \cdot D)/10 \leq 4$, the number of the shape-anisotropic particles 32 may be too small to cover the display region in the horizontal alignment state. In the case where $15 < (Cf \cdot D)/10$, the number of the shape-anisotropic particles 32 may be too large to be switched in the state in a preferable manner.

The shape-anisotropic particles 32 may be formed of a metal material, a semiconductor material, a dielectric material, or a composite material thereof. The shape-anisotropic particles 32 may be formed of a dielectric multi-layer film, or may be formed of a cholesteric resin material.

It is preferable that the shape-anisotropic particles 32 are formed of, for example, a metal material having an insulating layer (dielectric layer) provided on a surface thereof. The dielectric constant of a single metal material is an imaginary number. However, in the case where the shape-anisotropic particles 32 are formed of a metal material having an insulating layer (e.g., resin layer or metal oxide layer) provided on a surface thereof, the shape-anisotropic particles 32 may be treated as being formed of a dielectric material. In addition, the insulating layer formed on the metal material prevents the shape-anisotropic particles 32 from being conductive with each other when contacting with other, and also prevents the shape-anisotropic particles 32 from being, for example, condensed by a physical interaction. The shape-anisotropic particles 32 may be formed of, for example, aluminum flakes having a surface covered with a resin material (e.g., acrylic resin), aluminum flakes having a surface covered with $SiO_2$, aluminum flakes having a surface covered with aluminum oxide, or the like. Needless to say, a metal material other than aluminum (e.g., silver) may be used. The shape-anisotropic particles 32 may have a surface treated to improve dispersibility. The shape-anisotropic particles 32 may be colored.

As each of the vertical alignment films 15 and 25, a vertical alignment film for a VA (Vertical Alignment)-mode liquid crystal display device (e.g., polyimide-based or polyamic acid-based vertical alignment film produced by JSR Corporation, Nissan Chemical Industries, Ltd., or the like) is preferably usable. In order to vertically align liquid crystal molecules in a positive liquid crystal material having a high dielectric constant, it is preferable to use a vertical alignment film containing a hydrophobic element such as an alkyl group, a fluorine-containing group or the like introduced in a relatively large number to a side chain thereof.

It is preferable that the vertical alignment films 15 and 25 (or the alignment films 15' and 25') included in the first substrate 10 and the second substrate 20 on the optical layer 30 side are not subjected to a rubbing treatment. This simplifies the production process and decreases the production cost.

It is preferable that the thickness D of the optical layer 30 is 10 μm or greater and 20 μm or less. In the case where the thickness D of the optical layer 30 is smaller than the length l of the shape-anisotropic particles 32, the shape-anisotropic particles 32 may be stuck between the upper and lower substrates (the first substrate 10 and the second substrate 20) and may not assume a vertical alignment state. Therefore, it is preferable that the thickness D of the optical layer 30 is 10 μm or greater. In the case where the thickness D of the optical layer 30 is too large, the region in the optical layer 30 to which the transverse electric field is not effectively applied is enlarged. Therefore, it is preferable that the thickness D of the optical layer 30 is 20 μm or less.

It is preferable that the second substrate 20 includes a dielectric layer (overcoat layer) provided on the third electrode 21. Such a dielectric layer decreases the vertical electric field component in the optical layer 30 to increase the transverse electric field component. As a result, the probability of existence of the shape-anisotropic particles 32 to be switched in the state is increased. In order to provide this effect sufficiently, it is preferable that the specific dielectric constant εr and the thickness t [μm] of the dielectric layer fulfill the relationship of εr·t>7.

Figure 38:
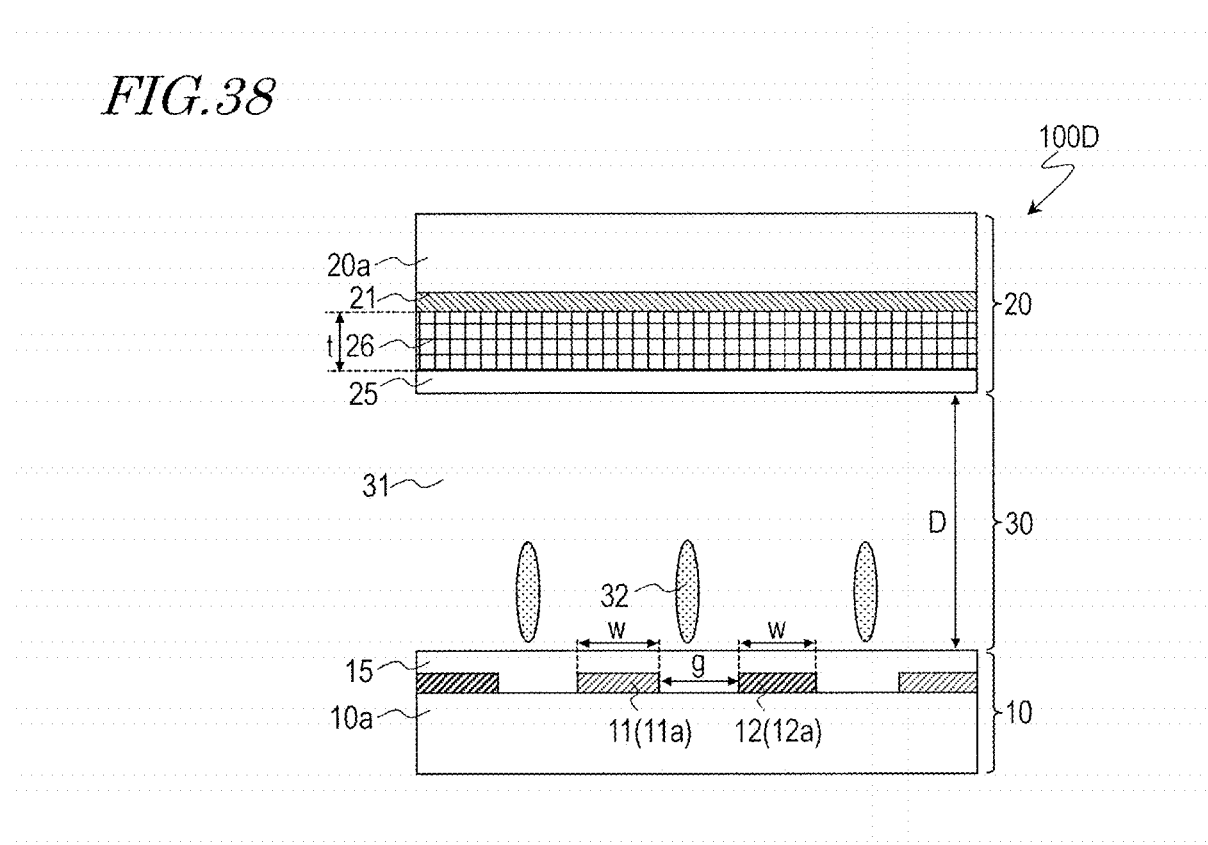
FIG. 38 is a cross-sectional view schematically showing an optical device 100D in example 4.

FIG. 38 shows an optical device 100D in example 4, which includes such a dielectric layer 26. Hereinafter, the results of an investigation performed on the switching of the state of the shape-anisotropic particles 32 by use of the optical device 100D in example 4 will be described. As shown in FIG. 38, in the optical device 100D in example 4, the second substrate 20 includes the dielectric layer 26 provided on the third electrode 21 (between the third electrode 21 and the vertical alignment film 25). The dielectric layer 26 has a specific dielectric constant εr of 3.4 and a thickness t of 3 μm.

In this example, the width w of the branches 11a of the first electrode 11 and the branches 12a of the second electrode 12 is 4 μm, and the width g of the gap between the branches 11a and the branches 12a is 4 μm. The thickness D of the optical layer 30 is 10 μm. The shape-anisotropic particles 32 are formed of aluminum flakes having a surface covered with an acrylic resin and also have a surface subjected to a hydrophobic organic treatment. The shape-anisotropic particles 32 have a specific dielectric constant of 2.7 to 4.5, and the content of the shape-anisotropic particles 32 in the optical layer 30 is 7 wt. %.

The liquid crystal material is formed of a fluorine-containing liquid crystal composition having positive dielectric anisotropy, and has a dielectric anisotropy value Δε of 20.4. The vertical alignment films 15 and 25 are polyamic vertical alignment films, and have a surface energy of 35.0 mJ/m², a contact angle with pure water of 90.2 degrees and a contact angle with $CH_2I_2$ of 49.0 degrees. For applying a transverse electric field, a voltage of ±5 V is applied between the first electrode 11 and the second electrode 12 at a frequency of 60 Hz. For applying a vertical electric field, a voltage of ±5 V is applied between the first and second electrodes 11 and 12 and the third electrode 21 at a frequency of 60 Hz.

Figure 39:
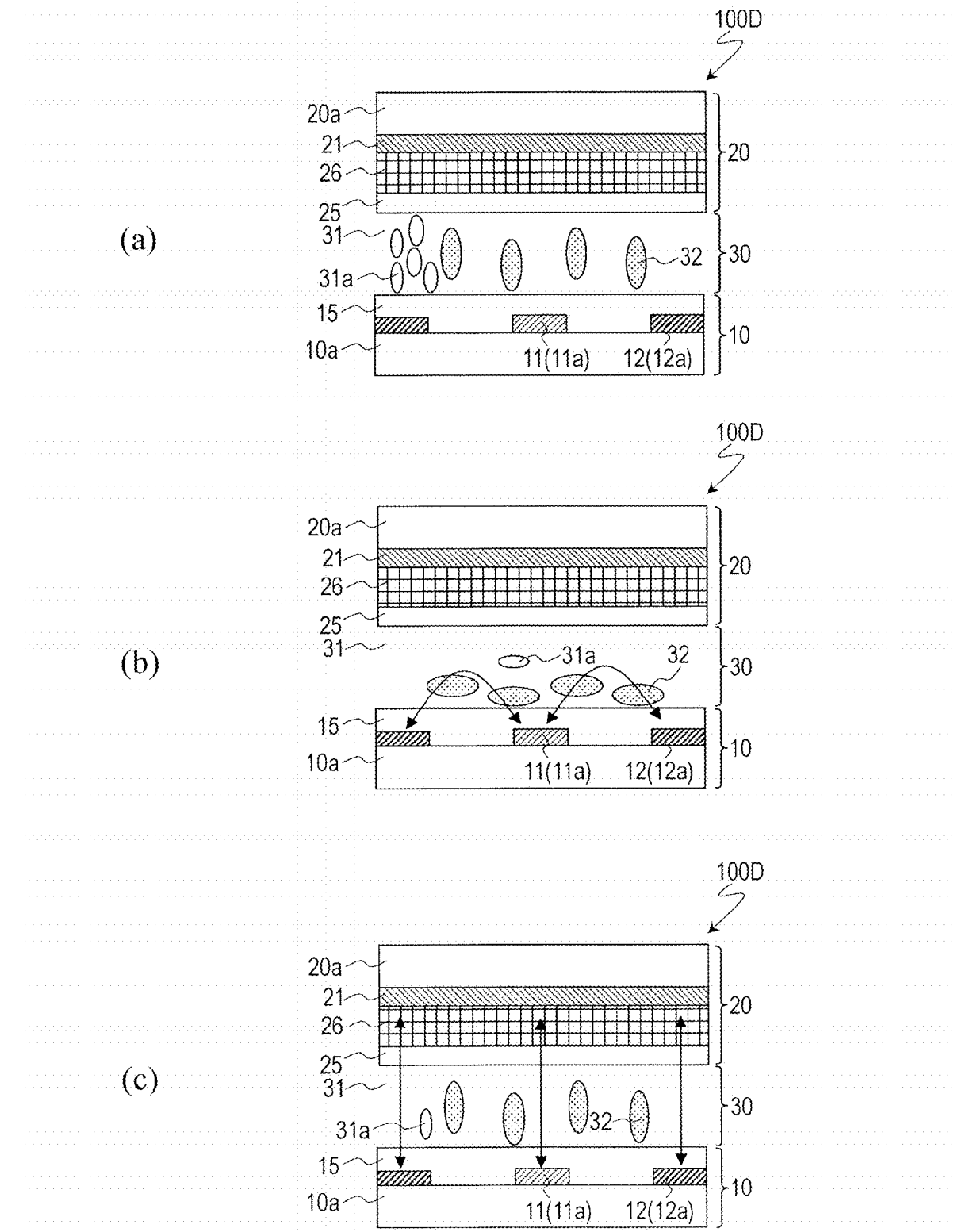
FIG. 39(*a*), FIG. 39(*b*) and FIG. 39(*c*) are cross-sectional views schematically showing the optical device 100D respectively in the state where no electric field is applied to the optical layer 30, in the state where a transverse electric field is applied to the optical layer 30, and in the state where a vertical electric field is applied to the optical layer 30.

FIG. 39(a), FIG. 39(b) and FIG. 39(c) are cross-sectional views schematically showing the optical device 100D respectively in the state where no electric field is applied to the optical layer 30, in the state where a transverse electric field is applied to the optical layer 30, and in the state where a vertical electric field is applied to the optical layer 30.

In the state where no electric field is applied to the optical layer 30, the liquid crystal molecules 31a are in a vertical alignment state as shown in FIG. 39(a) by the alignment control force of the vertical alignment films 15 and 25. In this state, the shape-anisotropic particles 32 are also in a vertical alignment state.

When a transverse electric field is applied to the optical layer 30, the liquid crystal molecules 31a assume a horizontal alignment state as shown in FIG. 39(b). At this point, the shape-anisotropic particles 32 also assume a horizontal alignment state.

When a vertical electric field is applied to the optical layer 30, the liquid crystal molecules 31a assume the vertical alignment state as shown in FIG. 39(c). At this point, the shape-anisotropic particles 32 also assume the vertical alignment state.

As described above, the optical device 100D in example 4 switches the state of the shape-anisotropic particles 32 between the vertical alignment state and the horizontal alignment state merely in accordance with absence/presence of the transverse electric field. Needless to say, a vertical electric field may be applied to the optical layer 30 when the horizontal alignment state is switched to the vertical alignment state. Such application of the vertical electric field improves the switching speed. The application of the vertical electric field also forcibly returns the shape-anisotropic particles 32 attached to the substrate in the horizontal alignment state into the vertical alignment state (initial alignment state). In addition, in the optical device 100D in example 4, the dielectric layer 26 is provided on the third electrode 21. Therefore, the region to which the transverse electric field is applied effectively is larger than in the optical device 100A in example 1.

Now, the results of an investigation performed on an optical device 800 in comparative example 4 will be described.

As shown in FIG. 40(a) and FIG. 40(b), the optical device 800 in comparative example 4 includes a rear-side substrate 810, a front-side substrate 820, and an optical layer 830 provided between the rear-side substrate 810 and the front-side substrate 820.

The rear-side substrate 810 includes a comb-like first electrode 811, a comb-like second electrode 812, and a horizontal alignment film 815 provided on the first electrode 811 and the second electrode 812. The front-side substrate 820 includes a third electrode 821, a dielectric layer 826 provided on the third electrode 821, and a horizontal alignment film 825 provided on the dielectric layer 826.

The optical layer 830 includes a medium 831 and shape-anisotropic particles 832 dispersed in the medium 831. The medium 831 is a positive liquid crystal material.

In the state where no electric field is applied to the optical layer 830, the liquid crystal molecules 831a are in a horizontal alignment state as shown in FIG. 40(a) by the alignment control force of the horizontal alignment films 815 and 825. In this state, the shape-anisotropic particles 832 are also in a horizontal alignment state.

When a vertical electric field is applied to the optical layer 830, the liquid crystal molecules 831a assume a vertical alignment state as shown in FIG. 40(b). By contrast, the shape-anisotropic particles 32 are kept attached to surfaces of the horizontal alignment films 815 and 825.

As described above, the optical device 800 in comparative example 4 does not switch the state of the shape-anisotropic particles 832 in a preferable manner.

Figure 41:
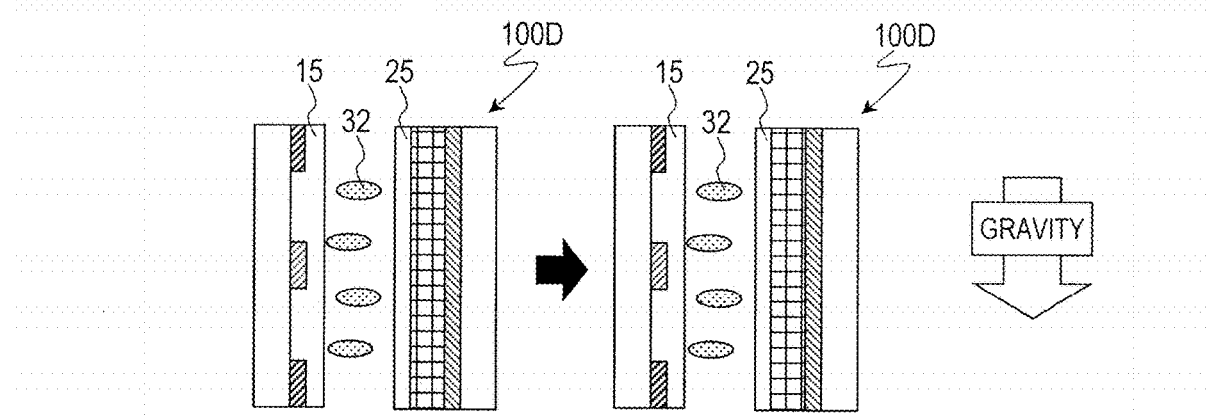
FIG. 41 shows the results of an investigation performed on precipitation of the shape-anisotropic particles 32 included in the optical device 100D in example 4 caused by gravity.

FIG. 41 shows the results of an investigation performed on precipitation of the shape-anisotropic particles 32 included in the optical device 100D in example 4 caused by gravity. A left part of FIG. 41 shows a state immediately after the optical device 100D is located such that the normal to the optical layer 30 is perpendicular to the direction of gravity (namely, immediately after the optical device 100D is located in a "vertical manner"). A right part of FIG. 41 shows a state when a sufficiently long time passes thereafter. As is seen from FIG. 41, the alignment control force of the vertical alignment films 15 and 25 suppresses the shape-anisotropic particles 32 from being precipitated.

Figure 42:
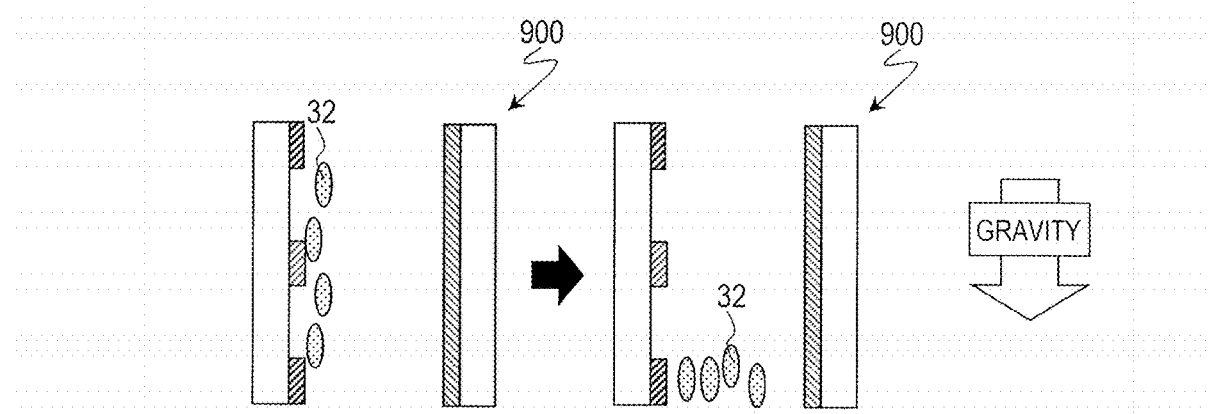
FIG. 42 shows the results of an investigation performed on precipitation of the shape-anisotropic particles 32 included in an optical device 900 in comparative example 5 caused by gravity.

FIG. 42 shows the results of a similar investigation performed on an optical device 900 in comparative example 5. The optical device 900 in comparative example 5 has substantially the same structure as that of the optical device 100D in example 4 except that the optical device 900 does not include any vertical alignment film in either the first substrate 10 or the second substrate 20 on the optical layer 30 side. A left part of FIG. 42 shows a state immediately after the optical device 900 is located such that the normal to the optical layer 30 is perpendicular to the direction of gravity (namely, immediately after the optical device 900 is located in a "vertical manner"). A right part of FIG. 42 shows a state when a sufficiently long time passes thereafter. As is seen from FIG. 42, in the optical device 900 in comparative example 5, the shape-anisotropic particles 32 are precipitated as the time passes.

Figure 43:
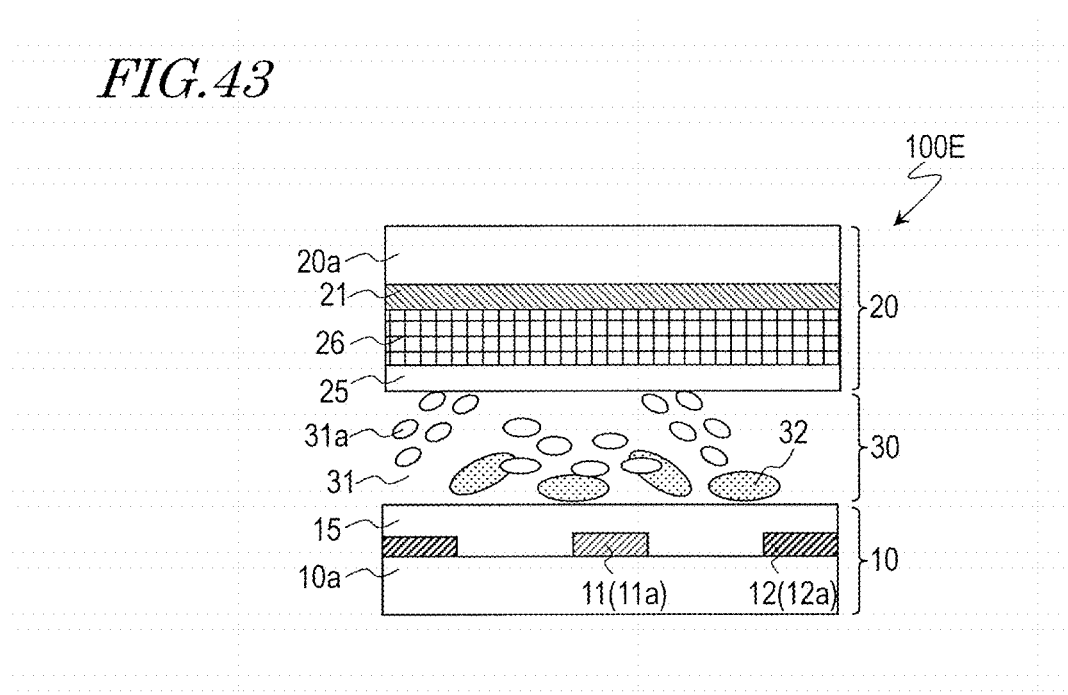
FIG. 43 is a cross-sectional view schematically showing an optical device 100E in example 5.

Now, the results of an investigation performed on the switching of the state of the shape-anisotropic particles 32 in an optical device 100E in example 5 shown in FIG. 43 will be described.

The vertical alignment films 15 and 25 included in the optical device 100E in example 5 are different from the vertical alignment films 15 and 25 included in the optical device 100D in example 4. Specifically, the vertical alignment films 15 and 25 included in the optical device 100E in example 5 each have a surface energy of 38.4 mJ/m$^2$, and have a contact angle with pure water of 80.3 degrees and a contact angle with $CH_2I_2$ of 45.1 degrees.

Figure 44:
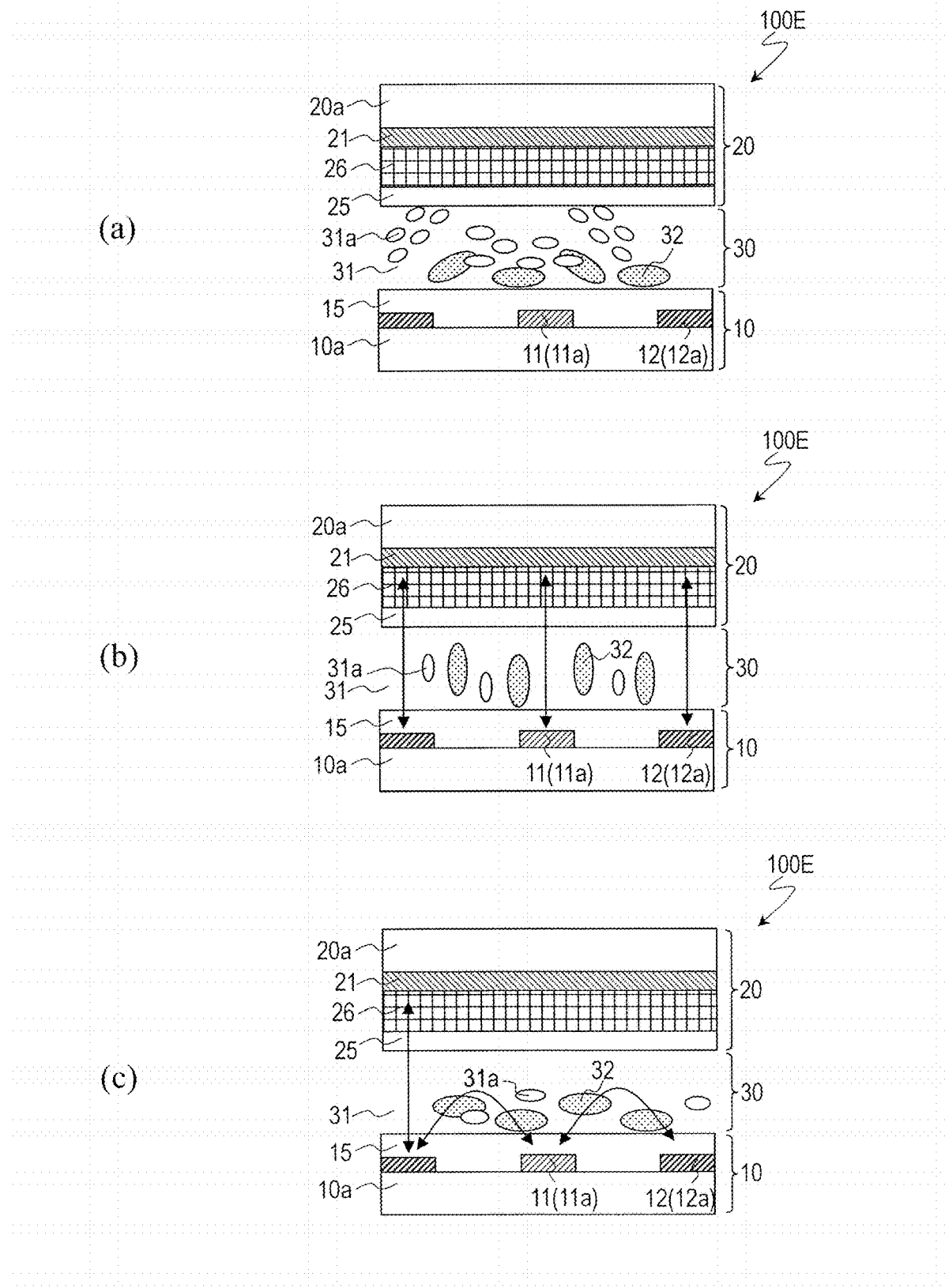
FIG. 44(*a*), FIG. 44(*b*) and FIG. 44(*c*) are cross-sectional views of the optical device 100E respectively in the state where no electric field is applied to the optical layer 30, in the state where a vertical electric field is applied to the optical layer 30, and in the state where a transverse electric field is applied to the optical layer 30.

FIG. 44(a), FIG. 44(b) and FIG. 44(c) are cross-sectional views schematically showing the optical device 100E respectively in the state where no electric field is applied to the optical layer 30, in the state where a vertical electric field is applied to the optical layer 30, and in the state where a transverse electric field is applied to the optical layer 30.

In the state where no electric field is applied to the optical layer 30, the liquid crystal molecules 31a are not in a vertical alignment state as shown in FIG. 44(a). A reason for this is that the alignment control force of the vertical alignment films 15 and 25 is slightly weak, and the vertical alignment films 15 and 25 do not act as vertical alignment films in a strict sense on the liquid crystal material used (positive liquid crystal material having a large dielectric anisotropy value Δε). Therefore, the shape-anisotropic particles 32 are not in a vertical alignment state, either. However, a part of the liquid crystal molecules 31a are vertically aligned or in a state of attempting to be vertically aligned. Therefore, the shape-anisotropic particles 32 are also attempting to be vertically aligned, and thus are difficult to be attached to the substrate.

When a vertical electric field is applied to the optical layer 30, the liquid crystal molecules 31a assume a vertical alignment state as shown in FIG. 44(b). At this point, the shape-anisotropic particles 32 also assume a vertical alignment state.

When a transverse electric field is applied to the optical layer 30, the liquid crystal molecules 31a assume a horizontal alignment state as shown in FIG. 44(c). At this point, the shape-anisotropic particles 32 also assume a horizontal alignment state.

As described above, the optical device 100E in example 5 also switches the state of the shape-anisotropic particles 32 in a preferable manner.

Figure 45:
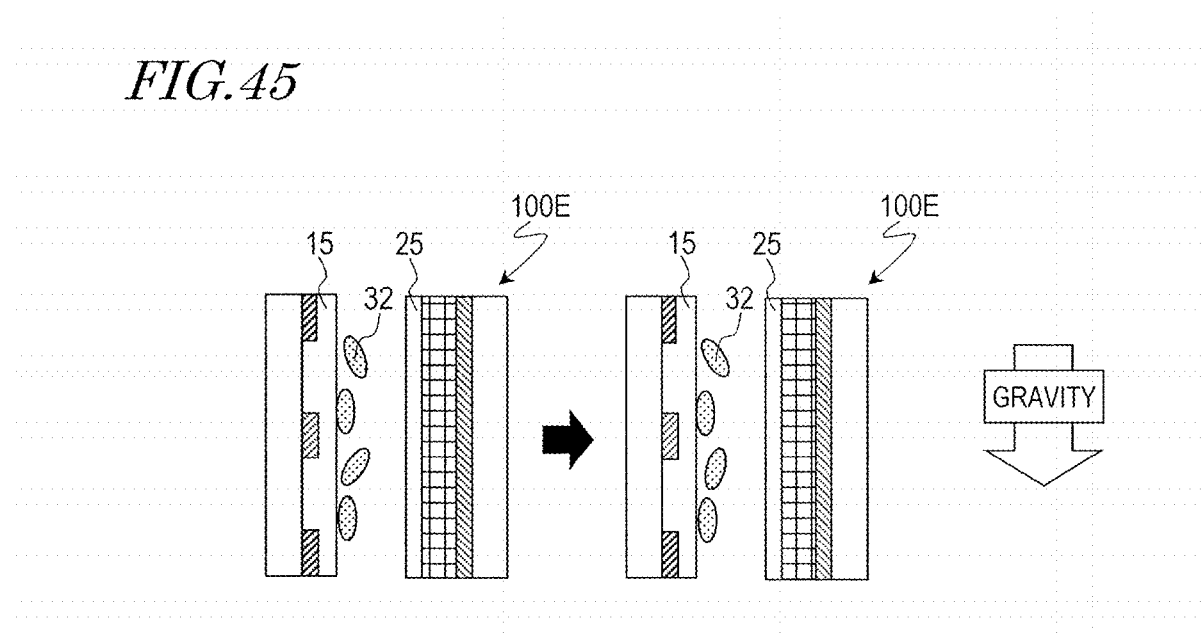
FIG. 45 shows the results of an investigation performed on precipitation of the shape-anisotropic particles 32 included in the optical device 100E in example 5 caused by gravity.

FIG. 45 shows the results of an investigation performed on precipitation of the shape-anisotropic particles 32 included in the optical device 100E in example 5 caused by gravity. A left part of FIG. 45 shows a state immediately after the optical device 100E is located such that the normal to the optical layer 30 is perpendicular to the direction of gravity (namely, immediately after the optical device 100E is located in a "vertical manner"). A right part of FIG. 45 shows a state when a sufficiently long time passes thereafter. As is seen from FIG. 45, although the liquid crystal molecules 31a are not in the vertical alignment state, the shape-anisotropic particles 32 are prevented from being precipitated.

Now, the results of an investigation, performed by a simulation, on the effect realized by providing the dielectric layer 26 on the third electrode 21 will be described.

Figure 46:
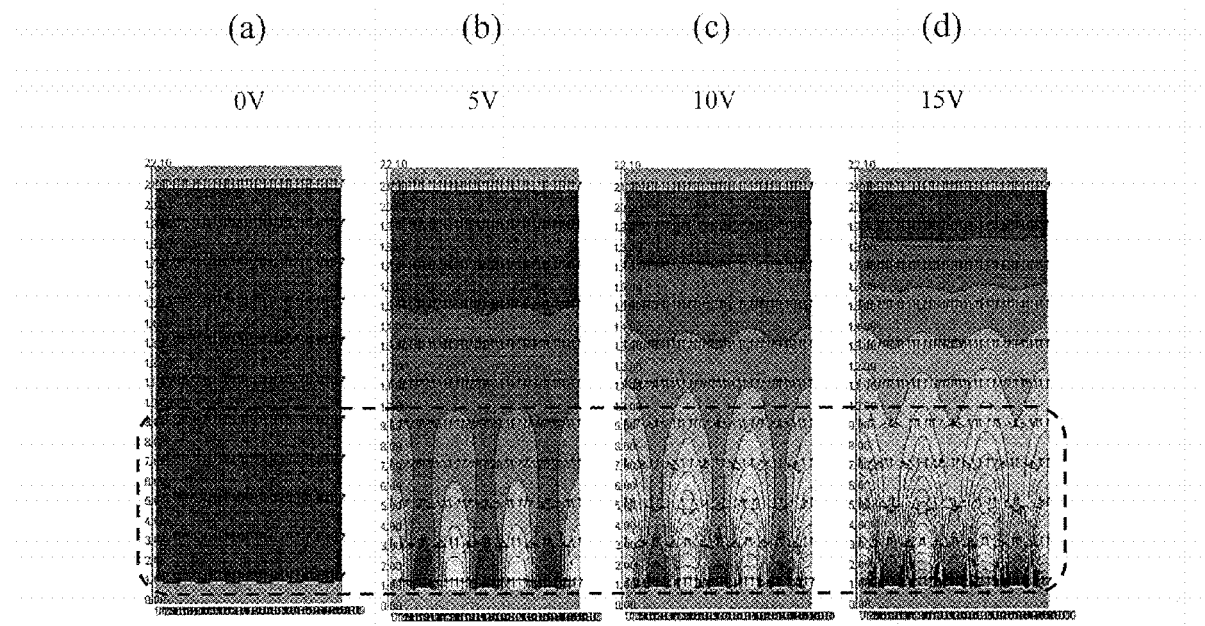
FIG. 46(*a*), FIG. 46(*b*), FIG. 46(*c*) and FIG. 46(*d*) show the results of simulation performed on the alignment state of the liquid crystal molecules 31*a* when a transverse electric field is applied to the optical layer 30 in the case where a dielectric layer 26 is not provided on a third electrode 21, and respectively show the results when the applied voltage is 0 V, 5 V, 10 V and 15 V.
Figure 47:
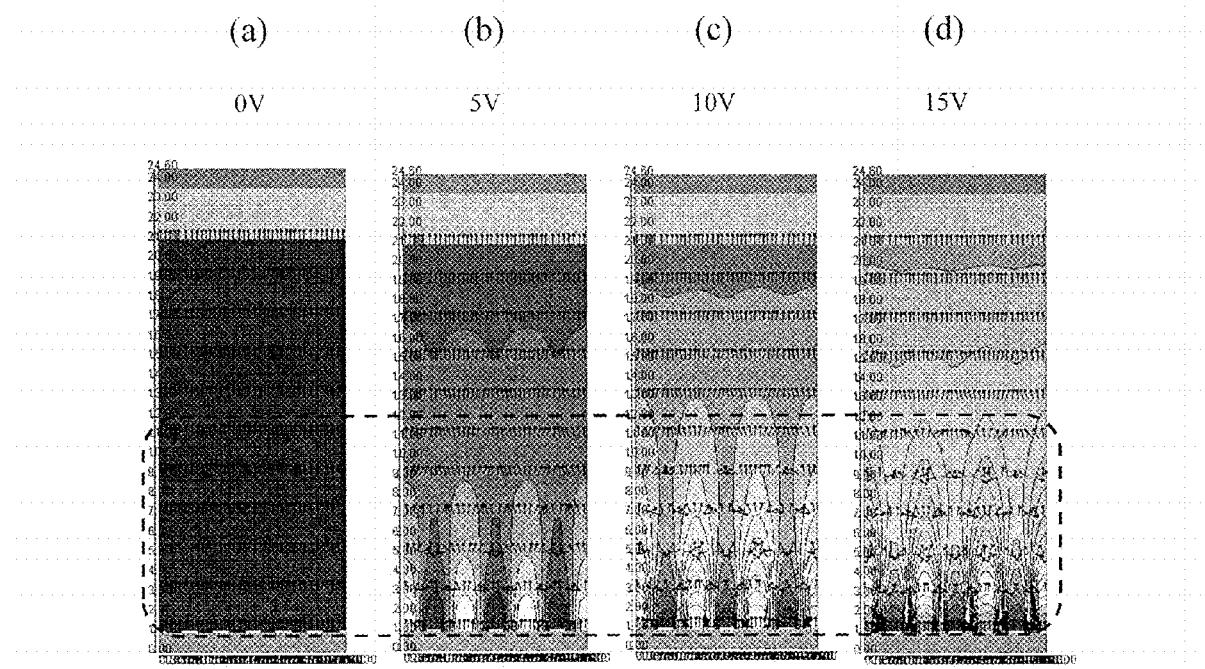
FIG. 47(*a*), FIG. 47(*b*), FIG. 47(*c*) and FIG. 47(*d*) show the results of simulation performed on the alignment state of the liquid crystal molecules 31*a* when a transverse electric field is applied to the optical layer 30 in the case where the dielectric layer 26 is provided on the third electrode 21, and respectively show the results when the applied voltage is 0 V, 5 V, 10 V and 15 V.

FIG. 46 and FIG. 47 shows the results of simulation performed on the alignment state of the liquid crystal molecules 31a when a transverse electric field is applied to the optical layer 30. FIG. 46 and FIG. 47 each show an alignment direction (director) and equipotential lines when the transverse electric field is applied. In the case where the liquid crystal material contained in the medium 31 is of a positive type, the change in the alignment direction of the shape-anisotropic particles 32 follows the change in the alignment direction of the liquid crystal molecules 31a. Therefore, the director of the liquid crystal molecules 31a may be considered as the alignment direction of the shape-anisotropic particles 32. For the simulation, Expert LCD produced by JEDAT Inc. was used. The simulation parameters were as shown in Table 1 below.

TABLE 1

| Liquid crystal material | ne | 1.6010 |
|---|---|---|
| | no | 1.4796 |
| | Δn | 0.1214 |
| | $\varepsilon_{//}$ | 24.7 |
| | $\varepsilon_{\perp}$ | 4.3 |
| | Δε | 20.4 |
| | γ1 | 163 mPa · s |
| | K1 | 12.1 pN |
| | K3 | 13.9 pN |
| Specific dielectric constant of the dielectric layer | | 3.7 |
| Thickness of the dielectric layer | | 2.5 μm |
| Thickness of the optical layer | | 20 μm |
| Pretilt angle | | 90° |

FIG. 46(a), FIG. 46(b), FIG. 46(c) and FIG. 46(d) show the simulation results in the case where the dielectric layer 26 is not provided on the third electrode 21, and respectively show the results when the applied voltage is 0 V, 5 V, 10 V and 15 V. FIG. 47(a), FIG. 47(b), FIG. 47(c) and FIG. 47(d) show the simulation results in the case where the dielectric layer 26 is provided on the third electrode 21, and respectively show the results when the applied voltage is 0 V, 5 V, 10 V and 15 V.

As is seen from a comparison of FIG. 46 and FIG. 47 against each other, provision of the dielectric layer 26 enlarges the region to which the transverse electric field is applied effectively (region enclosed by the dashed line in the figures; hereinafter, referred to as the "transverse electric field region"). A reason for this is that the voltage pull-in to the third electrode 21 is alleviated (the interval between the equipotential lines in the thickness direction of the optical layer 30 is enlarged).

Now, with reference to FIG. 48 and FIG. 49, the results of an investigation performed on the relationship between the thickness D of the optical layer 30 and the size of the transverse electric field region in the case where the dielectric layer 26 is provided on the third electrode 21 and in the case where the dielectric layer 26 is not provided on the third electrode 21 will be described.

FIG. 48(a), FIG. 48(b) and FIG. 48(c) show the simulation results in the case where the dielectric layer 26 is not provided on the third electrode 21, and respectively show the results when the thickness D of the optical layer 30 is 20 µm, 10 µm and 5 µm at an applied voltage of 15 V. FIG. 49(a), FIG. 49(b) and FIG. 49(c) show the simulation results in the case where the dielectric layer 26 is provided on the third electrode 21, and respectively show the results when the thickness D of the optical layer 30 is 20 µm, 10 µm and 5 µm at an applied voltage of 15 V.

Figure 48:
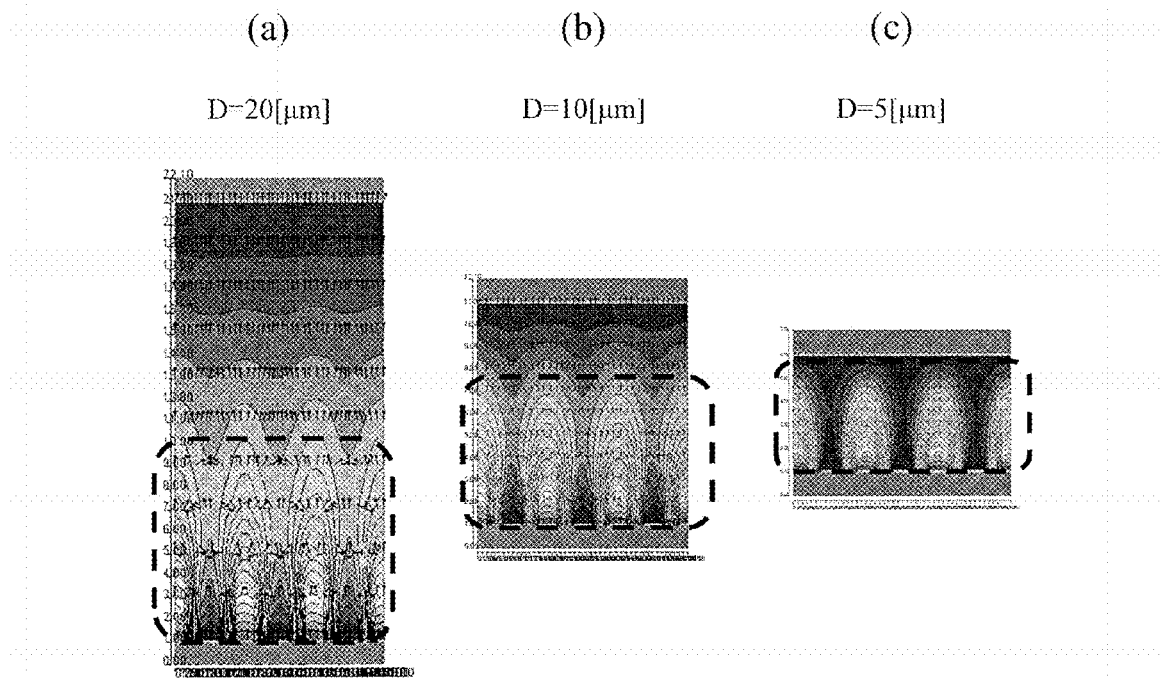
FIG. 48(*a*), FIG. 48(*b*) and FIG. 48(*c*) show the results of simulation in the case where the dielectric layer 26 is not provided on the third electrode 21, and respectively show the results when thickness D of the optical layer 30 is 20 µm, 10 µm and 5 µm at an applied voltage of 15 V.
Figure 49:
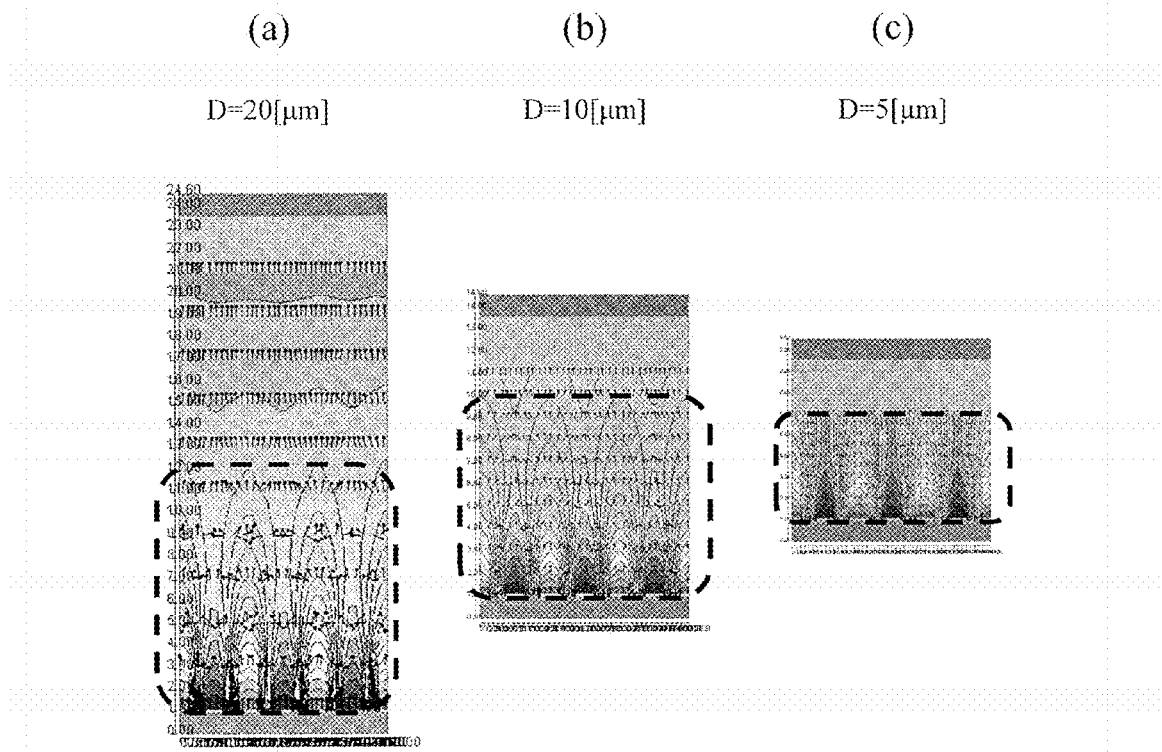
FIG. 49(*a*), FIG. 49(*b*) and FIG. 49(*c*) show the results of simulation in the case where the dielectric layer 26 is provided on the third electrode 21, and respectively show the results when the thickness D of the optical layer 30 is 20 µm, 10 µm and 5 µm at an applied voltage of 15 V.

As is seen from a comparison of FIG. 48 and FIG. 49, regardless of whether the dielectric layer 26 is provided or not on the third electrode 21, as the thickness D of the optical layer 30 is decreased, the ratio of the transverse electric field region with respect to the optical layer 30 is increased. It is seen that especially in the case where the dielectric layer 26 is provided on the third electrode 21, when the thickness D of the optical layer 30 is decreased to 10 µm, the transverse electric field is effectively applied to the substantially the entirety of the optical layer 30.

Figure 50:
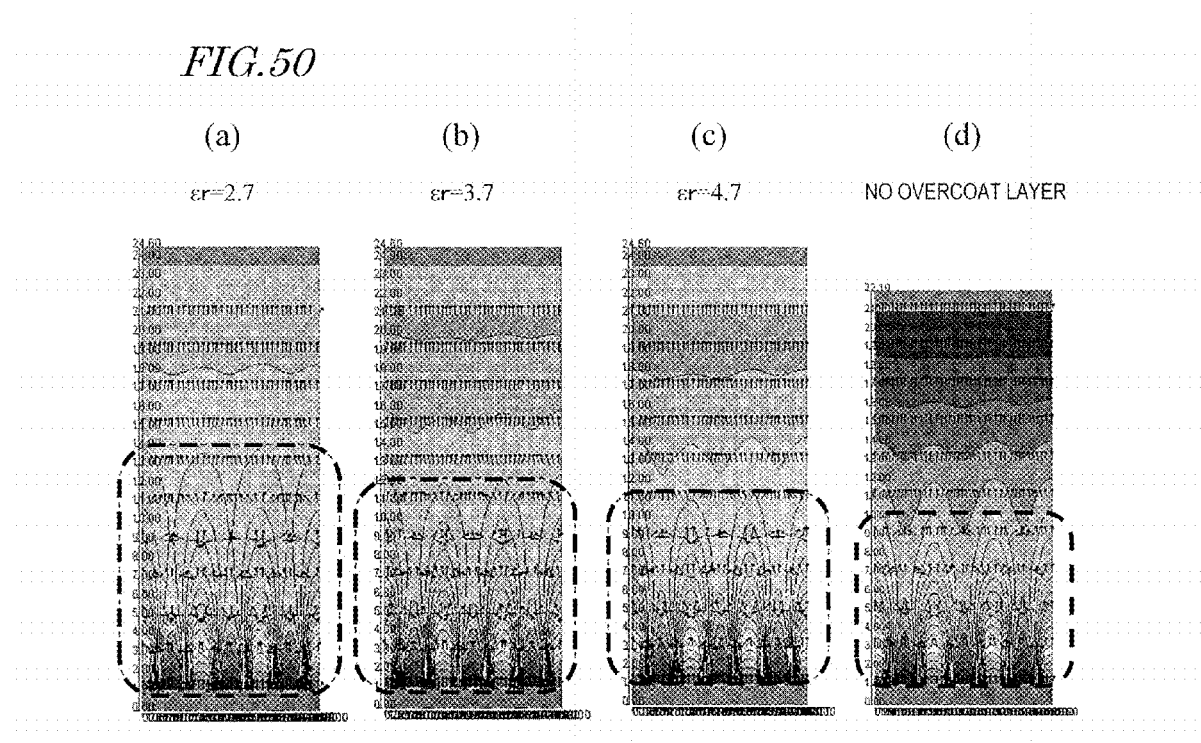
FIG. 50(*a*), FIG. 50(*b*) and FIG. 50(*c*) respectively show the results of simulation in the case where specific dielectric constant εr of the dielectric layer 26 is 2.7, 3.7 and 4.7, and FIG. 50(*d*) shows the results of simulation in the case where the dielectric layer (overcoat layer) 26 is not provided.

Now, with reference to FIG. 50, the results of an investigation performed on the relationship between the level of the specific dielectric constant εr of the dielectric layer 26 and the size of the transverse electric field region will be described.

FIG. 50(a), FIG. 50(b) and FIG. 50(c) respectively show the simulation results in the case where the specific dielectric constant εr of the dielectric layer 26 is 2.7, 3.7 and 4.7. FIG. 50(d) shows the simulation results in the case where the dielectric layer (overcoat layer) 26 is not provided. In all of FIG. 50(a), FIG. 50(b), FIG. 50(c) and FIG. 50(d), the thickness t of the dielectric layer 26 is 2.5 µm, the thickness D of the optical layer 30 is 20 µm, and the applied voltage is 15 V.

As is seen from a comparison of FIG. 50(a), FIG. 50(b) and FIG. 50(c) against FIG. 50(d), provision of the dielectric layer 26 enlarges the transverse electric field region. As is seen from a comparison of FIG. 50(a), FIG. 50(b) and FIG. 50(c) against each other, as the specific dielectric constant εr of the dielectric layer 26 is decreased, the voltage pull-in to the third electrode 21 is alleviated (the interval between the equipotential lines in the thickness direction of the optical layer 30 is enlarged), and thus the transverse electric field region is enlarged.

Figure 51:
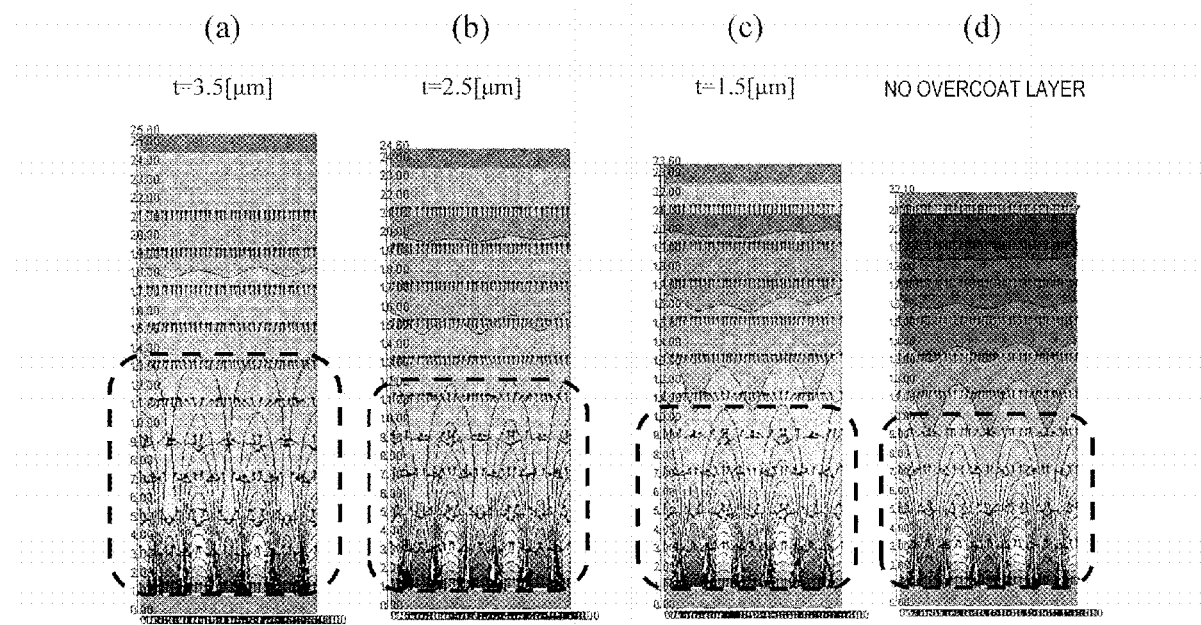
FIG. 51(*a*), FIG. 51(*b*) and FIG. 51(*c*) respectively show the results of simulation in the case where thickness t of the dielectric layer 26 is 3.5 µm, 2.5 µm and 1.5 µm, and FIG. 51(*d*) shows the results of simulation in the case where the dielectric layer (overcoat layer) 26 is not provided.

Now, with reference to FIG. 51, the results of an investigation performed on the relationship between the thickness t of the dielectric layer 26 and the size of the transverse electric field region will be described.

FIG. 51(a), FIG. 51(b) and FIG. 51(c) respectively show the simulation results in the case where the thickness t of the dielectric layer 26 is 3.5 µm, 2.5 µm and 1.5 µm. FIG. 51(d) shows the simulation results in the case where the dielectric layer (overcoat layer) 26 is not provided. In all of FIG. 51(a), FIG. 51(b), FIG. 51(c) and FIG. 51(d), the specific dielectric constant εr of the dielectric layer 26 is 3.7, the thickness D of the optical layer 30 is 20 µm, and the applied voltage is 15 V.

As is seen from a comparison of FIG. 51(a), FIG. 51(b) and FIG. 51(c) against FIG. 51(d), provision of the dielectric layer 26 enlarges the transverse electric field region. As is seen from a comparison of FIG. 51(a), FIG. 51(b) and FIG. 51(c) against each other, as the thickness t of the dielectric layer 26 is increased, the voltage pull-in to the third electrode 21 is alleviated (the interval between the equipotential lines in the thickness direction of the optical layer 30 is enlarged), and thus the transverse electric field region is enlarged.

As is seen from the investigation results described with reference to FIG. 50 and FIG. 51, from the point of view of enlarging the transverse electric field region, it is preferable that the specific dielectric constant εr of the dielectric layer 26 is small and the thickness t of the dielectric layer 26 is large. In consideration that a low dielectric constant material currently mass-produced has a specific dielectric constant εr of about 3.5 and that the thickness of a film with which the film is allowed to be coated uniformly is about 2 µm, it is preferable that the specific dielectric constant εr and the thickness t of the dielectric layer 26 fulfill the relationship of εr·t>7.

Now, with reference to FIG. 52 through FIG. 55, the results of an investigation performed on the relationship between the thickness D of the optical layer 30 and the number of the shape-anisotropic particles 32 to be switched in the state will be described.

Figure 54:
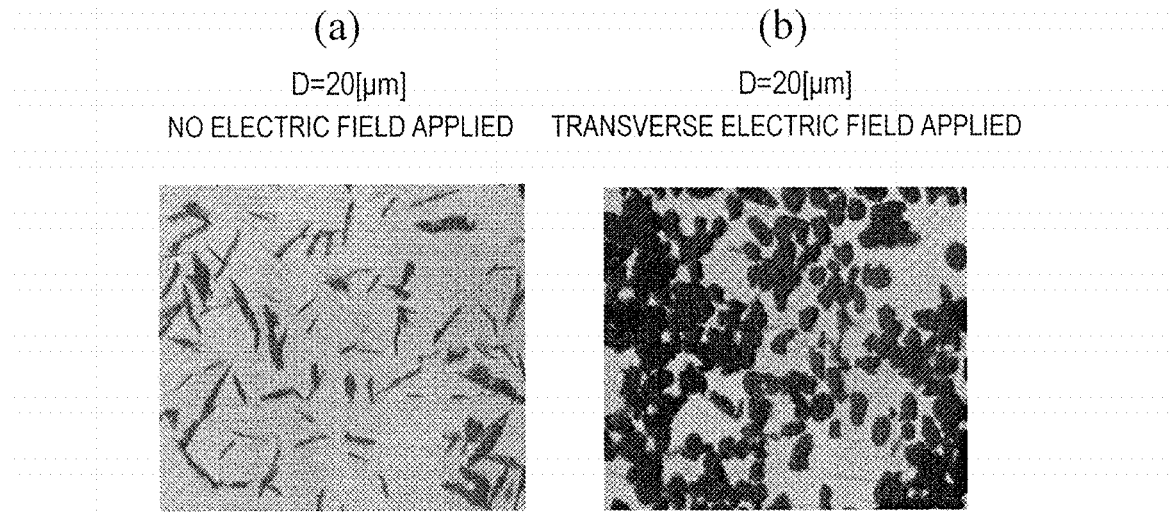
FIG. 54(a) and FIG. 54(b) are optical micrographs of the optical layer 30 having a thickness D of 20 μm, respectively in the state where no electric field is applied to the optical layer 30 and in the state where a transverse electric field is applied to the optical layer 30.
Figure 55:
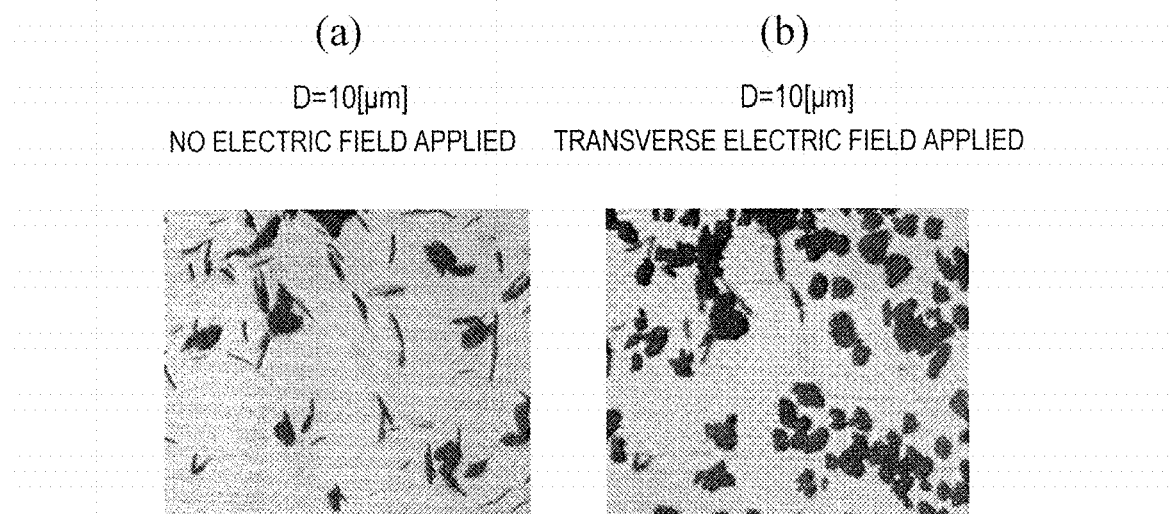
FIG. 55(a) and FIG. 55(b) are optical micrographs of the optical layer 30 having a thickness D of 10 μm, respectively in the state where no electric field is applied to the optical layer 30 and in the state where a transverse electric field is applied to the optical layer 30.

FIG. 52(a) and FIG. 52(b) are optical micrographs of the optical layer 30 having a thickness D of 50 µm, respectively in the state where no electric field is applied to the optical layer 30 and in the state where a transverse electric field is applied to the optical layer 30. FIG. 53(a) and FIG. 53(b) are optical micrographs of the optical layer 30 having a thickness D of 30 µm, respectively in the state where no electric field is applied to the optical layer 30 and in the state where a transverse electric field is applied to the optical layer 30. FIG. 54(a) and FIG. 54(b) are optical micrographs of the optical layer 30 having a thickness D of 20 µm, respectively in the state where no electric field is applied to the optical layer 30 and in the state where a transverse electric field is applied to the optical layer 30. FIG. 55(a) and FIG. 55(b) are optical micrographs of the optical layer 30 having a thickness D of 10 µm, respectively in the state where no electric field is applied to the optical layer 30 and in the state where a transverse electric field is applied to the optical layer 30. In all of FIG. 52 through FIG. 55, the liquid crystal material contained in the medium 31 is formed of a fluorine-containing liquid crystal composition having positive dielectric anisotropy (having the properties shown in Table 1) and the content Cf of the shape-anisotropic particles 32 in the optical layer 30 is 3 wt. %. The voltage applied to the optical layer 30 is an AC voltage of Vpp=10 [V] at a frequency of 60 Hz.

As is seen from FIG. 52 through FIG. 55, as the thickness D of the optical layer 30 is decreased, the ratio of the shape-anisotropic particles 32 to be switched in the state (i.e., the shape-anisotropic particles 32, the alignment direction of which is changed between in the case where no electric field is applied and in the case where a transverse electric field is applied), is increased. This is considered to occur because as the thickness D of the optical layer 30 is decreased, the transverse electric field region is enlarged (the region to which the transverse electric field is not effectively applied is reduced). It should be noted that in the case where the thickness D of the optical layer 30 is 10 µm, there are the shape-anisotropic particles 32 that are not vertically aligned in the state where no electric field is applied although the number of such shape-anisotropic particles 32 is very small (see FIG. 55(*a*)). A reason for this is that a part of the shape-anisotropic particles 32 are stuck between the upper and lower substrates. It is considered that the number of the shape-anisotropic particles 32 stuck between the upper and lower substrates is further increased as the thickness D of the optical layer 30 is further decreased (to less than 10 μm). For these reasons, it is preferable that the thickness D of the optical layer 30 is 10 μm or greater and 20 μm or less.

Now, with reference to FIG. 56 and FIG. 57, the results of an investigation performed on the relationship between the content Cf of the shape-anisotropic particles 32 in the optical layer 30 and the number of the shape-anisotropic particles 32 to be switched in the state will be described.

FIG. 56(*a*) and FIG. 56(*b*) are optical micrographs of the optical layer 30 containing the shape-anisotropic particles 32 at a content Cf of 7.5 wt. %, respectively in the state where no electric field is applied to the optical layer 30 and in the state where a transverse electric field is applied to the optical layer 30. FIG. 57(*a*) and FIG. 57(*b*) are optical micrographs of the optical layer 30 containing the shape-anisotropic particles 32 at a content Cf of 3.0 wt. %, respectively in the state where no electric field is applied to the optical layer 30 and in the state where a transverse electric field is applied to the optical layer 30. In all of FIG. 56 and FIG. 57, the liquid crystal material contained in the medium 31 is formed of a fluorine-containing liquid crystal composition having positive dielectric anisotropy (having the properties shown in Table 1) and the thickness D of the optical layer 30 is 20 μm. The voltage applied to the optical layer 30 is an AC voltage of Vpp=10 [V] at a frequency of 60 Hz.

As is seen from a comparison of FIG. 56 and FIG. 57 against each other, in the case where the content Cf of the shape-anisotropic particles 32 is 7.5 wt. %, the number of the shape-anisotropic particles 32 that are not switched in the state is larger than in the case where the content Cf of the shape-anisotropic particles 32 is 3.0 wt. %. This is considered to occur because the number of the shape-anisotropic particles 32 is too large. The investigation performed by the present inventor has found that the content Cf [wt. %] of the shape-anisotropic particles 32 in the optical layer 30, and the thickness D [μm] of the shape-anisotropic particles 32, preferably fulfill the relationship of $4 \leq (Cf \cdot D)/10 \leq 15$, and more preferably fulfill relationship of $5 \leq (Cf \cdot D)/10 \leq 13$.

In the above description, the first substrate 10 as an active matrix substrate is located on the rear wide. The location of the first substrate 10 is not limited to this. The first substrate 10 may be located on the front side. The first substrate 10 as an active matrix substrate includes an element formed of a light-blocking material. Therefore, a structure in which the first substrate 10 is located on the rear side utilizes the effect provided by the reflecting characteristic of the shape-anisotropic particles 32 to the maximum possible degree.

In the above description, the first electrode 11 and the second electrode 12 are located at the same height level (typically, the first electrode 11 and the second electrode 12 are formed of the same conductive film in the same step). The first electrode 11 and the second electrode 12 are not limited to being arranged in this manner. One of the first electrode 11 and the second electrode 12 may be located on the other of the first electrode 11 and the second electrode 12 with an insulating layer being held therebetween. In such a case, the electrode located at the lower position does not need to be a comb-like electrode including a plurality of branches, but may be a so-called solid electrode. Examples of the first substrate 10 having such a structure are shown in FIG. 58 and FIG. 59.

Figure 58:
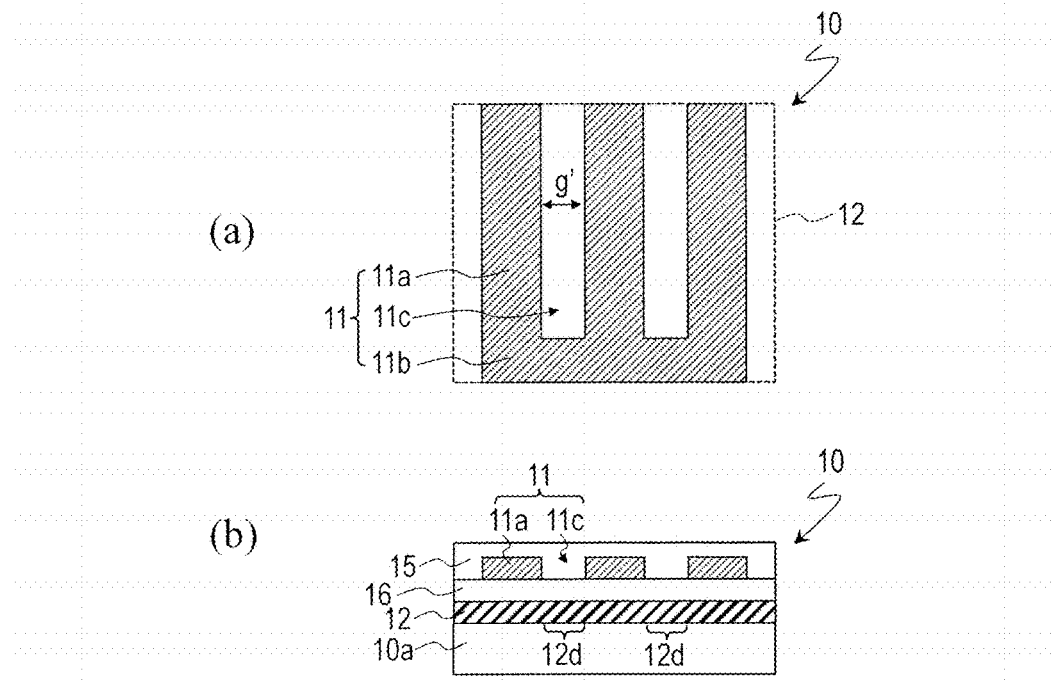
FIG. 58(a) and FIG. 58(b) are respectively a plan view and a cross-sectional view showing another example of electrode structure of the first substrate 10.

In the example shown in FIG. 58(*a*) and FIG. 58(*b*), the first electrode 11 is provided on the second electrode 12 with an insulting layer 16 being held therebetween. The first electrode 11 includes the stem 11*b* and the plurality of branches 11*a* extending from the stem 11*b*. A slit 11*c* is formed between each two adjacent branches 11*a*. The second electrode 12 is a solid electrode, and includes portions 12*d* facing the slits 11*c* of the first electrode 11. The portions 12*d* are formed of a conductive film.

Figure 59:
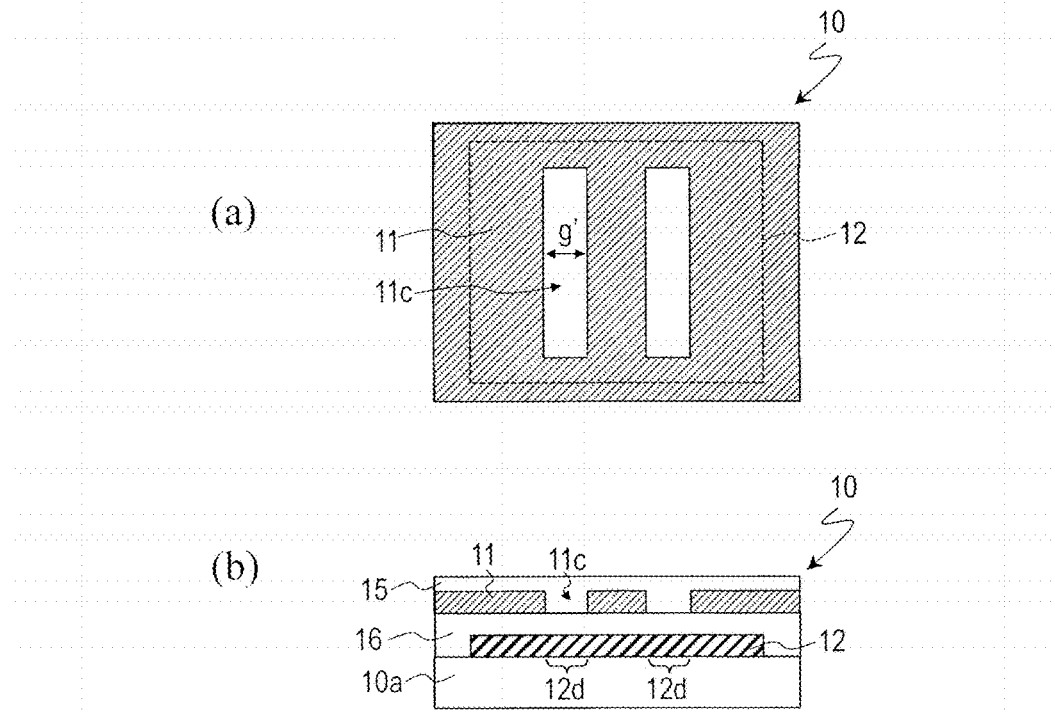
FIG. 59(a) and FIG. 59(b) are respectively a plan view and a cross-sectional view showing still another example of electrode structure of the first substrate 10.

In the example shown in FIG. 59(*a*) and FIG. 59(*b*), the first electrode 11 is provided on the second electrode 12 with the insulting layer 16 being held therebetween. The first electrode 11 includes the plurality of slits 11*c*. The slits 11*c* of the first electrode 11 shown in FIG. 58(*a*) and FIG. 58(*b*) are not completely enclosed by the conductive film (the stem 11*b* and the branches 11*a*), whereas the slits 11*c* of the first electrode 11 shown in FIG. 59(*a*) and FIG. 59(*b*) are completely enclosed by the conductive film. The second electrode 12 is a solid electrode, and includes the portions 12*d* facing the slits 11*c* of the first electrode 11. The portions 12*d* are formed of a conductive film.

Figure 60:
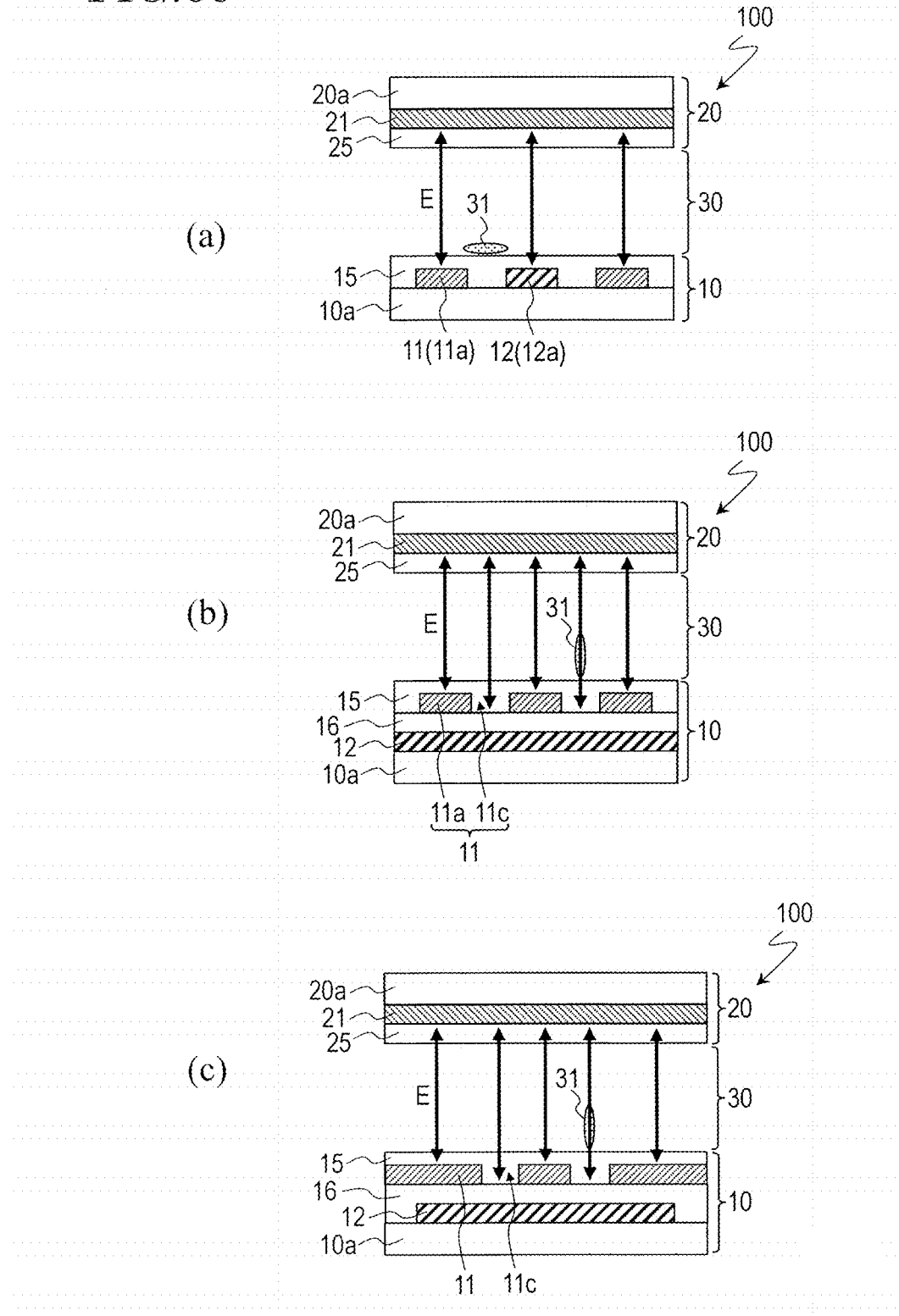
FIG. 60(a), FIG. 60(b) and FIG. 60(c) show the optical device 100 when a vertical electric field is applied, respectively in the case where the electrode structure shown in FIG. 1 is adopted, in the case where the electrode structure shown in FIG. 58 is adopted, and in the case where the electrode structure shown in FIG. 59 is adopted.

Referring to FIG. 60(*a*), with the electrode structure shown in FIG. 1 and the like, a vertical electric field, when being applied, does not effectively act on a region above the gap between the first electrode 11 and the second electrode 12 in the vicinity of the surface of the first substrate 10. Thus, the shape-anisotropic particles 32 attached to the first substrate 10 in the region may not be separated from the substrate 10 easily.

By contrast, referring to FIG. 60(*b*) and FIG. 60(*c*), with the electrode structures shown in FIG. 58 and FIG. 59, a vertical electric field, when being applied, effectively acts above the slits 11*c* of the first electrode 11. Thus, the shape-anisotropic particles 32 attached to the first substrate 10 above the slits 11*c* are separated from the substrate 10 with more certainty.

In each of FIG. 58 and FIG. 59, there are two slits 11*c*. It is sufficient that at least one slit 11*c* is formed. It is preferable that width g' of the slit 11*c* (see FIG. 58(*a*) and FIG. 59(*a*)) and the length l of the shape-anisotropic particles 32 fulfill the relationship of $g' > l \cdot (\frac{1}{2})$, like the inter-electrode distance g and the length l in the electrode structure shown in FIG. 1 and the like.

Figure 61:
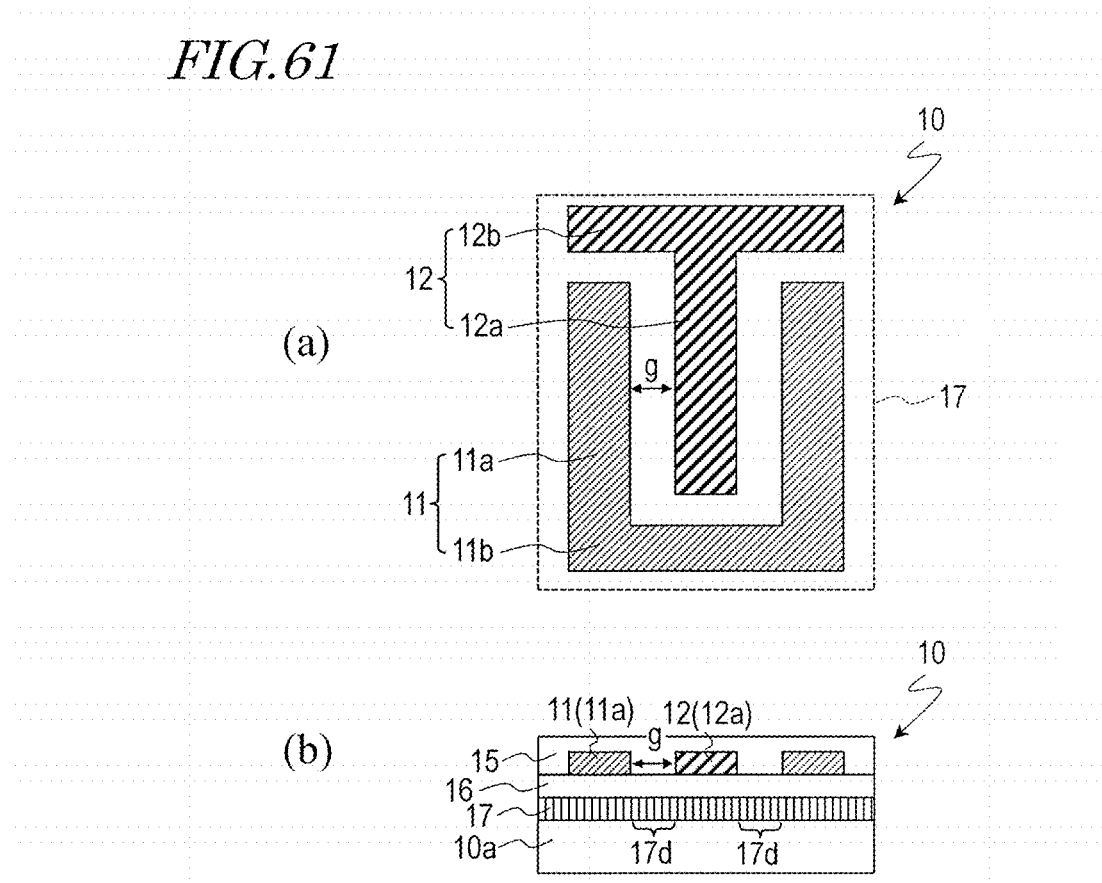
FIG. 61(a) and FIG. 61(b) are respectively a plan view and a cross-sectional view showing still another example of electrode structure of the first substrate 10.

Alternatively, an electrode structure shown in FIG. 61 may be adopted. In the example shown in FIG. 61, the first electrode 11 and the second electrode 12 have such a shape as to be geared with each other while having a predetermined gap (width g) therebetween. Specifically, the first electrode 11 includes the stem 11*b* and the plurality of (two in this example) branches 11*a* extending from the stem 11*b*. The second electrode 12 includes the stem 12*b* and one branch 12*a* extending from the stem 12*b*. In the example shown in FIG. 61, the first substrate 10 includes another electrode 17 located below the first electrode 11 and the second electrode 12 with the insulating layer 16 being held between the further electrode 17 and the first and second electrodes 11 and 12. The further electrode 17 is a solid electrode, and includes portions 17*d* facing the gaps between the first electrode 11 and the second electrode 12. The portion 17*d* are formed of a conductive film.

Figure 62:
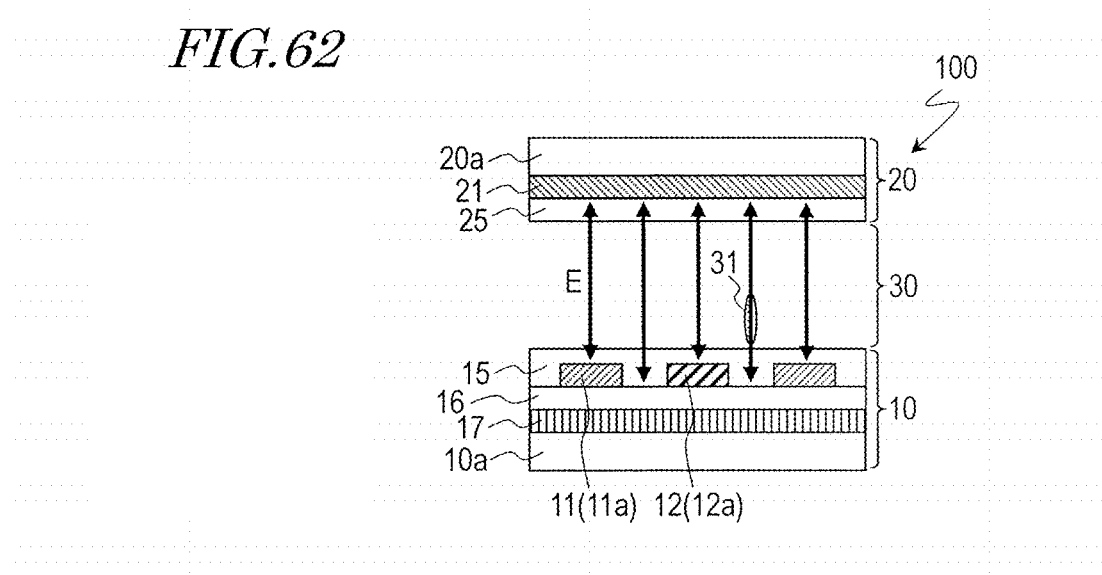
FIG. 62 shows the optical device 100 when a vertical electric field is applied in the case where the electrode structure shown in FIG. 61 is adopted.

In the case where the electrode structure shown in FIG. 61 is adopted also, as shown in FIG. 62, a vertical electric field, when being applied, effectively acts above the gaps between the first electrode 11 and the second electrode 12. Thus, the shape-anisotropic particles 32 attached to the first substrate 10 above the gaps are separated from the substrate 10 with more certainty.

As is seen from the example shown in FIG. 61 (example in which the second electrode 12 includes one branch 12a), the first electrode 11 does not need to include two or more branches 11a, and the second electrode 12 does not need to include two or more branches 12a. It is sufficient that the first electrode 11 includes at least one branch 11a and that the second electrode 12 includes at least one branch 12a.

INDUSTRIAL APPLICABILITY

An embodiment according to the present invention provides an optical device that is drivable by active matrix driving, consumes very low power, and realizes a high light utilization factor and a high contrast ratio. The optical device in an embodiment according to the present invention is preferably usable as a display panel for a display device. The optical device in an embodiment according to the present invention is also usable as any of various optical devices (optical switch, etc.) other than the display panel.

REFERENCE SIGNS LIST

10 First substrate
10a Substrate
11 First electrode
11a Stem of the first electrode
11b Branch of the first electrode
11c Slit
12 Second electrode
12a Stem of the second electrode
12b Branch of the second electrode
14 Light absorption layer
15, 25 Vertical alignment film
15', 25' Alignment film
16 Insulating layer
17 Further electrode
20 Second substrate
20a Substrate
21 Third electrode
26 Dielectric layer
30 Optical layer (display medium layer)
31 Medium
31a Liquid crystal molecule
32 Shape-anisotropic particle
100 Display panel (optical device)
110 Display device

The invention claimed is:

1. An optical device, comprising:
a first substrate and a second substrate provided to face each other; and
an optical layer provided between the first substrate and the second substrate;
wherein:
the optical layer includes a medium, and shape-anisotropic particles dispersed in the medium and having shape anisotropy;
the medium contains a liquid crystal material;
at least one of the first substrate and the second substrate includes a film provided on the side of the optical layer, the film having a surface energy of 40 mJ/m$^2$ or less, or having a contact angle with pure water of 75 degrees or greater, or a contact angle with $CH_2I_2$ of 40 degrees or greater; and
a content Cf [wt. %] of the shape-anisotropic particles in the optical layer and a thickness D [μm] of the optical layer fulfill the relationship of $4 \leq (Cf \cdot D)/10 \leq 15$.

2. An optical device, comprising:
a first substrate and a second substrate provided to face each other; and
an optical layer provided between the first substrate and the second substrate;
wherein:
the optical layer includes a medium, and shape-anisotropic particles dispersed in the medium and having shape anisotropy;
the medium contains a liquid crystal material;
at least one of the first substrate and the second substrate includes a vertical alignment film provided on the side of the optical layer, the vertical alignment film vertically aligning liquid crystal molecules contained in the liquid crystal material; and
a content Cf [wt. %] of the shape-anisotropic particles in the optical layer and a thickness D [μm] of the optical layer fulfill the relationship of $4 \leq (Cf \cdot D)/10 \leq 15$.

3. The optical device according to claim 1, wherein:
the first substrate includes a first electrode and a second electrode allowed to be supplied with different potentials from each other; and
the optical device is allowed to apply a transverse electric field to the optical layer.

4. The optical device according to claim 3, wherein:
one of the first electrode and the second electrode is provided on the other of the first electrode and the second electrode with an insulating layer being held therebetween, and includes at least one slit; and
the other of the first electrode and the second electrode includes a portion facing the at least one slit.

5. The optical device according to claim 3, wherein:
the first electrode and the second electrode have such shapes as to be geared with each other while having a predetermined gap therebetween;
the first substrate includes a further electrode located below the first electrode and the second electrode with an insulating layer being held between the further electrode and the first and second electrodes; and
the further electrode includes a portion facing the gap.

6. The optical device according to claim 3, wherein:
at least one of the first electrode and the second electrode includes at least one branch; and
a width w of the at least one branch and a length l of each of the shape-anisotropic particles fulfill the relationship of w<l.

7. The optical device according to claim 3, wherein:
the first electrode and the second electrode have such shapes as to be geared with each other while having a predetermined gap therebetween; and
a width g of the gap and a length l of each of the shape-anisotropic particles fulfill the relationship of $g > l \cdot (1/2)$.

8. The optical device according to claim 3, wherein:
the second substrate includes a third electrode facing the first electrode and the second electrode; and
the optical device is allowed to apply a vertical electric field to the optical layer.

9. The optical device according to claim 8, wherein the second substrate further includes a dielectric layer provided on the third electrode.

10. The optical device according to claim 9, wherein a specific dielectric constant εr and a thickness t [μm] of the dielectric layer fulfill the relationship of $\varepsilon r \cdot t > 7$.

11. The optical device according to claim 1, wherein the liquid crystal material has positive dielectric anisotropy.

12. The optical device according to claim 11, wherein the liquid crystal material has a dielectric anisotropy value $\Delta\varepsilon$ exceeding 15.

13. The optical device according to claim 1, wherein a length I of each of the shape-anisotropic particles is 3 μm or greater and 10 μm or less.

14. The optical device according to claim 1, wherein the shape-anisotropic particles are formed of a metal material having an insulating layer provided on a surface thereof.

15. The optical device according to claim 1, wherein a thickness D of the optical layer is 10 μm or greater and 20 μm or less.

16. The optical device according to claim 1, wherein the film or the vertical alignment film is not subjected to a rubbing treatment.

* * * * *